US009864813B2

(12) United States Patent
Melton et al.

(10) Patent No.: US 9,864,813 B2
(45) Date of Patent: Jan. 9, 2018

(54) SYSTEMS AND METHODS FOR ORGANIZING DATA ITEMS

(71) Applicant: Apple Inc., Cupertino, CA (US)

(72) Inventors: Don Melton, San Carlos, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 14/316,057

(22) Filed: Jun. 26, 2014

(65) Prior Publication Data

US 2014/0310592 A1 Oct. 16, 2014

Related U.S. Application Data

(63) Continuation of application No. 12/712,011, filed on Feb. 24, 2010, now abandoned, which is a continuation of application No. 11/620,565, filed on Jan. 5, 2007, now abandoned, which is a continuation of application No. 11/037,272, filed on Jan. 18, 2005, now abandoned.

(51) Int. Cl.
*G06F 17/30* (2006.01)

(52) U.S. Cl.
CPC .. *G06F 17/30896* (2013.01); *G06F 17/30876* (2013.01); *G06F 17/30899* (2013.01)

(58) Field of Classification Search
CPC ............... G06F 17/27; G06F 17/30873; G06F 17/30905; G06F 17/30867; G06F 17/30861; G06F 17/30899; G06F 17/3089
USPC ....................................... 707/752, 758, 749
See application file for complete search history.

(56) References Cited

U.S. PATENT DOCUMENTS

| | | |
|---|---|---|
| 4,885,704 A | 12/1989 | Takagi et al. |
| 4,945,475 A | 7/1990 | Bruffey et al. |
| 5,021,976 A | 6/1991 | Wexelblat et al. |
| 5,021,989 A | 6/1991 | Fujisawa et al. |
| 5,060,135 A | 10/1991 | Levine et al. |
| 5,140,677 A | 8/1992 | Fleming et al. |
| 5,202,828 A | 4/1993 | Vertelney et al. |
| 5,241,671 A | 8/1993 | Reed et al. |
| 5,247,437 A | 9/1993 | Vale et al. |
| 5,287,448 A | 2/1994 | Nicol et al. |
| 5,297,249 A | 3/1994 | Bernstein et al. |
| 5,305,435 A | 4/1994 | Bronson |
| 5,341,293 A | 8/1994 | Vertelney et al. |
| 5,347,628 A | 9/1994 | Brewer et al. |
| 5,349,658 A | 9/1994 | O'Rourke et al. |
| 5,353,391 A | 10/1994 | Cohen et al. |
| 5,442,778 A | 8/1995 | Pedersen et al. |
| 5,442,795 A | 8/1995 | Levine et al. |

(Continued)

OTHER PUBLICATIONS

Xu, Geoffrey, Andy Cockburn, and Bruce McKenzie. "Lost on the Web: An introduction to Web navigation research." The 4th New Zealand Computer Science Research Students Conference. 2001.*

(Continued)

*Primary Examiner* — Nan Hutton
(74) *Attorney, Agent, or Firm* — Ronald Fernando

(57) ABSTRACT

Systems, methods, and software for organizing data are described. An organizational method is selected from one or more predetermined organizational methods, specified by a parameter, or determined from information about the data items. Data items are sorted based on the organizational method.

33 Claims, 53 Drawing Sheets

(56) References Cited

U.S. PATENT DOCUMENTS

| | | | |
|---|---|---|---|
| 5,727,129 | A | 3/1998 | Barrett et al. |
| 5,845,278 | A | 12/1998 | Kirsch et al. |
| 5,918,236 | A | 6/1999 | Wical |
| 5,920,859 | A | 7/1999 | Li |
| 5,963,964 | A | 10/1999 | Nielsen |
| 6,041,360 | A | 3/2000 | Himmel et al. |
| 6,100,890 | A | 8/2000 | Bates et al. |
| 6,112,203 | A | 8/2000 | Bharat et al. |
| 6,181,342 | B1 | 1/2001 | Niblack |
| 6,184,886 | B1 | 2/2001 | Bates et al. |
| 6,189,024 | B1 | 2/2001 | Bauersfeld et al. |
| 6,219,679 | B1 | 4/2001 | Brisebois et al. |
| 6,223,178 | B1 | 4/2001 | Himmel et al. |
| 6,243,091 | B1 | 6/2001 | Berstis |
| 6,243,724 | B1 | 6/2001 | Mander et al. |
| 6,271,840 | B1 | 8/2001 | Finseth et al. |
| 6,310,630 | B1 | 10/2001 | Kulkarni et al. |
| 6,405,222 | B1 * | 6/2002 | Kunzinger et al. .......... 715/205 |
| 6,414,698 | B1 | 7/2002 | Lovell et al. |
| 6,549,944 | B1 | 4/2003 | Weinberg et al. |
| 6,574,625 | B1 | 6/2003 | Bates et al. |
| 6,578,078 | B1 | 6/2003 | Smith et al. |
| 6,601,100 | B2 | 7/2003 | Lee et al. |
| 6,613,101 | B2 | 9/2003 | Mander et al. |
| 6,631,496 | B1 | 10/2003 | Li et al. |
| 6,633,316 | B1 | 10/2003 | Maddalozzo, Jr. et al. |
| 6,681,247 | B1 | 1/2004 | Payton |
| 6,876,997 | B1 | 4/2005 | Rorex et al. |
| 6,948,135 | B1 | 9/2005 | Ruthfield |
| 7,035,868 | B2 | 4/2006 | Hashimoto et al. |
| 7,062,475 | B1 | 6/2006 | Szabo et al. |
| 7,076,546 | B1 | 7/2006 | Bates et al. |
| 7,134,082 | B1 | 11/2006 | Choi |
| 7,167,901 | B1 | 1/2007 | Beadle et al. |
| 7,181,438 | B1 | 2/2007 | Szabo |
| 7,181,459 | B2 | 2/2007 | Grant et al. |
| 7,249,262 | B2 | 7/2007 | Hauck et al. |
| 7,305,624 | B1 | 12/2007 | Siegel |
| 7,343,559 | B1 | 3/2008 | Fujita et al. |
| 7,346,494 | B2 | 3/2008 | Ando et al. |
| 7,346,615 | B2 | 3/2008 | Bern |
| 7,398,196 | B1 | 7/2008 | Liu et al. |
| 7,424,476 | B2 | 9/2008 | Apparao et al. |
| 7,581,164 | B2 | 8/2009 | Forstall et al. |
| 7,610,011 | B2 | 10/2009 | Albrett |
| 7,665,035 | B2 | 2/2010 | Burnett |
| 2001/0056434 | A1 | 12/2001 | Kaplan et al. |
| 2002/0010718 | A1 | 1/2002 | Miller |
| 2002/0016786 | A1 | 2/2002 | Pitkow et al. |
| 2002/0040311 | A1 | 4/2002 | Douglass et al. |
| 2002/0047856 | A1 | 4/2002 | Baker |
| 2002/0103789 | A1 | 8/2002 | Turnbull et al. |
| 2002/0126153 | A1 | 9/2002 | Withers et al. |
| 2002/0152237 | A1 | 10/2002 | Cohen et al. |
| 2002/0191020 | A1 | 12/2002 | Kaply et al. |
| 2003/0014415 | A1 | 1/2003 | Weiss et al. |
| 2003/0030679 | A1 | 2/2003 | Jain |
| 2003/0064756 | A1 | 4/2003 | Nielsen et al. |
| 2003/0090510 | A1 * | 5/2003 | Shuping et al. .............. 345/738 |
| 2003/0095139 | A1 * | 5/2003 | Davidsson ................... 345/700 |
| 2003/0126560 | A1 | 7/2003 | Kurapati et al. |
| 2003/0169257 | A1 | 9/2003 | Alexander et al. |
| 2003/0195863 | A1 | 10/2003 | Marsh |
| 2003/0195901 | A1 | 10/2003 | Shin et al. |
| 2003/0221541 | A1 | 12/2003 | Platt et al. |
| 2004/0001104 | A1 | 1/2004 | Sommerer et al. |
| 2004/0003351 | A1 | 1/2004 | Sommerer et al. |
| 2004/0030675 | A1 | 2/2004 | Could |
| 2004/0128277 | A1 | 7/2004 | Mander et al. |
| 2004/0148392 | A1 | 7/2004 | Cotte |
| 2004/0205499 | A1 | 10/2004 | Gupta |
| 2004/0205514 | A1 | 10/2004 | Sommerer et al. |
| 2004/0205659 | A1 | 10/2004 | Barry et al. |
| 2004/0236774 | A1 | 11/2004 | Baird et al. |
| 2004/0267815 | A1 * | 12/2004 | De Mes ............. G06F 17/3089 |
| 2005/0071251 | A1 | 3/2005 | Linden et al. |
| 2005/0071328 | A1 | 3/2005 | Lawrence |
| 2005/0120390 | A1 | 6/2005 | Nonoyama et al. |
| 2005/0132018 | A1 * | 6/2005 | Milic-Frayling et al. .... 709/213 |
| 2005/0203970 | A1 | 9/2005 | McKeown et al. |
| 2005/0234940 | A1 * | 10/2005 | Apparao et al. .............. 707/100 |
| 2005/0240874 | A1 | 10/2005 | Kiesekamp et al. |
| 2005/0278195 | A1 | 12/2005 | Getz |
| 2006/0031253 | A1 | 2/2006 | Newbold et al. |
| 2006/0095864 | A1 | 5/2006 | Mock et al. |
| 2006/0101330 | A1 | 5/2006 | Goodley |
| 2006/0161534 | A1 | 7/2006 | Carson et al. |
| 2006/0224997 | A1 | 10/2006 | Wong et al. |
| 2006/0265417 | A1 | 11/2006 | Amato et al. |
| 2007/0073648 | A1 | 3/2007 | Kurai et al. |
| 2007/0162298 | A1 | 7/2007 | Melton et al. |
| 2007/0174389 | A1 | 7/2007 | Armstrong et al. |
| 2007/0180381 | A1 | 8/2007 | Rice et al. |
| 2007/0220441 | A1 | 9/2007 | Melton et al. |
| 2007/0240076 | A1 | 10/2007 | Astala et al. |
| 2007/0240081 | A1 | 10/2007 | Grossman et al. |
| 2008/0046840 | A1 | 2/2008 | Melton et al. |
| 2008/0148193 | A1 | 6/2008 | Moetteli |

OTHER PUBLICATIONS

Herder, Eelco. "Characterizations of user Web revisit behavior." (2005).*
Obendorf, Hartmut, et al. "Web page revisitation revisited: implications of a long-term click-stream study of browser usage." Proceedings of the SIGCHI conference on Human factors in computing systems. ACM, 2007.*
Borland International, Quattro Pro: User's Guide, (1989), 229, 235-236, 251-255, 275-286.
Fordahl, M., "How Google's desktop search works", [online]. [Oct. 14, 2004; Retrieved Apr. 2, 2008] Retrieved from the Internet: <URL: http://www.msnbc.msn.com/id/6251128/>, 3 pgs.
Malone, T. W., "How Do People Organize Their Desks? Implications for the Design of Office Information Systems", *ACM Transactions on Information Systems (TOIS)*, vol. 1, Issue 1, (1983), 99-112.
Miller, P. B., et al., "Business: An End-User Oriented Application Development Language", *SIGMOD Record*, 12(1), (1981), 38-69.
Salton, G., et al., "Term-Weighting Approaches in Automatic Text Retrieval", *Information Processing and Management*, 24(5), (1988), 513-523.
U.S. Appl. No. 11/037,272, filed Jan. 18, 2005, entitled "Systems and Methods for Organizing Data Items".
U.S. Appl. No. 11/620,565, filed Jan. 5, 2007, entitled "Systems and Methods for Organizing Data Items".
U.S. Appl. No. 11/037,288, filed Jan. 18, 2005, entitled "Systems and Methods for Presenting Data Items".
U.S. Appl. No. 11/620,580, filed Jan. 5, 2007, entitled "Systems and Methods for Presenting Data Items".
U.S. Appl. No. 11/929,566, filed Oct. 30, 2007, entitled "Systems and Methods for Presenting Data Items".
"Google Desktop Search—About Google Desktop Search", [online]. [Archived Nov. 20, 2004; Retrieved Jan. 10, 2008] Retrieved from the Internet: <URL: http://web.archive.orb/web/20041120013914/desktop.google.com/about.html>, 3 pgs.
"Google Desktop Search Screenshots", [online]. [Archived Oct. 16, 2004; Retrieved Jan. 10, 2008] Retrieved from the Internet: URL:http://web.archive.org/web/20041016060041/desktop.google.com/screenshots.html, 4 pgs.
European Search Report for European Application No. 09173177, dated Jan. 29, 2010, 16 pages.
Awasu.com "Features," Document No. XP-002561537, accessed from Internet at http://web.archive.org/web/20070103184812/www.awasu.com/features . . . , Jan. 3, 2007, 3 pages.
"Customizing your computer—To Display hidden files and folders," WayBackMachine, Document No. XP-002561535, accessed from the Internet at http://web.archive.org/web/20071230045607/http:www.microsoft . . . , Dec. 30, 2007, 1 page.

(56) References Cited

OTHER PUBLICATIONS

Derene, Glenn, "How Google's Simple Chrome Could Steer Web's Complex Future: Analysis," Document No. XP-002561529, accessed by the Internet at http://www.popularmechanics.com/technology/industry/4280717.html, Sep. 2, 2008, 3 pages.
"Find and Return to Web Pages You've Recently Visited," Microsoft.com, Document No. XP-002561531, accessed from the Internet at http://www.microsoft.com/windows/ie/ie6/using/howto/basics/history/button.mspx, Published Mar. 26, 2003, updated Aug. 23, 2006, 3 pages.
Hiner, Jason, "Google Chrome: The five best new features," Document No. XP-002561528, accessed from the Internet at <http://blogs.zdnet.com/BTL/?p=9878>, Sep. 3, 2008, 3 pages.
Kaasten, et al., "Designing an Integrated Bookmark/History System for Web Browsing," Document No. XP-008031090, Prooceedings Western Computer Graphics Symposium 2000, Panorama Mountain Village, BC, Canada, Mar. 25-29, 2000, 4 pages.
Lowensohn, Josh, "FoxTab turns your browser tabs into a spectacle," Webware, Document No. XP-002561530, accessed on the Internet at http://news.cnet.com/8301-17939_109-10044366-2.html, Sep. 17, 2008, 2 pages.
Olsen, Tommy A., "Speed dial tips," Document No. XP-002561536, accessed from the Internet at http://my.opera.com/toman/blog/show,dml/788600, Mar. 1, 2007, 4 pages.
"FoxTab Tab Switching Firefox Add-on" Oct. 7, 2008, 3 pages, retrieved Jan. 25, 2011 at http://www.youtube.com/watch?v=JJhvGqj5yNM, best available copy.
PCT International Search Report and Written Opinion for PCT/US09/60391, dated Dec. 7, 2009, 15 pages.
PCT IPR and Written Opinion for PCT Counterpart Application No. PCT/US2009/060391, dated Apr. 28, 2011, 13 pages.

* cited by examiner

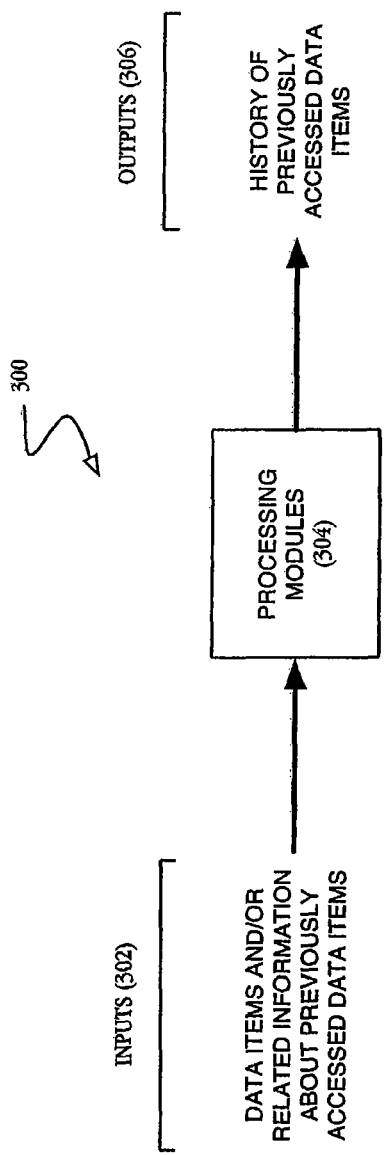
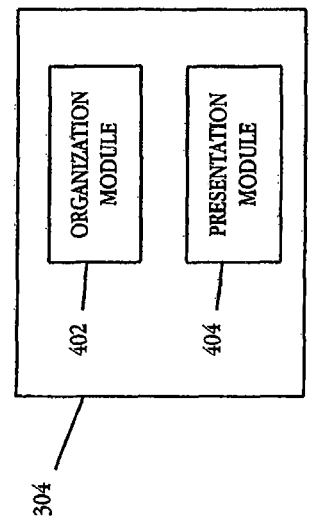

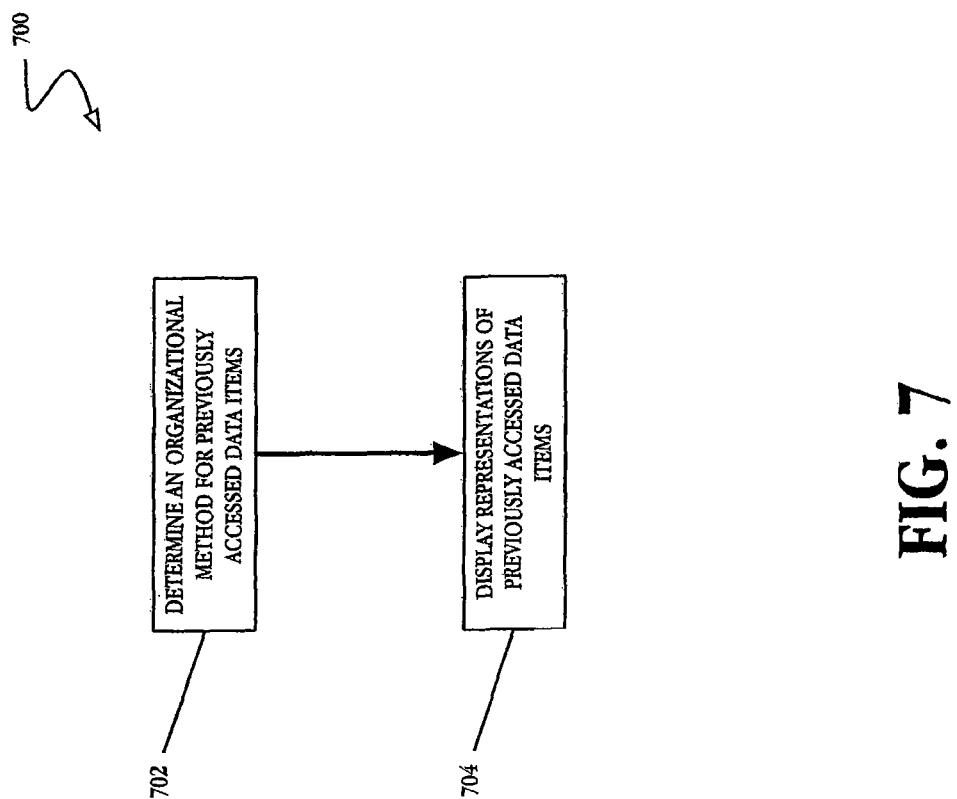

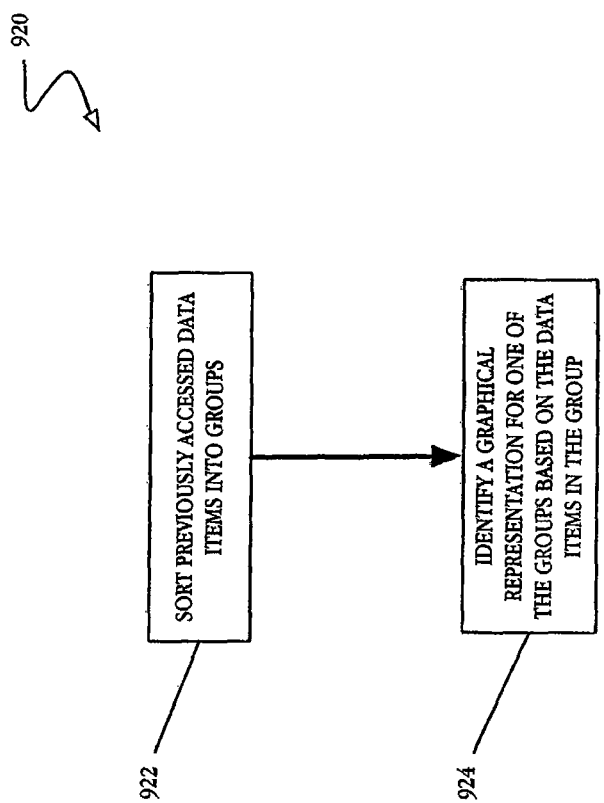

SYSTEMS AND METHODS FOR ORGANIZING DATA ITEMS

CROSS REFERENCE-RELATED APPLICATIONS

This application is a continuation of co-pending U.S. application Ser. No. 12/712,011, filed on Feb. 24, 2010, which is a continuation of U.S. application Ser. No. 11/620,565, filed on Jan. 5, 2007, now abandoned, which is a continuation application of U.S. application Ser. No. 11/037,272, filed on Jan. 18, 2005, now abandoned, the entire contents of which are incorporated herein by reference in its entirety.

TECHNICAL FIELD

The present inventive subject matter relates to the field of computer systems and more particularly to systems, software, and methods for organizing data items.

BACKGROUND

The World Wide Web, which is a collection of interconnected and cross-linked web pages located on computers, has become an important source of information. Users employ applications known as Web browsers ("browsers") to access these web pages. Since users frequently access the same web pages repeatedly (especially web pages that the user has recently viewed), most browsers keep track of the web pages that the user has previously accessed using a history list. Previous browsers have used a history list that tracks previously accessed web pages in the order of the time that the web pages were viewed (referred to as a chronological order). Although, in some of the previous web browsers, a web page is listed once in a history list even if the web page was viewed more than once. In these web browsers, web pages that are viewed more than once typically appear in the history list in the order of the most recent time that the web page was viewed. Thus, chronological order as used herein means arranged in order of the time of the occurrence. Chronological order also includes arranging in order of the more recent time of occurrence when there are multiple occurrences.

One common method for a user to navigate through the previously accessed web pages in the history list is by using forward and back buttons. For example, a user might first visit the home page of a favorite football team and then follow a link on that home page to a second page with a particular player's stats, and then follow another link on the second page to a third page containing an magazine article about the player. Subsequently, the user selects the back button on the browser twice to return to the home page of the football team instead of needing to type in the address of the home page.

A problem with this chronological order is that users can visit a large number of web pages, which are confusing to view in a chronological order, and the forward and back buttons are an inefficient and cumbersome way to navigate through multiple web pages. Further, the problems of a chronological order are not confined to pages accessed via a web browser, but also apply when data of other types is accessed over a period of time.

SUMMARY OF THE DESCRIPTION

Systems, methods, and software for organizing data are described. Embodiments of the invention provide a self-organizing list of previously accessed data items. Embodiments of the invention organize previously accessed data items non-chronologically. The organizational method may be selected from one or more predetermined organizational methods, specified by a parameter, or dynamically determined from information about the data items. Some examples of information about the data items that can be used to organize the data items include, but are not limited to, information about what content was viewed, information about where the content was viewed, information about when the content was viewed, information about why the content was viewed, and information about who the content was viewed by or owned by. Any electronic device used to access more than one data item can implement the systems and methods for organizing and presenting data.

BRIEF DESCRIPTION OF THE DRAWINGS

FIG. 3 is a high-level block diagram of a system for organizing and presenting data according to an example embodiment of the invention.

FIG. 4 is a more detailed block diagram of the processing modules of the system for organizing and presenting data shown FIG. 3 according to an example embodiment of the invention.

FIG. 7 is a flow chart of a method for organizing and presenting data according to an example embodiment of the invention.

FIGS. 9A, 9B, and 9C are flow charts of example methods of displaying representations according to some embodiments of the invention.

FIGS. 11, 12, 13 and 14 are diagrams of an example graphical user interface for an application program in which a history of previously accessed data items is displayed in a drawer.

FIGS. 15, 16, and 17 are diagrams of an example graphical user interface for an application program in which a history of previously accessed data items is displayed in a panel.

FIGS. 18 and 19 are diagrams of an example graphical user interface for an application program in which a history of previously accessed data items is displayed in a tool bar.

FIGS. 20, 21 and 22 are diagrams of an example graphical user interface for an application program in which a history of previously accessed data items is displayed using one or more tabs.

FIGS. 23, 24 and 25 are diagrams of an example graphical user interface for an application program in which a history of previously accessed data items is displayed in a sheet.

FIGS. 26, 27, 28 and 29 are diagrams of an example graphical user interface in which a history of previously accessed data items are displayed in a window.

FIGS. 30, 31 and 32 are diagrams of an example graphical user interface in which a history of previously accessed data items are displayed in a strip.

FIG. 33 is a diagram of an example graphical user interface in which a history of previously accessed data items is displayed in an overlay.

FIG. 34 is a diagram of an example graphical user interface in which a data item's significance in a history list is indicated by the data item's position.

FIGS. 35, 36 and 37 are diagrams of an example graphical user interface in which a data item's significance in a history list is indicated by the data item's appearance.

FIG. 38 is a diagram of an example graphical user interface in which a data item's significance in a history list is indicated by the data item's animation.

DETAILED DESCRIPTION

Figure 1:
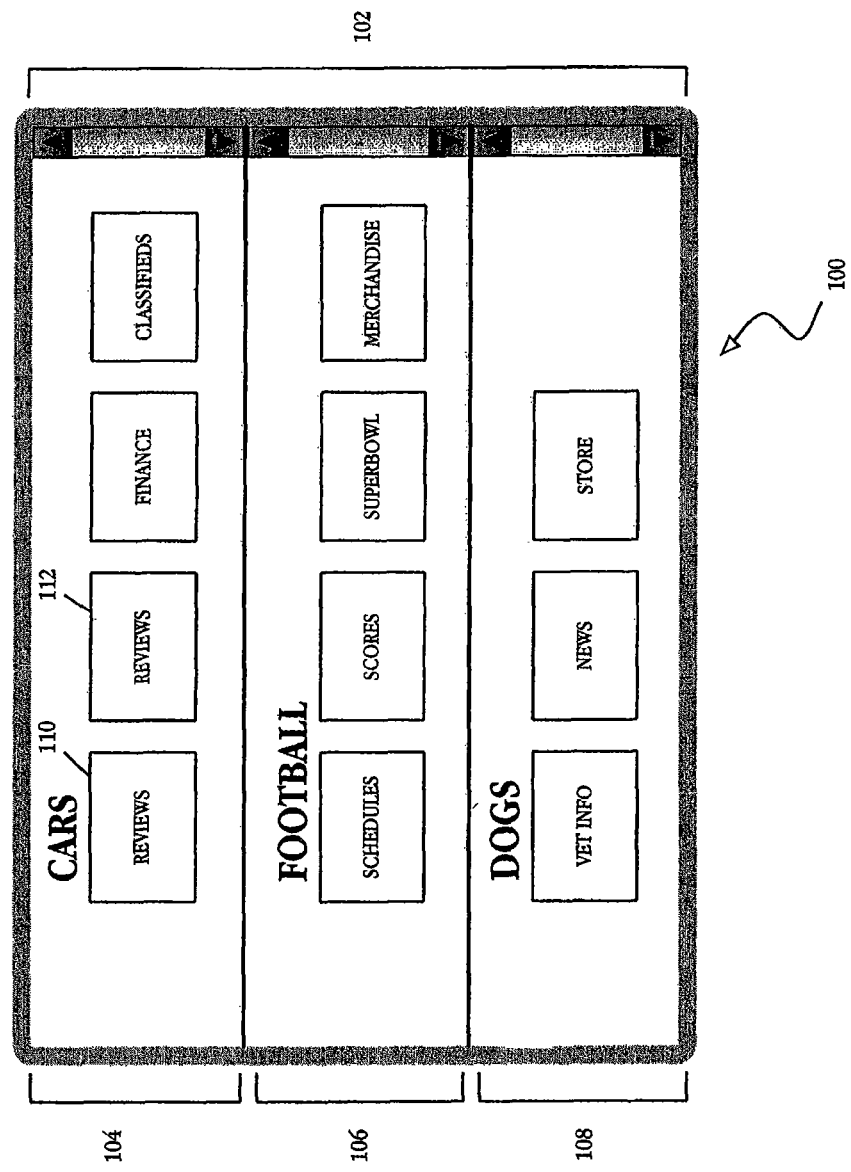
FIG. 1 is a diagram of an example graphical user interface for a web browser history list organized by subject matter.

The following is a detailed description of some exemplary embodiments of the invention(s) contained within the disclosed subject matter. Such invention(s) may be referred to, individually and/or collectively, herein by the term "invention" merely for convenience and without intending to voluntarily limit the scope of this application to any single invention or inventive concept if more than one is, in fact, disclosed. In the detailed description, reference is made to the accompanying drawings that form a part hereof, and in which are shown, by way of illustration, but not of limitation, some specific embodiments of the invention, including a preferred embodiment. These embodiments are described in sufficient detail to enable those of ordinary skill in the art to understand and implement the inventive subject matter. It is to be understood that other embodiments may be utilized, and that changes may be made without departing from the scope of the inventive subject matter.

Systems, methods, and software for organizing and presenting data are described in the following detailed description. The following two examples are used throughout the detailed description to illustrate example embodiments of the invention in the context of a web browser.

In a first example Henry is browsing the web on his desktop computer. Henry views several web pages during a single browsing session. Initially, Henry is researching information about a new truck he wants to buy. However, while researching trucks, he also visits some web pages related to his favorite sport and some web pages related to dogs. The web pages Henry visited are listed below in the order that they were viewed. The web pages visited include the following:

http://www.edmunds.com/reviews for automobile reviews;
http://www.automotive.com/reviews for additional automobile reviews;
http://www.nfl.com/schedules for football schedules;
http://www.nfl.com/scores for football scores;
http://www.automotive.com/classified for new and used car advertisements;
http://www.superbowl.com for football championship game information;
http://www.vetinfo.com for dog veterinary care information;
http://www.automotive.com/finance for car loan information;
http://www.nflshop.com for football related merchandise for sale;
http://www.akc.org/news for American Kennel Club dog news; and
http://www.akc.org/store for dog related products and gifts for sale.

The next time Henry returns to his desktop computer, he has changed his mind about the kind of car he wants to buy. Previously, Henry was reading reviews for trucks. However, now Henry thinks he would rather have a sports car. Henry wants to return to the web pages for automobile reviews that he visited in the past because he particularly liked the way the information was presented; however, he does not remember what web pages those were. Henry uses the history list in his browser to find the web pages that he visited for automobile reviews. Unlike previous browsers that have a history list organized in chronological order, Henry's browser has the web pages that he has viewed organized by subject mater. Also, unlike previous browsers that have a history list made up of the names or uniform resource locators (URLs) for web pages, Henry's browser has a history of the web pages he has viewed presented graphically.

FIG. 1 is a diagram of an example graphical user interface for a web browser history list organized by subject matter. The graphical user interface shown in FIG. 1 shows the history list that Henry's browser provided when Henry wanted to return to a web page that he viewed previously. FIG. 1 comprises a user interface 100 having a window 102. A history of Henry's previously viewed web pages is displayed graphically within panels in the window 102.

The items in Henry's history list are organized according to a feature that is common to multiple web pages in his browsing history. For the web pages that Henry has viewed, a common feature across some of them is the subject matter. In this example, the subject matter of the web page is determined from meta tags and keywords. Some of the web pages relate to the subject of ears. Other web pages relate to the subject of football and the rest of the web pages relate to the subject of dogs. The window 102 comprises three different panels 104, 106, 108. Each panel is for a different subject that Henry viewed.

Within each panel 104, 106, 108 is a representation of each web page that Henry visited in that category. A first panel 104 displays icons representing the four web pages related to cars that Henry viewed (i.e. http://www.edmunds.com/reviews, http://www.automotive.com/reviews, http://www.automotive.com/finance, and http://www.automotive- .com/classified). A second panel 106 displays icons representing the four web pages related to football that Henry viewed (i.e. http://www.nfl.com/schedules, http://www.nfl.com/scores, http://www.superbowl.com, and http://www.nflshop.com). The third panel 108 displays icons representing the three web pages related to dogs that Henry viewed (i.e. http://www.vetinfo.com, http://www.akc.org/news, and http://www.akc.org/store). Each panel 104, 106, 108 also includes a scroll bar to allow any additional web pages to be displayed in the window.

In order for Henry to return to the web pages with the automotive reviews that Henry liked, Henry just needs to look at the "cars" panel 104 in the history window 102 in FIG. 1 and select one of the icons for the web pages with automotive reviews 110, 112.

The web browser that Henry uses does not always organize the history list by subject matter. The web browser automatically determines how to organize the web pages in the history list based on information from or about the web pages. The method used to organize the web pages may change for an individual user as the items in the user's browsing history change. If Henry views new web pages during his current browsing session, the feature that is common across the web pages he has viewed may no longer be the subject matter. For example, the common feature across the pages he has viewed may be the type of web page. In the list of web pages above, some of the web pages are e-commerce type pages (e.g. http://www.nflshop.com/ and http://www.akc.org/store). However, there are not as many web pages in Henry's browsing history that have a common type so at this time the history list is not organized by type of web page. Over time though, the organizational method could change and, as a result, if the type of page becomes a more common theme across the web pages viewed, the history list could be organized according to the type of page or one of many other organizational methods.

As an example of another organizational method, the web browser could organize the web pages that Henry viewed based on common home pages rather than based on subject matter as shown in FIG. 1. For example, two of the automotive web pages have the same home page http://www.automotive.com. Two of the football web pages have the same homepage http://www.nfl.com. And, two of the dog web pages have the same homepage http://www.akc.org. Rather than organizing the history list based on common home pages though, the web pages are organized based on subject matter in this example.

Now consider a second example. In the second example Henry's wife, Maggie, is browsing the web on her laptop computer. Maggie is very busy and uses the web as a tool to accomplish a variety of things without leaving home. During the last month Maggie has visited the following web pages:

http://www.ebay.com visited daily for on-line auctions;
http://www.weather.com visited daily for weather information;
http://www.myfamily.com visited daily for announcements and photos from her family members who live far away;
http://www.simondelivers.com visited weekly to place an order from the on-line grocery store in her area;
http://www.cookinglight.com visited weekly for recipes and meal ideas;
http://www.proflowers.com visited monthly to order flowers for friends and family members with birthdays or anniversaries that month;
http://www.mapquest.com visited less than once a month to print maps and driving directions;
http://www.amazon.com visited less than once a month to order books and gifts; and
http://www.travelocity.com visited less than once a month to book travel reservations.

Figure 2:
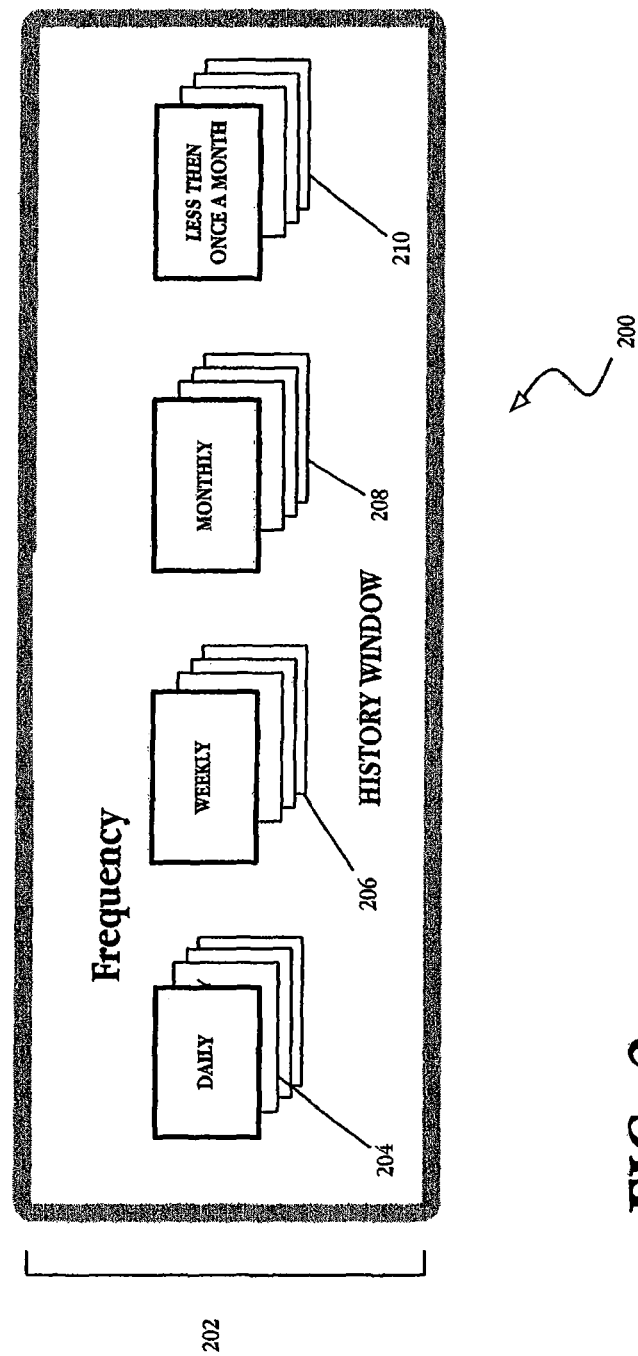
FIG. 2 is a diagram of an example graphical user interface for a web browser history list organized by frequency of access.

When Maggie returns to her laptop for her next browsing session, her browser's history list is organized by the frequency with which she visits particular pages. FIG. 2 is a diagram of an example graphical user interface for a web browser history list organized by frequency of access. As shown in FIG. 2, the graphical user interface 200 comprises a window 202 and a history of previously viewed web pages displayed graphically within the window 202. The history of Maggie's previously viewed web pages is displayed graphically within the window 202.

Like Henry's history list, the items in Maggie's history list are also organized according to a feature that is common to multiple web pages in her browsing history. Unlike Henry though, the common feature of some of the web pages that Maggie has viewed is the frequency of access. Some of the web pages are accessed daily, some of the web pages are accessed weekly, some of the web pages are accessed monthly, and some of the web pages are accessed less than once a month. The window 202 comprises four meta-icons that represent different categories of frequency (daily 204, weekly 206, monthly 208, and less than once a month 210). Each one of the meta-icons represents one or more icons for web pages within the particular category. For example, if Maggie selects the meta-icon for the items accessed daily 204, she will see individual icons for the web pages that she accesses daily (i.e., http://www.ebay.com; http://www-.weather.com; and http://www.myfamily.com). If Maggie selects the meta-icon for the items she accesses weekly 206, she will see individual icons for the web pages that she accesses weekly (i.e., http://www.simondelivers.com; and http://www.cookinglight.com). If Maggie selects the meta-icon for the items she accesses monthly 208, she will see individual icons for the web pages she accesses monthly (i.e., http://www.proflowers.com). If Maggie selects the meta-icon for the items she accessed less than once a month 210, she will see individual icons for the icons for the web pages she accesses less than once a month (i.e., http://www.mapquest.com; http://www.amazon.com; and http://www.travelocity.com).

Henry and Maggie are using the same browsing application. Unlike the web pages viewed by Henry, there are no clear common groups of subject matter across the web pages that Maggie visits. Instead, the feature that is common across the web pages that Maggie has viewed is the frequency that she accesses the web pages. Based on the web pages Maggie views, a logical way to organize a history list is the frequency with which the web pages are accessed. Some web pages are visited daily, some are visited weekly, some are visited monthly and some are visited less than once a month.

The first example and the second example described above show methods for dynamically organizing and presenting web pages in a web browser history list. Both of the examples are used throughout the detailed description to illustrate other example embodiments of the invention. References to Henry's browsing history are referred to as the "first example". References to Maggie's browsing history are referred to as the "second example".

The common feature that is used to organize the web pages in the history is not limited to the subject matter, the type of web page, common home page, or frequency of access. The common feature is any characteristic that appears frequently in the web pages in a browsing history.

The common feature may be any characteristic related to what web pages were viewed, where the web pages were viewed, when the web pages were viewed, why the web pages were viewed, who viewed/created the web pages, or any user-supplied metadata about the web page.

Also, the method of presenting the history list is not limited to a panel window. Any graphical user interface element that can be integrated with an existing web browser window (e.g., panels, toolbars, drawers, tabs, sheets and so on) or that can be presented separate from the web browser window (e.g., window, strip, overlay and so on) can be used to display the history list.

In addition, embodiments of the invention have other applications and are not limited to the context of a web browser as described above. For example, other embodiments may include file system managers, audio or video players, photo editors/managers, or any other system in which multiple data items are accessed.

The following detailed description is divided into five sections and refers back to the above two examples throughout the detailed description. In the first section, a system overview of the inventive subject matter is presented. In the second section, methods of using example embodiments of the inventive subject matter are provided. In the third section, example user interfaces are described. In the fourth section, example implementations are described. In the fifth section, the hardware and the operating environment in conjunction with which embodiments of the invention can be practiced are described.

System Overview

FIGS. 3, 4, 5 and 6 provide a system overview of example embodiments of the invention.

FIG. 3 is a high-level block diagram of a system for organizing and presenting data 300, according to an example embodiment of the invention. The system 300 provides a self-organizing list of data items (such as web pages) that have been previously accessed. A data item is any unit of information/data or a reference to a unit of information/data. In addition, metadata is any information about the data item.

Example categories of data items include, but are not limited to, data that is available to an operating system, data that is available to an application program, or data that is available to one or more users. Embodiments of the invention are not limited to any particular data item. Some example data items include data files (e.g., word processing files, spread sheets, presentation files, and the like), web pages, media files (e.g. audio and video files), and image files.

As shown in FIG. 3, the system for organizing and presenting data 300 comprises inputs 302, processing modules 304, and outputs 306. In one embodiment, the inputs 302 comprise previously accessed data items and/or information about the previously accessed data items. The processing modules 304 comprise processing modules to automatically organize previously accessed data items based on information about the data items, and to graphically display the previously accessed data items. The output 306 is an organized history of the previously accessed data items. The history can be used to help a user quickly return to one of the previously accessed data items. The history is presented graphically such as with thumbnails, icons or meta-icons, and so on.

Any electronic device used to access more than one data item can implement the system for organizing and presenting data 300. In the example given at the beginning of the detailed description, the system is a computer with a web browser, and the previously accessed data items are web pages.

FIG. 4 is a more detailed block diagram of the processing modules 304 of the system for organizing and presenting data shown in FIG. 3, according to an example embodiment of the invention. As shown in FIG. 4, the processing modules 304 comprise program modules for organizing data (an organization module 402) and for presenting data (a presentation module 404). Generally, program modules include routines, programs, objects, components, data structures, etc., that perform particular functions or implement particular abstract data types.

The organization module 402 provides a mechanism to determine an organizational method for previously accessed data items from a variety of possible ways to organize the data items. Rather than organizing a history of previously accessed data items chronologically, as done by existing systems, the organization module 402 dynamically determines an organizational method from information about the data items and automatically organizes the data items accordingly.

The organization module 402 organizes data items dynamically using intrinsic information about the data items. For example, the organization module 402 may organize the data items using one or more of the following types of information from, or about, the data items: meta tags (in web pages), keywords, file types, file names, web page URLs, folders, directory paths, the frequency the data items were accessed, the duration of access for the data items, the recentness of access, and so on.

Although in some embodiments temporal information (such as duration of access, recentness of access, and so on) is used to determine the organizational method, the organizational method is not strictly a chronological order. In other words, although the organizational method is not solely based on chronological order, the organizational method may have temporal aspects in some embodiments of the invention.

In an alternate embodiment, the organization module 402 organizes data items using a set of fixed categories or predetermined organizational methods. The organization module 402 uses intrinsic information about the data items to select one of the predetermined organizational methods to be applied. Rather than dynamically determining the organizational method, the organizational module 402 selects the organizational method from one of the predetermined methods.

In still another embodiment, the organizational module 402 receives a parameter specifying the organizational method to be applied. The parameter may be passed to the organization module 402 from an operating system or an application program. In some embodiments, the parameter specifying the organizational method originates from a user selection, setting or preference. In other embodiments, the parameter originates from the operation of the operating system or application program.

In the first example given at the beginning of the detailed description, there are several possible methods for organizing the web pages accessed by Henry including; based on subject matter; based on type of web page; or based on common home page. In the example, the organization module 402 dynamically determined that the web pages should be organized based on the subject matter rather than the other possible organizational methods.

The presentation module 404 displays representations of previously accessed data items in a manner that is not the chronological order in which the data items were accessed. The presentation modules 404 also graphically indicate the significance of one or more of the data items. In one embodiment, icons are used to represent previously accessed data items. In other embodiments, the data items are presented by thumbnail images of the data items, names of the data items, addresses of the data items, or any other information that represents the data items. In one embodiment the data items are web pages, but in other embodiments the data items may be files, database records, electronic mail, or any other data item capable of being accessed.

In the first example given at the beginning of the detailed description, the presentation module 404 uses icons to represent Henry's previously accessed web pages (see FIG. 1). A more detailed description, and additional examples of ways of presenting previously accessed data items are described by reference to FIG. 6.

Embodiments of the invention are not limited to processing modules 304 comprising both an organization module 402 and a presentation module 404. In alternate embodiments, the processing modules 304 comprise only an organization module 402 or only a presentation module 404.

Figure 5:
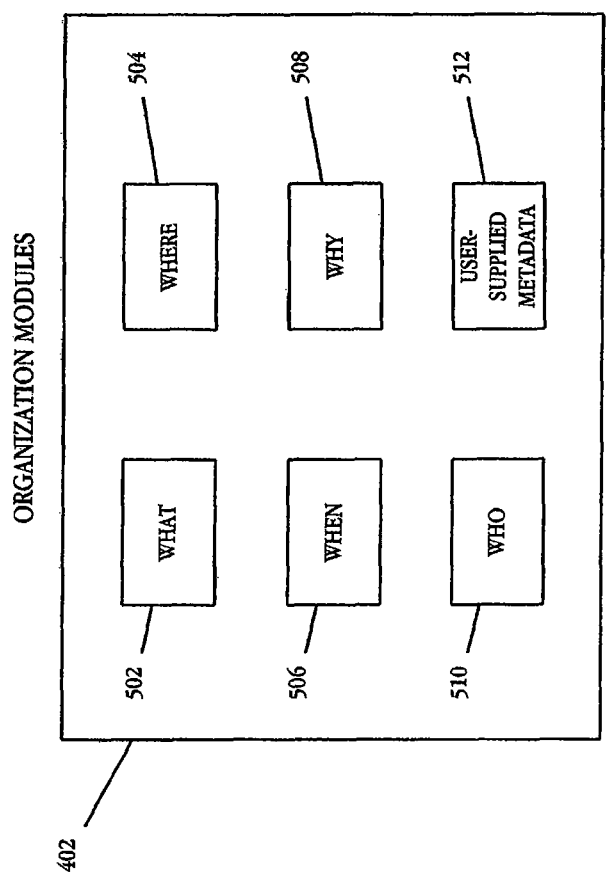
FIG. 5 is a more detailed block diagram of the organization modules shown in FIG. 4 according to an example embodiment of the invention.

FIG. 5 is a more detailed block diagram of the organization modules 402 shown in FIG. 4, according to an example embodiment of the invention. The organization modules determine how to organize previously accessed data items from information about the data items. Embodiments of the invention are not limited to organizing any particular types of information. Some examples of information about the data items that can be used to organize the data items include, but are not limited to, information about what content was viewed 502, information about where the content was viewed 504, information about when the content was viewed 506, information about why the content was viewed 508, information about who the content was viewed by or owned by 510, and user-supplied metadata 512.

Some examples of information about what content was viewed 502 may include meta tags (in web pages), keywords, file types, file names, file name extensions, comments associated with a file, and so on. In an example embodiment, information about the content of the data items is determined via semantic textual analysis. In another embodiment, the semantic textual analysis is accomplished via a vector space, but in other embodiments any appropriate technique may be used.

In the first example at the beginning of the detailed description. Henry's browsing history is organized based on what content was viewed. The information used to determine this organizational method included meta tags and keywords on the web pages. The organization modules 402 used the information to determine an organizational method. In Henry's example, the meta tags and keywords revealed three subjects that appeared frequently in Henry's browsing history. The subjects were ears, football, and dogs. At a high level these subjects represent what content was viewed. The web sites in Henry's browsing history were then sorted based on what content was viewed.

Some examples of information about where the content was viewed or located 504 may include a web page URL, a folder, a directory path, a file system, a network, and so on. In an example embodiment, information about where the content was viewed is based on the structure of the addresses of the data. Web pages have a hierarchical nature, which is reflected in the structure of the addresses of the web pages. The hierarchical nature of addresses can be understood by the following example. Consider the URL address, "http://www.uspto.gov/web/menu/intro.html," which is an address to an introduction about the United States Patent and Trademark Office. This URL specifies a hypertext transfer-protocol ("http") and a name ("www.uspto.gov") of the server (the first hierarchical level). The URL also specifies the name of the file that contains the text ("intro.html") (the 4th hierarchical level) and the hierarchical directory ("web") (the 2nd hierarchical level) and subdirectory ("menu") (the 3rd hierarchical level) in which the file resides on the server. A directory is a grouping of files on the server that usually contain related information. A subdirectory is a division within a directory. A URL might contain any number of directories and subdirectories. The delimiter that separates the various identifier-components (the different hierarchical levels) of the URL is a "/" in this example. In one embodiment, data items are organized according to directories and/or subdirectories.

In the first example at the beginning of the detailed description, another possible organizational method for Henry's browsing history is to organize it based on where the content is viewed. The information used to determine this organizational method included common home pages for some of the web pages Henry viewed. Sorting the web pages in Henry's browsing history based on the home page is an alternate way to organize his browsing history. In this example though, there were fewer occurrences of a common home page than of a common subject. As a result, the organizational modules 402 determined that the content should be organized based on what content was viewed, rather than based on where the content was viewed.

In an alternate embodiment, information about where the content was viewed may include information about a physical location of a user at the time the content was viewed. For example, the location may be determined by locations defined in a user's network settings such as home, office, and so on. In another embodiment, information about the physical location is determined from location aware applications.

Some examples of information about when the content was viewed 506 may include the date and/or time the content was viewed, how often the content was viewed (i.e., frequency of access), length of time the content was viewed (i.e., duration of access), length of time between viewings, recentness of access, and so on. In the second example at the beginning of the detailed description, Maggie's browsing history is organized based on when the content is viewed. Sorting the web pages in Maggie's browsing history based on how often she views the web pages is one way to organize her browsing history. Although sorting the web pages based on how often Maggie views them has temporal aspects to the organizational method, Maggie's browsing history is not organized in a chronological order as it would have been if she used a previous system. The organizational modules 402 considered various possible ways to organize Maggie's browsing history, and determined that the organizational method should be based on when the content was viewed. In an alternate embodiment, information about when the content was viewed includes the time of the day, week or month. For example, users tend to view similar data items at about the same time. A user might read news web pages early in the morning and search web pages related to a hobby in the evening. During the middle of the day, the user may view work-related web sites.

Some examples of information about why the content was accessed 508 may include various activities that occurred when the content was accessed such as opening the file, viewing the file, editing the file, copying the file, attaching the file to an electronic mail message, burning the file on a CD or DVD, downloading the file, and so on. In both of the examples at the beginning of the detailed description, the organizational modules 402 did not sort either Henry's or Maggie's browsing history based on why the content was accessed. In both the first example and the second example, all of the web pages were accessed for the same reason—to view the content. In these two examples, sorting the web pages based on why they were accessed would not have helped make particular web pages in the browsing history any easier to retrieve because the web pages would all be in the same group.

Some examples of information about who accessed the file 510 may include users who accessed the data files (e.g., created, viewed, or modified the data files); applications that accessed the data files (e.g., created, opened, or modified the data files); or any other activities performed on data files by a user, a program, or an operating system. Again, in both of the examples at the beginning of the detailed description, the organizational modules 402 did not sort either Henry's or Maggie's browsing history based on who accessed the web pages. In each case, the web pages were accessed by the same person and by the same application. Sorting the web pages based on who accessed the web page would not have helped to make particular web pages in the browsing history easier to retrieve because the web pages would all be in the same group.

In other embodiments, the information used to determine an organizational method for the data items comprises user-supplied metadata 512. One example of user-supplied metadata 512 is a ranking provided by the user for the content. However, user-supplied metadata 512 is not limited to rankings. Any extra data about the content that is provided by the user may be used to determine an organizational method for previously accessed data items.

Figure 6:
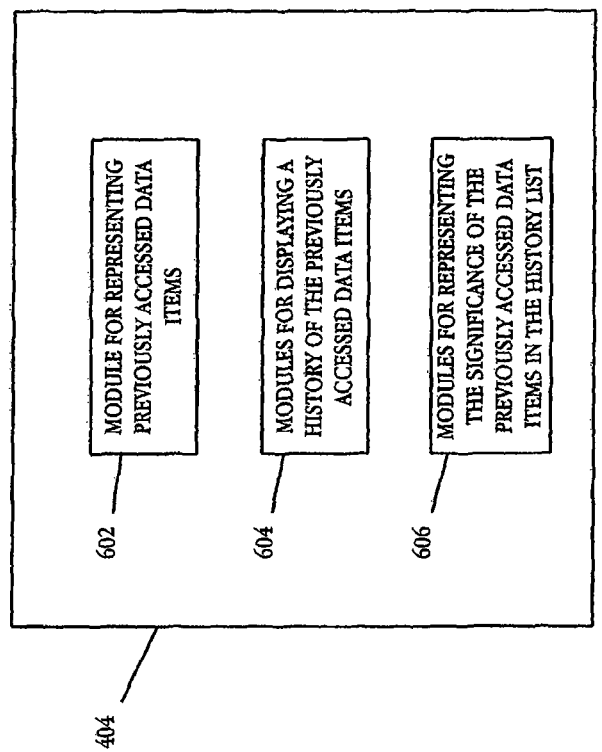
FIG. 6 is a more detailed block diagram of the presentation modules shown FIG. 4 according to an example embodiment of the invention.

FIG. 6 is a more detailed block diagram of the presentation module 404 shown in FIG. 4 according to an example embodiment of the invention. The presentation module 404 displays representations of previously accessed data items in a manner that is not the chronological order in which the data items were accessed and, in some embodiments, graphically indicates with the representation the significance of one or more of the data items. As shown in FIG. 6, the presentation module 404 comprises modules for representing the previously accessed data items 602, modules for displaying a history of the previously accessed data items 604, and modules for representing the significance of data items in the history list 606.

The modules for representing the previously accessed data items 602 are not limited to presenting the data items in any particular way. In some embodiments, the data items are represented as thumbnails or as icons. A thumbnail is a small image representing a larger image (such as a small image representing a web page). An icon is an image that represents a document, an application, or some other information that is meaningful to a user. In still other embodiments, the data items are represented as meta-icons. A meta-icon is an icon that represents several other different icons. In a further embodiment, the meta-icon represents other meta-icons. In the example given at the beginning of the detailed description, meta-icons are used to represent Maggie's previously accessed web pages (see FIG. 2). Each one of the meta-icons shown in FIG. 2 represents one or more icons for web pages within a particular category.

When the modules for representing the previously accessed data items 602 use a meta-icon, the meta-icon represents several different icons or thumbnails with a single icon. The icons represented by the meta-icon are displayed by selecting the meta-icon. Selecting the meta-icon is not limited to any particular method. Meta-icons can be selected using any means for selecting an object in a graphical user interface. In one embodiment, a meta-icon may be selected by moving a pointer to the meta-icon and clicking on a mouse button. In another embodiment, the meta-icon is selected by moving the pointer over the meta-icon and briefly holding the pointer there until a window opens displaying the icons represented by the meta-icon. In some graphical user interfaces this is referred to as a spring-loaded effect. With the spring-loaded effect, the window optionally disappears when the pointer is moved off the meta-icon or when an icon in the spring-loaded folder is selected. In still another embodiment, the meta-icon is expanded to show the icons it represents when a pointer is moved over the meta-icon.

In other embodiments, the data items are represented using text. However, embodiments of the invention are not limited to displaying the previously accessed data items visually. In alternate embodiments, the previously accessed data items are presented using audio/voice interfaces.

The modules for displaying a history of the previously accessed data items 604 provide a graphical view of the history. In one embodiment, the graphical view of the history is integrated with elements of an existing graphical user interface for an application program. Some examples of user interface elements that can be used to add the history to an existing user interface for an application program include, but are not limited to, panels, toolbars, drawers, tabs, sheets, and so on. In an alternate embodiment, the graphical view of the history is presented separate from the elements of an existing graphical user interface for an application program. Some examples of user interface elements that can be used separately from the existing user interface for the application program include, but are not limited to, windows, strips, overlays, and so on. However, embodiments of the invention are not limited to providing a graphical view of the history. In still other embodiments where audio/voice interfaces are implemented, a history of previously accessed data items is spoken to a user with a recorded or a computer generated voice. A more detailed description, and additional examples of user interfaces for displaying a history of previously accessed data items, are described by reference to FIGS. 11-33.

The modules for representing the significance of data items in the history list 606 provide an indication of the significance of a data item in the history. In one embodiment, the significance of a data item in the history is indicated visually. Embodiments of the invention are not limited to any particular types of visual indicators to represent significance. Some examples of visual indicators include, but are not limited to, the appearance of the data item in the history list (e.g., size, color, shading, brightness, and borders associated data items), the position of the data item in the history list, and behavior/animation of the data item (e.g., moving, bouncing, blinking, or pulsing data items). In another embodiment, the significance of a data item in the history is indicated through audio. If the history is presented graphically, audio may be associated with at least one of the graphical representations as an indication of significance. Alternatively, if the list of items in the history are spoken to a user, the significance of an item may be indicated by using a different voice, pitch, speed, intonation, volume and so on. Embodiments of the invention are also not limited to any particular method for determining the significance of the data item in the history. Some examples include analyzing the frequency of keywords in the data item, tracking how frequently a user views the data item, utilizing user-supplied ratings/rankings for the data item, and so on. A more detailed description, and additional examples of user interfaces for indicating the significance of a data item in a history of previously accessed data items, are described by reference to FIGS. 34-38.

An overview of a system for organizing and presenting data items has been presented by reference to FIGS. 3, 4, 5, and 6. The system provides a self-organizing list of data items viewed by the user. The list is organized based on what content was viewed, where the content was viewed, when the content was viewed, why the content was viewed, who the content was viewed by/owned by, or user-supplied metadata. The list is presented graphically, and provides a history of data items accessed by the user. Rather than representing all entries in the history list in the same way as previous systems do, embodiments of the present invention convey the significance of items in the list through variations in the graphics used to represent the items.

Method Embodiments

In this section, particular methods of example embodiments are described by reference to a series of flow charts. The methods to be performed constitute computer programs made up of computer-executable instructions. FIGS. 7, 8A, 8B, 8C, 9A, 9B, and 9C describe methods for organizing and presenting data items according to some example embodiments of the invention.

FIG. 7 is a flow chart of a method for organizing and presenting data according to an example embodiment of the invention. As shown in FIG. 7, an organizational method is determined for the previously accessed data items (block 702). Then, representations of the previously accessed data items are displayed (block 704).

Figure 8A:
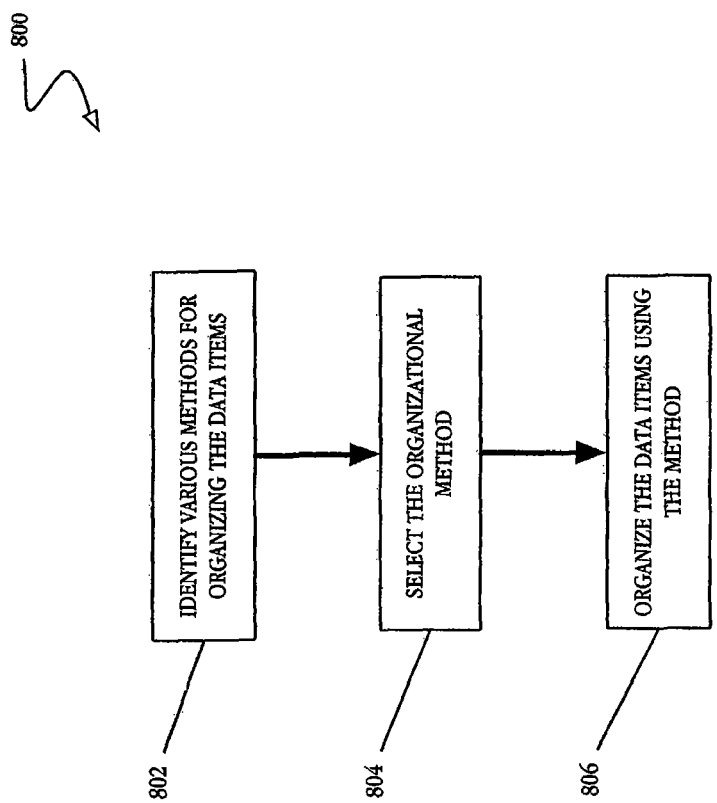
FIGS. 8A, 8B, and 8C are flow charts of example methods for determining an organizational method according to some embodiments of the invention.
Figure 8B:
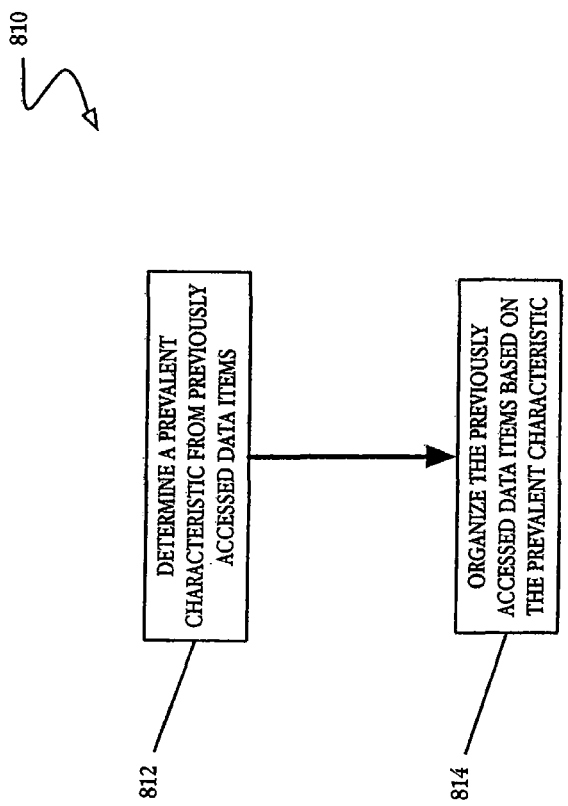
Figure 8C:
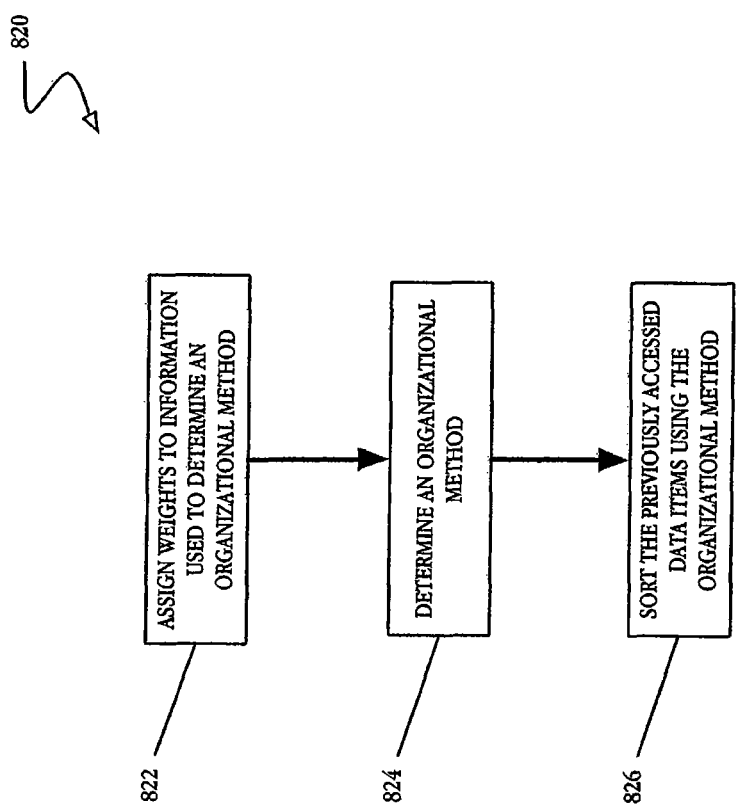

FIGS. 8A, 8B, and 8C are flow charts of example methods for determining an organizational method shown in block 702 of FIG. 7 according some embodiments of the invention.

FIG. 8A is a flow chart of a method for organizing data items according to an example embodiment of the invention. As shown in FIG. 8A, various methods for organizing the data items are identified (block 802). An organizational method is then selected (block 804. The data items are then organized using the organizational method (block 806).

Still referring to FIG. 8A, in some embodiments, at block 802 the various methods for organizing the data items are identified dynamically using information from the data items themselves or from metadata about the data items. In other embodiments, at block 802 the methods for organizing the data items are identified from fixed categories or predetermined methods. In still another embodiment, at block 802 the methods for organizing the data items are specified by a program parameter or a user setting.

Still referring to FIG. 8A, in some embodiments, at block 806 multiple organizational methods are used to organize the data items. For example, the data items may be organized hierarchically with different levels organized according to different methods of organization.

FIG. 8B is a flow chart of a method for organizing data according to another embodiment of the invention. The method shown in FIG. 8B looks for prevalent characteristics in the previously accessed data items. As shown in FIG. 8B, a prevalent characteristic is determined from the previously accessed data items (block 812). Then, the previously accessed data items are organized based on the prevalent characteristic (block 814).

Referring to FIG. 8B, a prevalent characteristic is a widely or commonly occurring characteristic in a series of data items. The prevalent characteristics are determined from information about the data items. The information about the data items may come from metadata about a data item itself, or from actual content of the data item, or from a combination of both. In one example where the data items are web pages, the prevalent characteristic is identified from information about the previously accessed web sites. The prevalent characteristics may be particular subject matter areas identified from the web pages. The previously accessed web pages are sorted based on the subject matter areas. The web pages are then grouped according to the particular subject matter areas.

FIG. 8C is a flow chart of a method for organizing data according to an alternate embodiment of the invention. In the method shown in FIG. 8C, the organizational method is influenced by a user or program weighting one or more of the various possible organizational methods. As shown in FIG. 8C, weights are assigned to information used to determine an organizational method (block 822). An organizational method is then determined for previously accessed data items (block 824) and the data items are sorted using the organizational method (block 826). By allowing a user to add weights to different characteristics of previously accessed data items, the user can influence the organizational method used for the previously accessed data items.

Figure 9A:
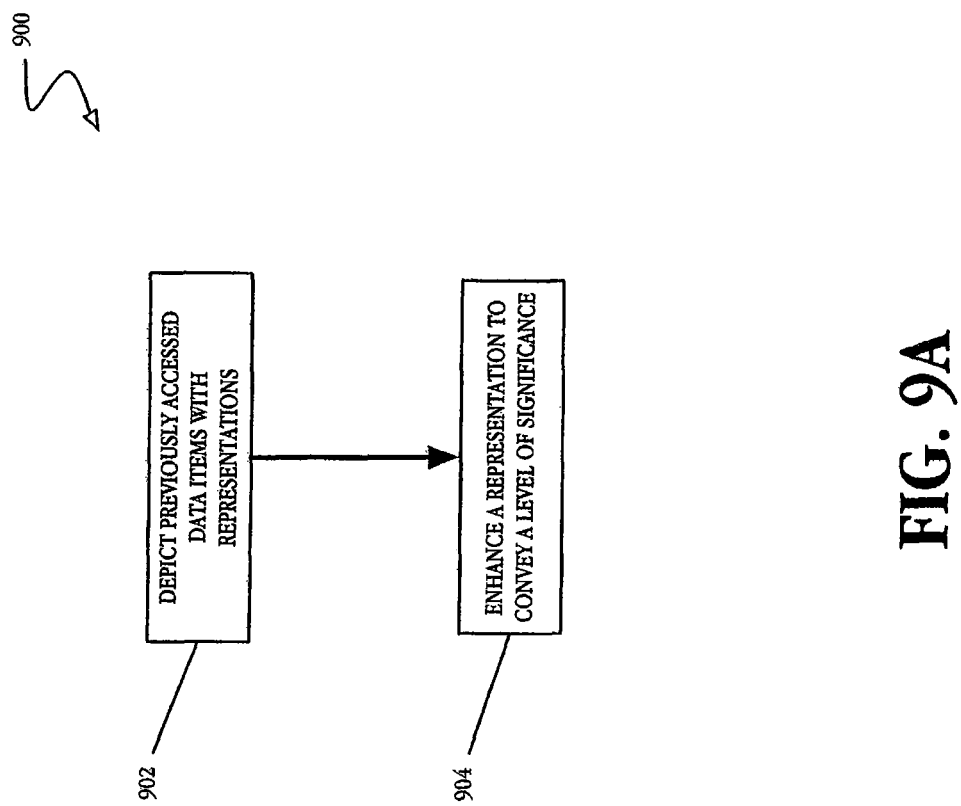
Figure 9B:
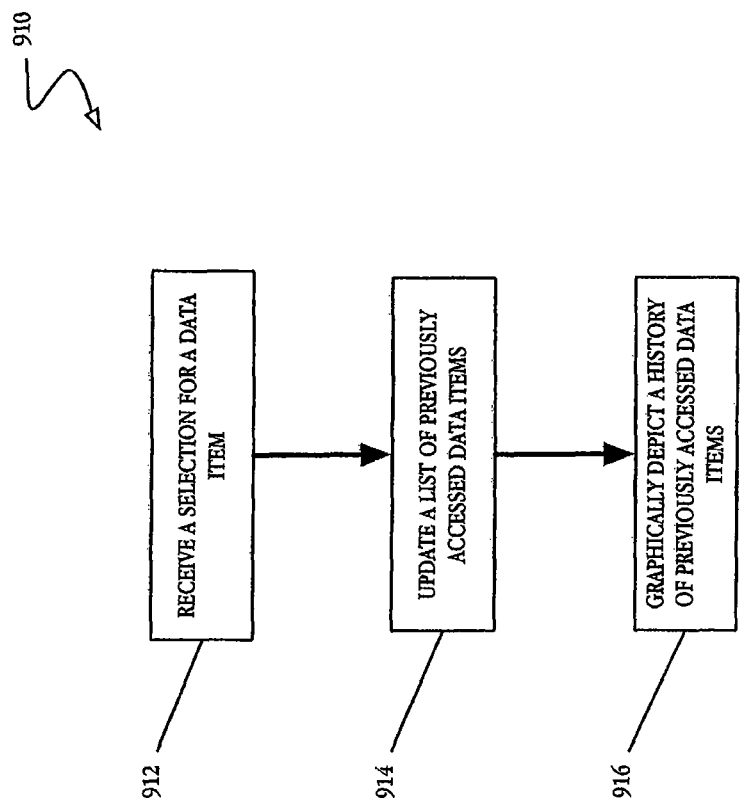

FIGS. 9A, 9B, and 9C are flow charts of example methods of displaying representations shown in block 704 of FIG. 7 according to some embodiments of the invention.

FIG. 9A is a flow chart of a method for presenting data according to an example embodiment of the invention. As shown in FIG. 9A, previously accessed data items are depicted with representations (block 902). One or more of the representations are enhanced to convey a level of significance of the previously accessed data item depicted by the representation (block 904).

FIG. 9B is a flow chart of a method for maintaining and displaying a history of previously accessed data item according to an example embodiment of the invention. As shown in FIG. 9B, a data item is selected (block 912). A list of previously accessed data items is updated to include the selected data item (block 914). A history of the previously accessed data items is graphically depicted (block 916).

FIG. 9C is a flow chart of a method for representing previously accessed data items using graphical representations. As shown in FIG. 9C previously accessed data items are sorted into groups (block 922). Then, a graphical representation is identified for at least one of the groups based on the data in the group (block 924).

Referring to FIG. 9C, the graphical representation is used to depict the previously accessed data items. In one embodiment, the graphical representation is a meta-icon. Embodiments of the invention are not limited to any particular method of identifying a meta-icon. In some embodiments an image is used for the meta-icon that provides information about the data items represented by the meta-icon. For example, meta-icon may be selected to represent a theme in the data items represented by the meta-icon. In one embodiment, keywords are used to identify the theme of the data items and a representative icon is selected for the theme from a library of icons. In another example, the meta-icon is badged with an image that represents a prevalent characteristic found in the data items represented by the meta-icon. In still another example where the meta-icon represents a series of web pages that have the same path or home page, the meta-icon may be a thumbnail for the outermost page viewed in the path. In a further example where the meta-icon represents a series of web pages, an icon or thumbnail for the page viewed the longest duration may be used for the meta-icon. However, embodiments of the invention are not limited to these example methods of representing a meta-icon. Any method of selecting an image to represent multiple data items may be used select the meta-icon.

User Interfaces

Various methods for organizing and presenting data items have been described in the previous section. In this section, user interfaces for implementing the methods will be discussed. Embodiments of the invention are not limited to implementation with any particular user interface. The user interface diagrams described in this section are intended to be representative of a user interface for any operating system or application program that accesses data items. Some example application programs include, but are not limited to, web browsers, file system managers, media players, and image managers.

FIGS. 10A, 10B, 10C, 10D, 10E, 10F, 10G, and 10H are diagrams of various different user interfaces for displaying a history of previously accessed data items. The data items presented in the user interfaces shown in FIGS. 10A-10H are the data items from the first example at the beginning of the detailed description. FIGS. 10A-10H illustrate the same history list presented in different user interfaces.

Figure 10A:
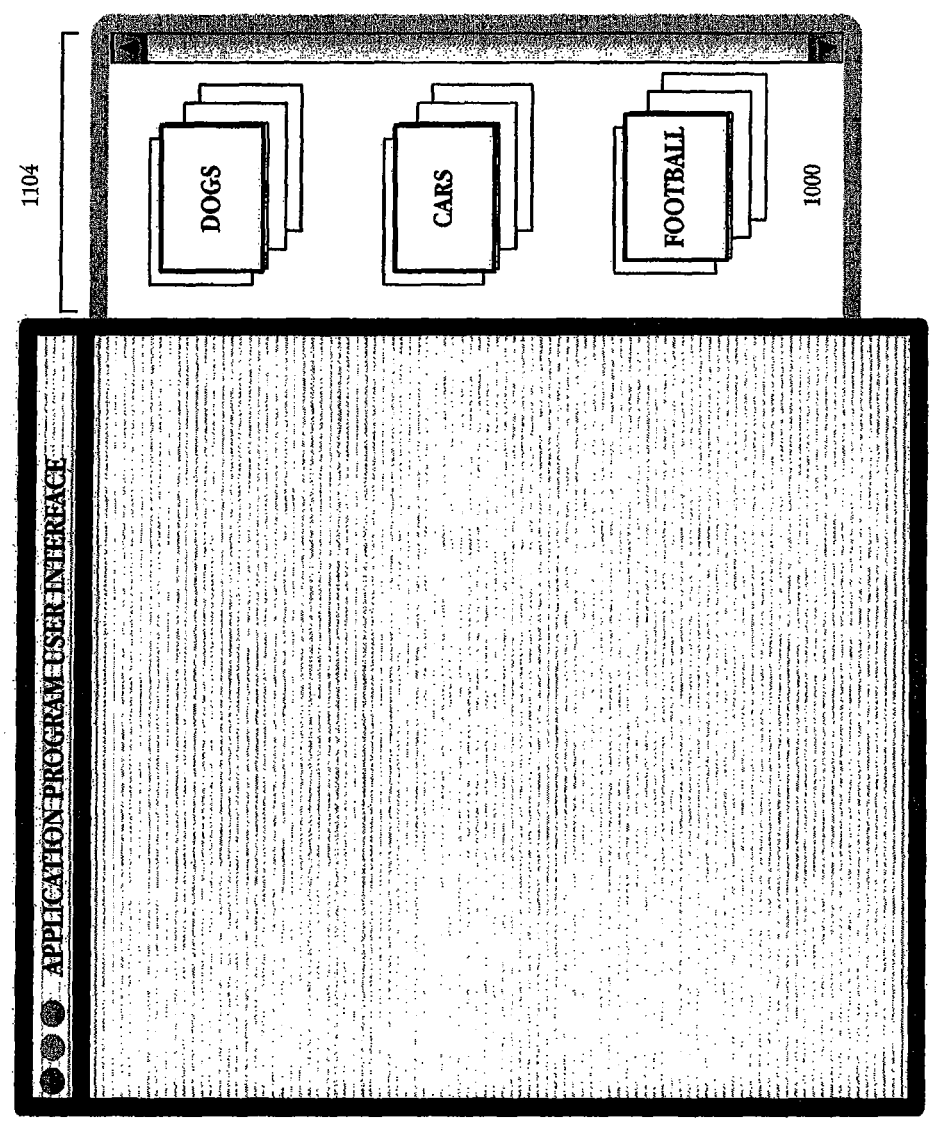
FIGS. 10A, 10B, 10C, 10D, 10E, 10F, 10G, and 10H are diagrams of various different user interfaces for displaying a history of previously accessed data items.
Figure 10B:
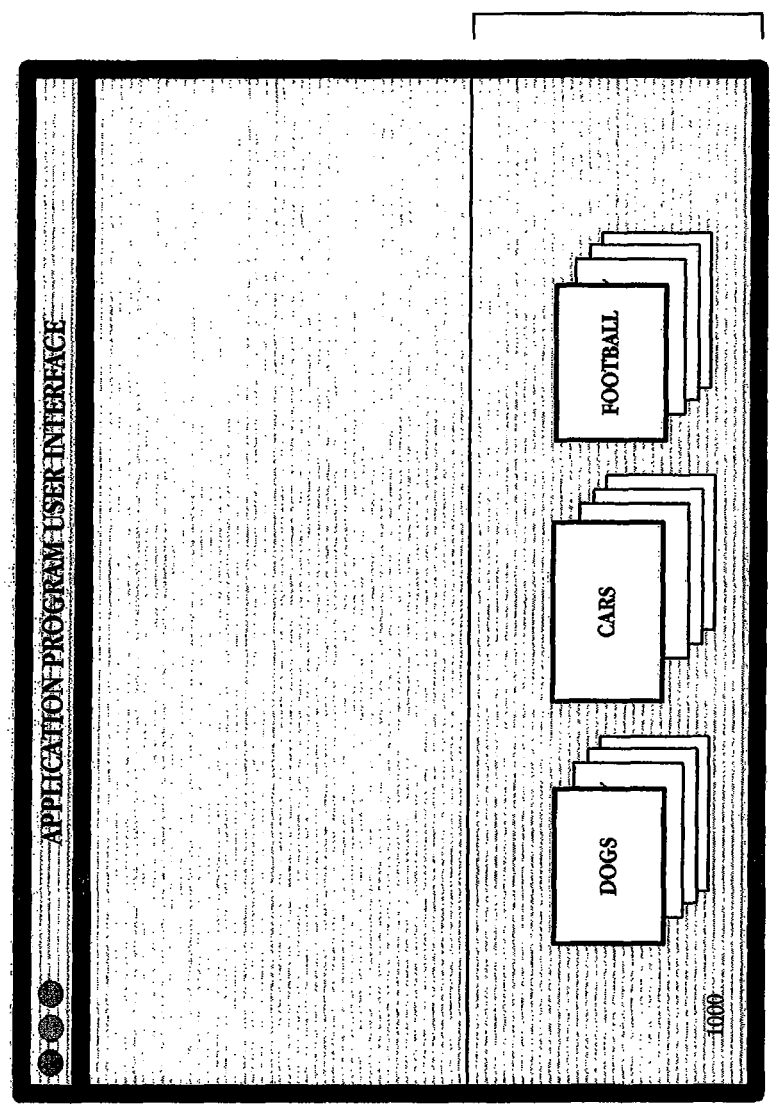
Figure 10C:
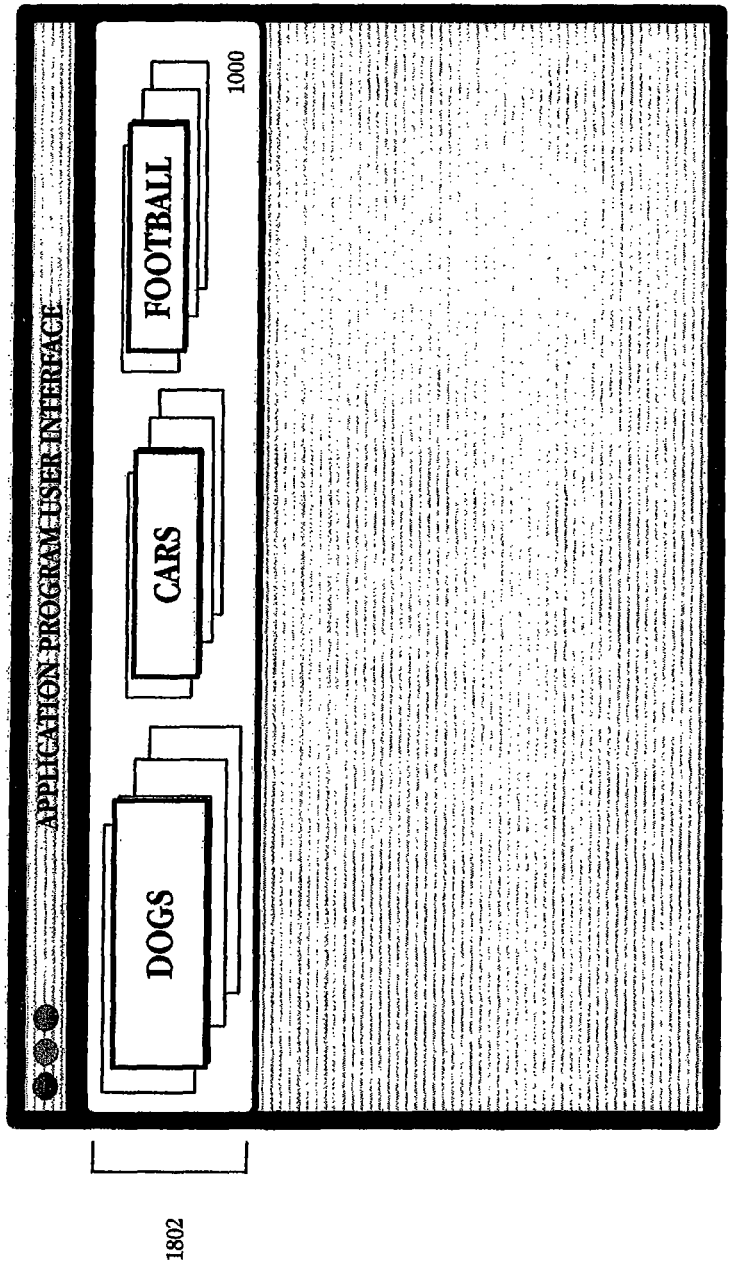
Figure 10D:
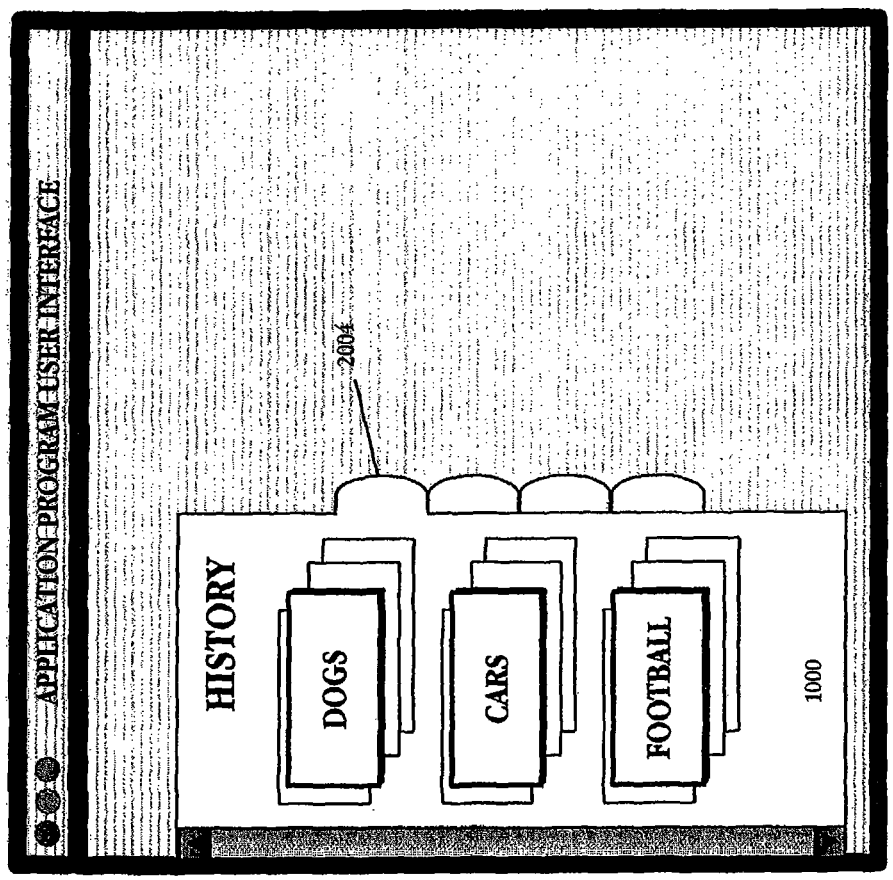
Figure 10E:
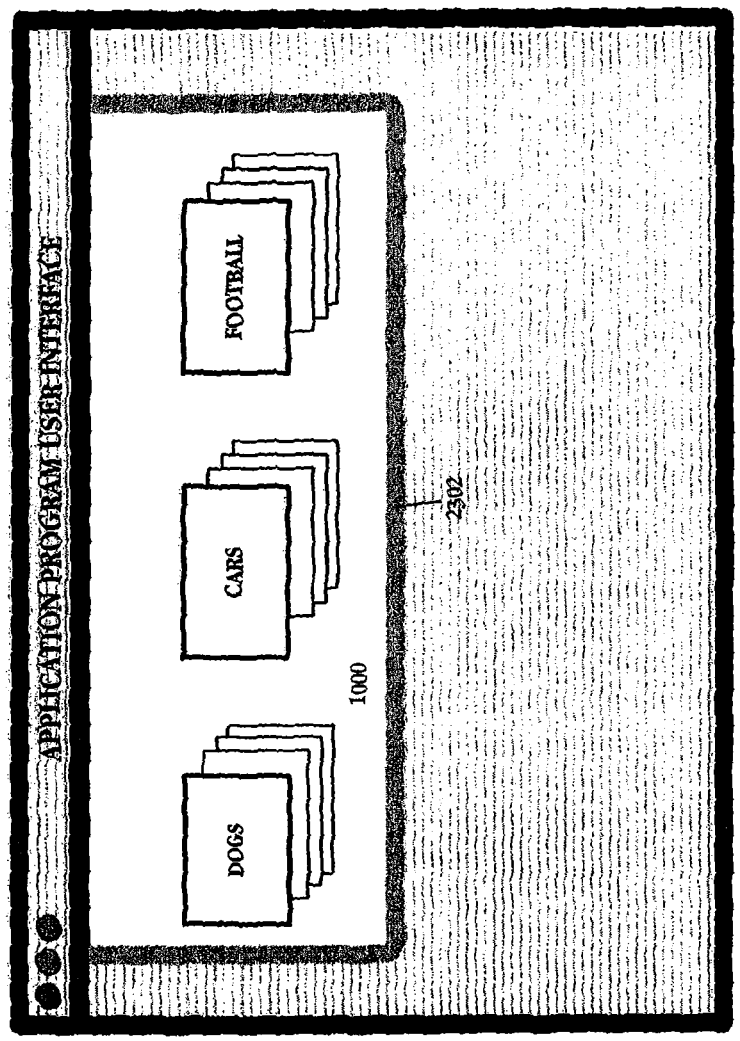
Figure 10F:
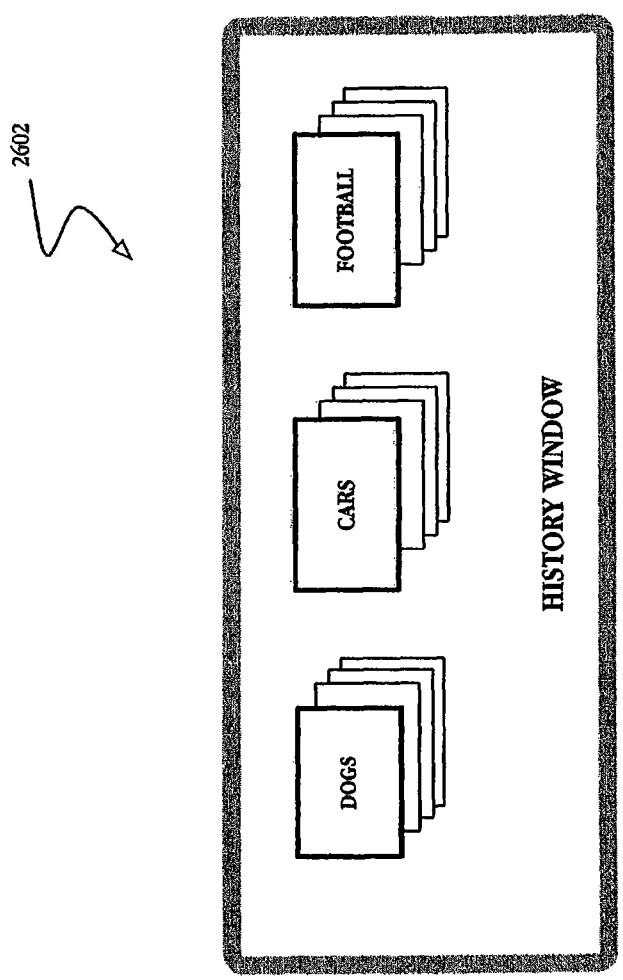
Figure 10G:
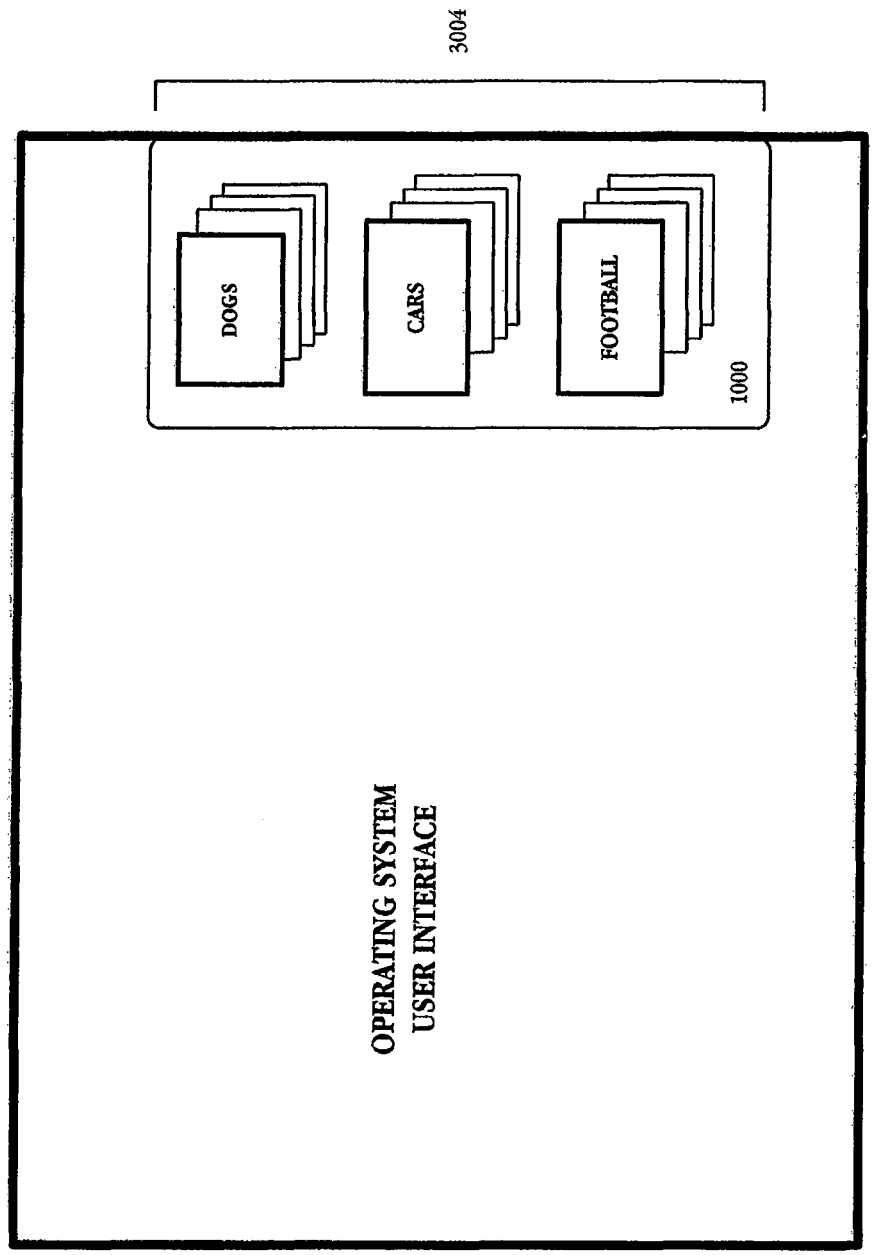
Figure 10H:
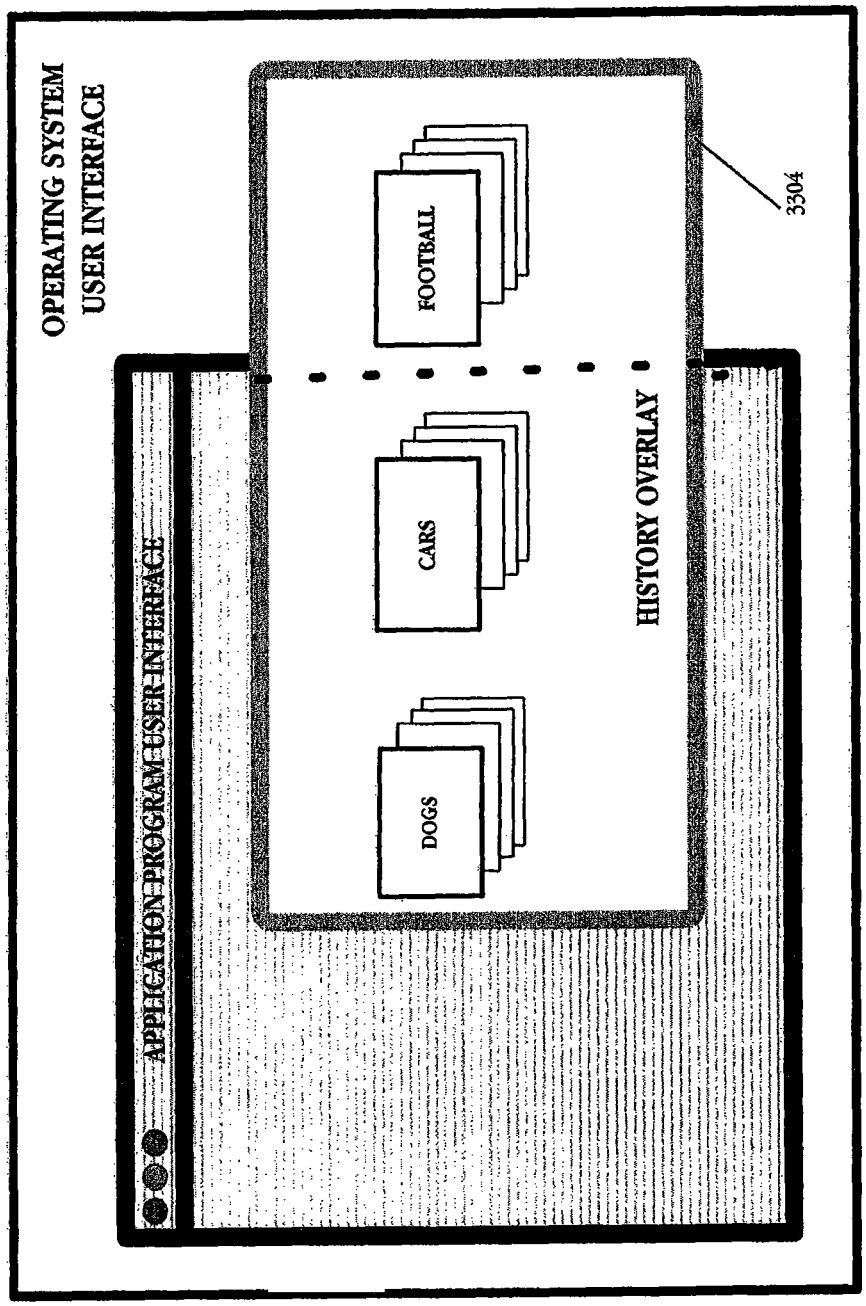

FIG. 10A is a diagram of an example user interface with a history list 1000 displayed in a drawer 1104. FIG. 10B is a diagram of an example user interface with the history list 1000 displayed in a panel 1502. FIG. 10C is a diagram of an example user interface with the history list 1000 displayed in a toolbar 1802, FIG. 10D is a diagram of an example user interface with the history list 1000 displayed a tab 2004. FIG. 10E is a diagram of an example user interface with the history list displayed in a sheet 2302. FIG. 10F is a diagram of an example user interface with the history list 1000 displayed in a window 2602. FIG. 10G is a diagram of an example user interface with the history list 1000 displayed in a strip 3004. FIG. 10H is a diagram of an example user interface in which the history list 1000 is displayed in an overlay 3304.

In addition to providing various user interfaces for displaying a history of previously accessed data items (including, but not limited to the user interfaces shown in FIGS. 10A-10H), embodiments of the invention also provide various representations for the previously accessed data items in the history. For each one of the example user interfaces shown in FIGS. 10A-10H, different ways to represent the data items in the history and different ways to organize the data items are illustrated in the following figures.

FIGS. 11-25 are diagrams of example graphical user interfaces in which a history of previously accessed data items is integrated with elements of an existing graphical user interface for an application program.

FIGS. 26-33 are diagrams of example graphical user interfaces in which the history of previously accessed data items is presented separate from the elements of an existing graphical user interface for an application program.

FIGS. 34-38 are diagrams of example graphical user interfaces for indicating the significance of a data item in a history of previously accessed data items.

Figure 39:
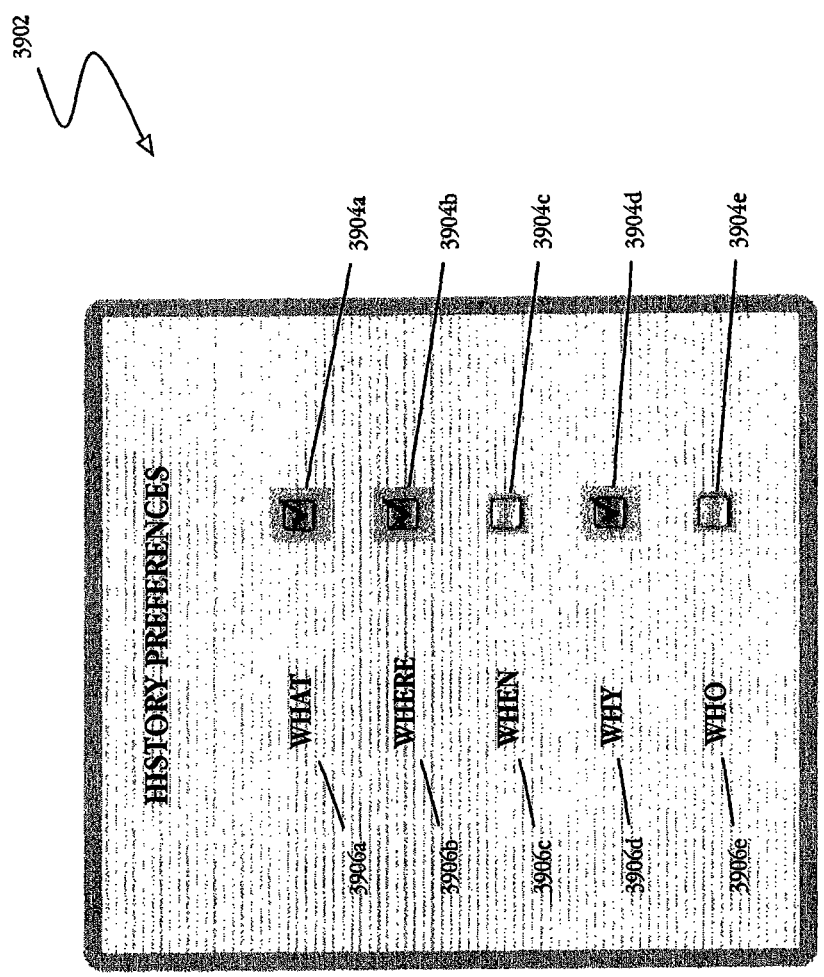
FIGS. 39, 40A, and 40B are diagrams of example graphical user interfaces for weighting information used to determine an organizational method for the previously accessed data items.

FIGS. 39-40 are diagrams of example graphical user interfaces for weighting information used to determine an organizational method for the previously accessed data items.

The example user interfaces illustrate alternate methods for organizing and presenting the web pages from the first example and the second example given at the beginning of the detailed description.

User Interfaces Integrated with an Application Program

FIGS. 11-25 described in this section illustrate examples of graphical user interfaces in which a history of previously accessed data items is integrated with elements of an existing graphical user interface for an application program. The example user interface elements described in this section include drawers, panels, toolbars, tabs and sheets.

Drawer.

FIGS. 11, 12, 13 and 14 are diagrams of an example graphical user interface for an application program in which a history of previously accessed data items is displayed in a drawer. The example embodiments shown in FIGS. 11, 12, 13 and 14 comprise a user interface having an application program window 1102 and at least one drawer 1104. The drawer 1104 is integrated with the program window 1102 and can be hidden or viewed as desired by a user. When the drawer 1104 is viewable, a history list of previously accessed data items is displayed in the drawer. The previously accessed data items represented in the history lists shown in FIGS. 11, 12, 13, and 14 are organized based on what content was viewed.

Figure 11:
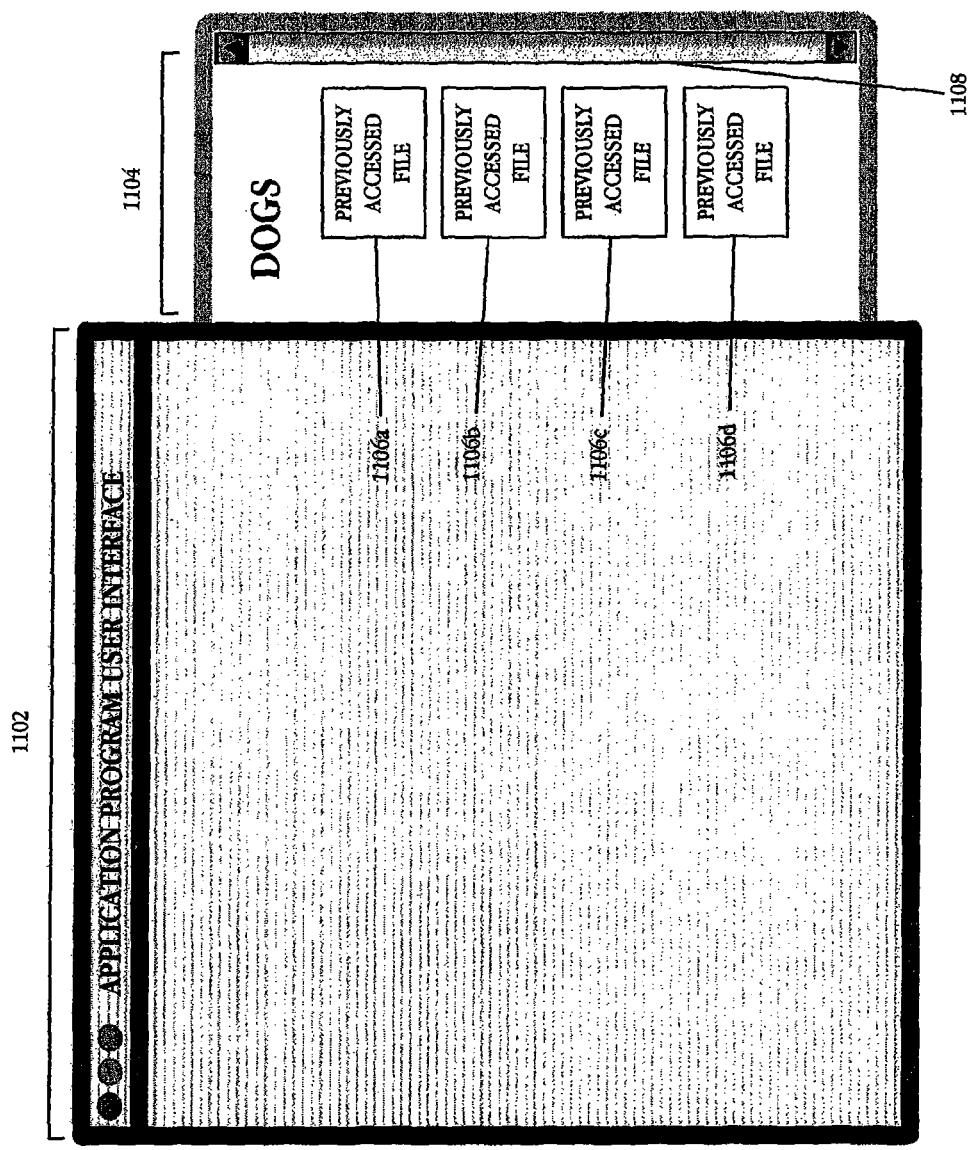
FIGS. 11-25 are diagrams of example graphical user interfaces in which a history of previously accessed data items is integrated with elements of an existing graphical user interface for an application program.

FIG. 11 is a diagram of an example graphical user interface with a history list organized around a single subject and presented in a drawer 1104. The individual items in the history list viewable in drawer 1104 can be represented in a number of ways including, but not limited to, thumbnails, icons, or meta-icons representing the previously accessed data items. In the example embodiment shown in FIG. 11, each previously accessed data item is represented in the history list by an icon or a thumbnail 1106a, 1106b, 1106c, and 1106d. Although only four previously accessed data items are represented in FIG. 11, embodiments of the invention are not limited to any particular number of previously accessed data items being displayed in a history list. When the history list includes more previously accessed data items than can be displayed in the viewable portion of the drawer 1104, a scroll bar 1108, or any other user interface element, is used to allow a user to view the additional items in the history list.

In the example embodiment shown in FIG. 11, the individual items in the history list viewable in drawer 1104 are organized based on information about what is the content of the individual items. The individual items used for this example are based on the web pages in the example at the beginning of the detailed description. From the first example at the beginning of the detailed description, the one common feature across some of the web pages viewed is the subject of "dogs." In the example embodiment shown in FIG. 11, each one of the icons or thumbnails 1106a, 1106b, 1106c, and 1106d represents a previously accessed data item that relates to the subject of "dogs."

In another embodiment, some but not all of the icons or thumbnails 1106a, 1106b, 1106c, and 1106d represent data items that relate to the subject of "dogs." For example, some of the data items may relate to the subject of "cars" or "football." In the case where the data items are organized around the single subject of "dogs," the relevance of each data item to the subject of dogs can be graphically indicated in the history list. A more detailed description of how to indicate the relevance or significance in a history list is described by reference to FIGS. 34-38.

Figure 12:
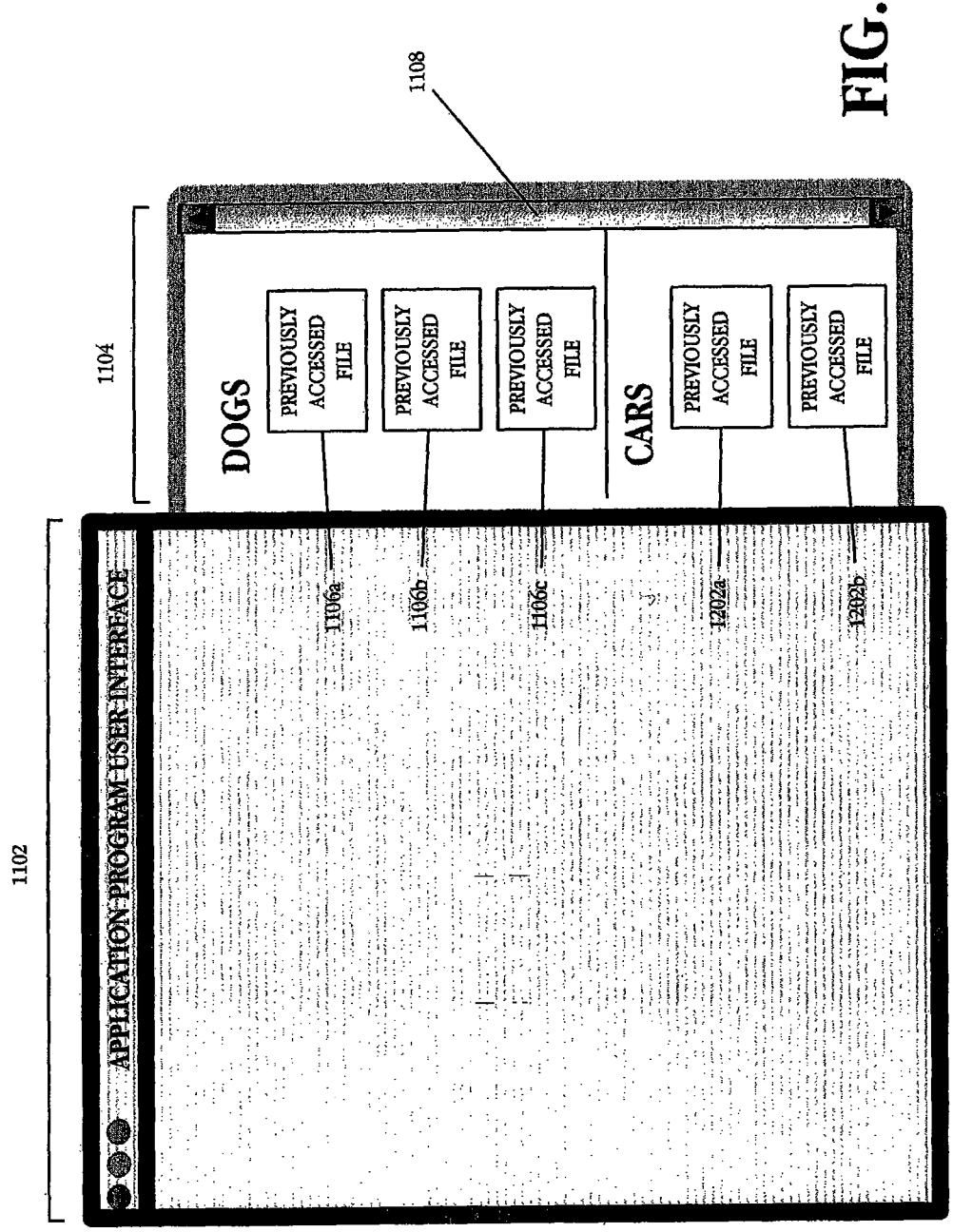

FIG. 12 is a diagram of an example graphical user interface with a history list organized based on more than one subject and presented as icons in the drawer 1104. From the first example at the beginning of the detailed description, two common subjects across the web pages viewed are "dogs" and "cars." In the example shown in FIG. 12, each one of the icons or thumbnails 1106a, 1106b, and 1106c represents a previously accessed data item that relates to the subject of "dogs." Each one of the icons or thumbnails 1202a and 1202b represents a data item that relates to the subject of "cars." In another embodiment, groups of data items related to additional subjects (such as the subject of "football") are viewable in the drawer 1104 by using the scroll bar 1108.

Figure 13:
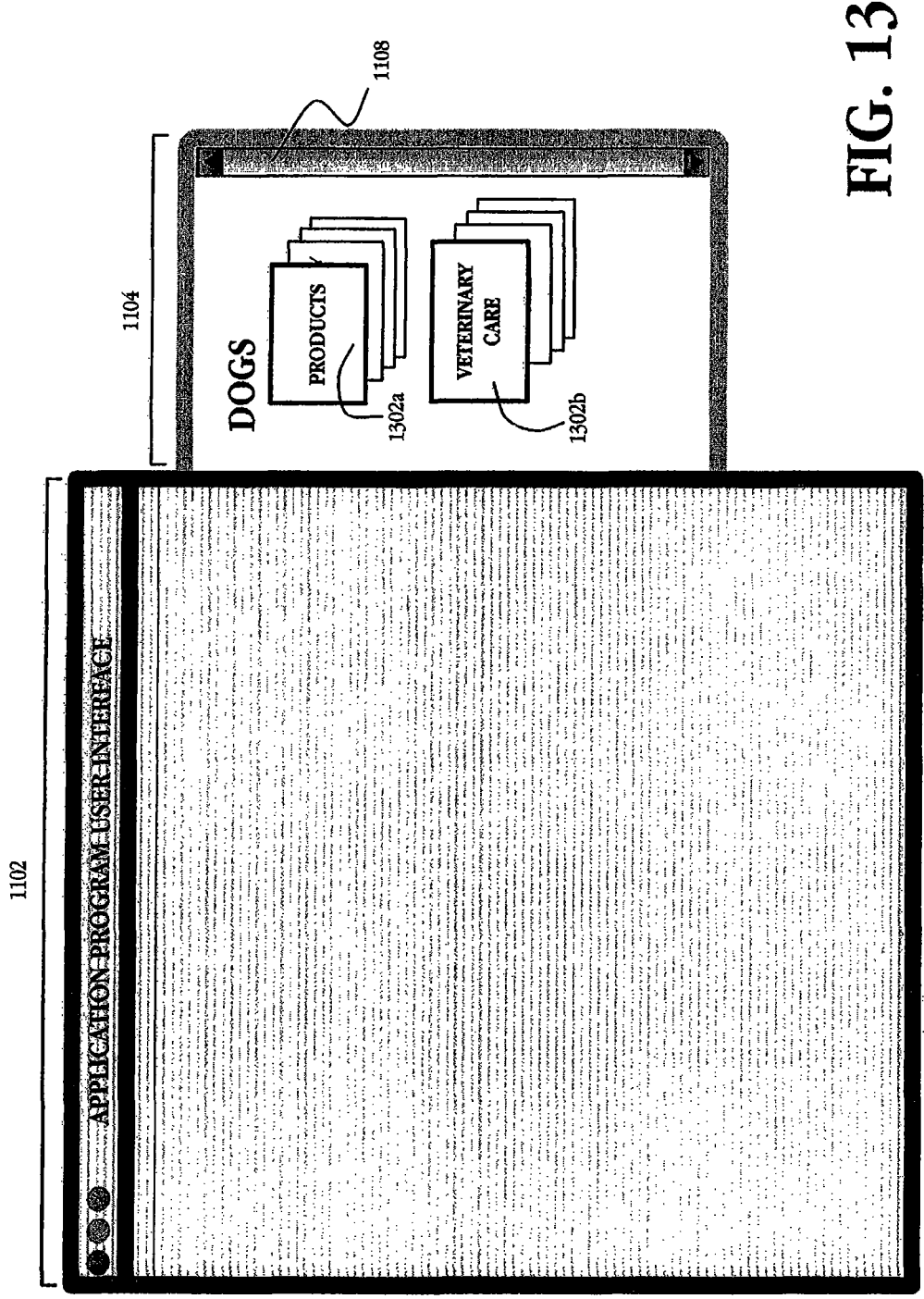

FIG. 13 is a diagram of an example graphical user interface with a history list organized based on a single subject and presented using meta-icons in the drawer 1104. In the first example from the beginning of the detailed description, one common subject across the web pages viewed is the subject of "dogs." In the example shown in FIG. 13, the common subject of "dogs," is similar to FIG. 11. However, in FIG. 11 the individual data items are presented in the history list as individual icons; in FIG. 13 the individual data items are organized by subtopics within the subject of "dogs." In this example, the subtopics are "products" and "veterinary care." The subtopics are represented by meta-icons 1302a and 1302b. The meta-icons 1302a, 1302b represent several different icons or thumbnails with a single icon. The icons or thumbnails represented by the meta-icon are displayed by selecting the meta-icon. If there are additional items in the history list, the additional items are viewable in the drawer 1104 by using the scroll bar 1108.

Figure 14:
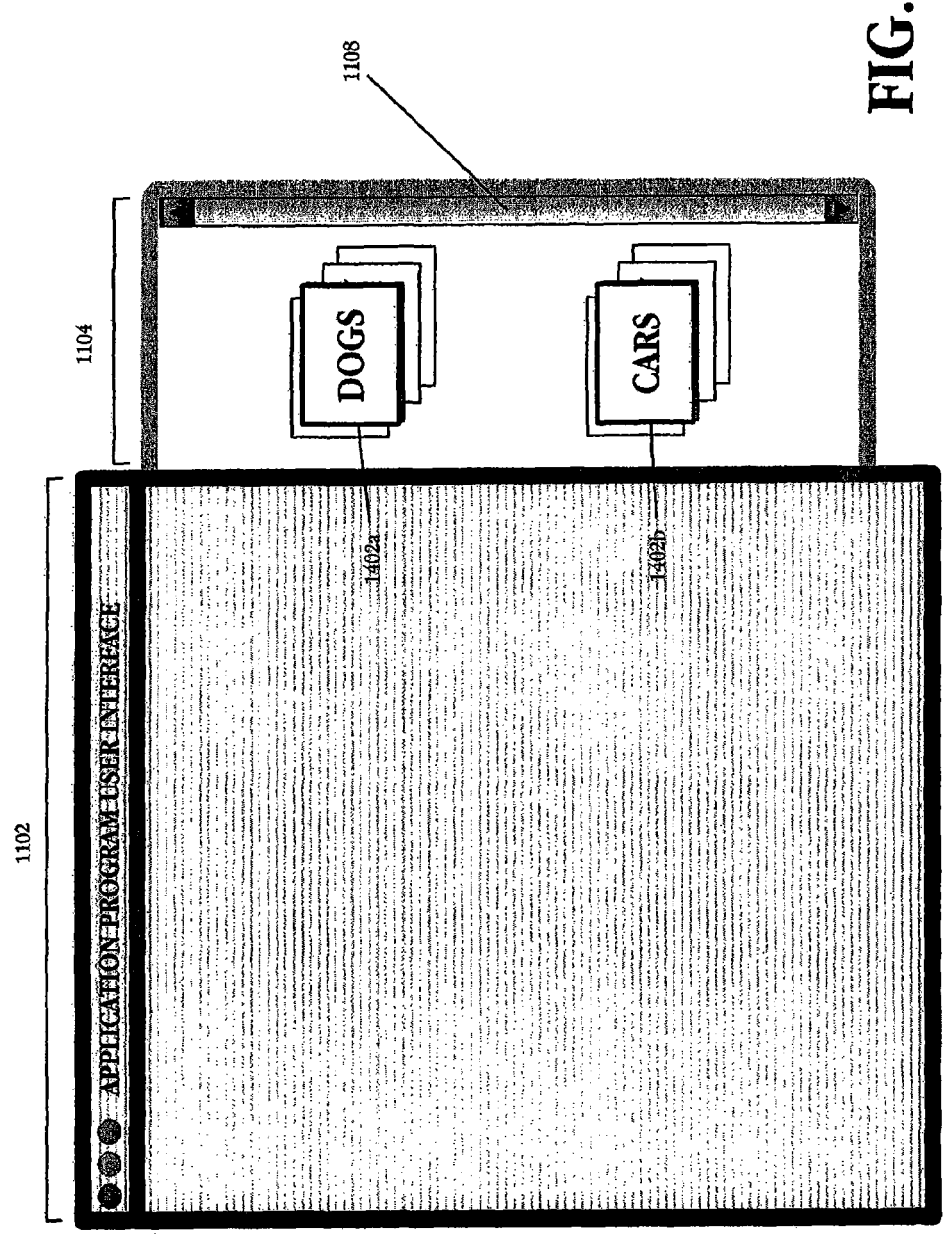

FIG. 14 is a diagram of an example graphical user interface with a history list organized based on more than one subject and presented using meta-icons in a drawer 1104. From the first example at the beginning of the detailed description, two common subjects across the web pages viewed are "dogs" and "cars," similar to FIG. 12. However, in FIG. 14 each one of the individual data items within each subject are not presented in the history list as individual icons or thumbnails. Instead, in FIG. 14 the individual data items are represented with meta-icons 1402a, 1402b. The meta-icon 1402a represents several different icons or thumbnails for individual data items related to the subject of "dogs." The meta-icon 1402b represents several different icons or thumbnails for individual data items related to the subject of "cars." In another embodiment meta-icons representing data items related to additional subjects (such as the subject of "football") are viewable in the drawer 1104 by using the scroll bar 1108.

The example embodiments described by reference to FIGS. 11, 12, 13 and 14 comprise a user interface having an application program window 1102 and at least one drawer 1104. Although the example embodiments are shown with the drawer 1104 on the right side of the application program window 1102, embodiments of the invention are not limited to the drawer being placed in any particular location. For example, in some embodiments the drawer 1104 appears on a different side of the application program window 1102 when the drawer is visible. Embodiments of the invention are also not limited to a single drawer 1104. For example, in alternate embodiments, the application program window 1102 has more than one drawer and has any number of representations of previously accessed data items within each drawer.

Panel.

Figure 15:
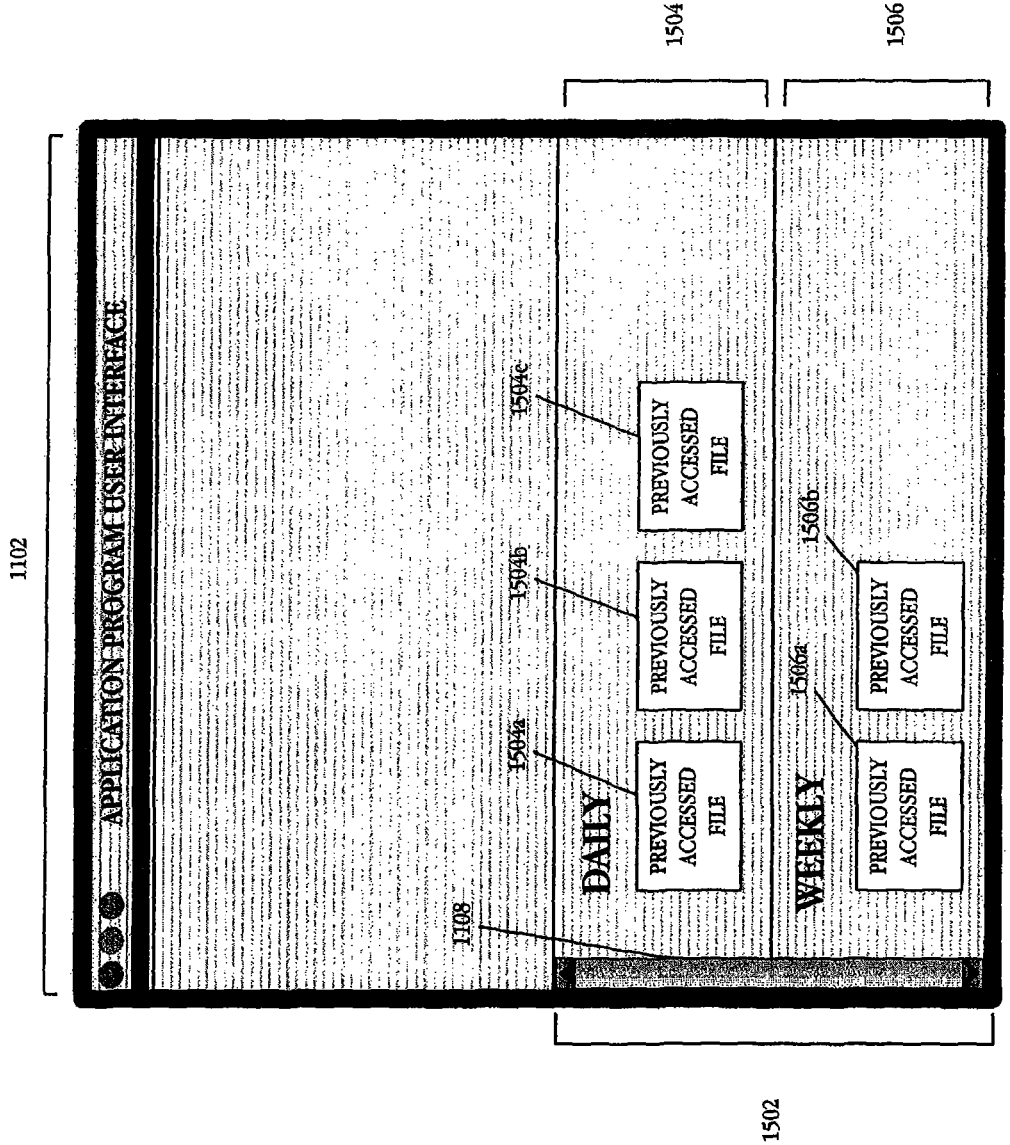
Figure 16:
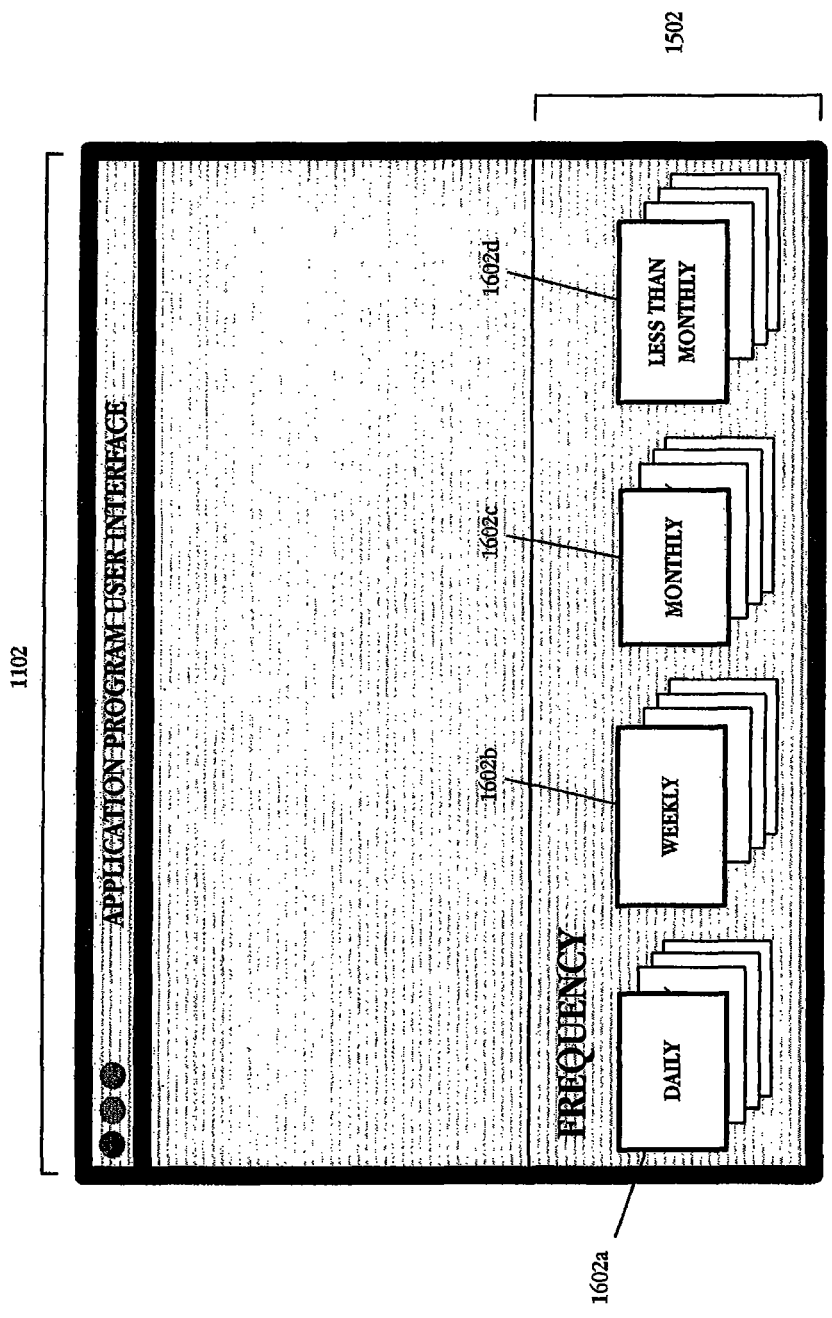
Figure 17:
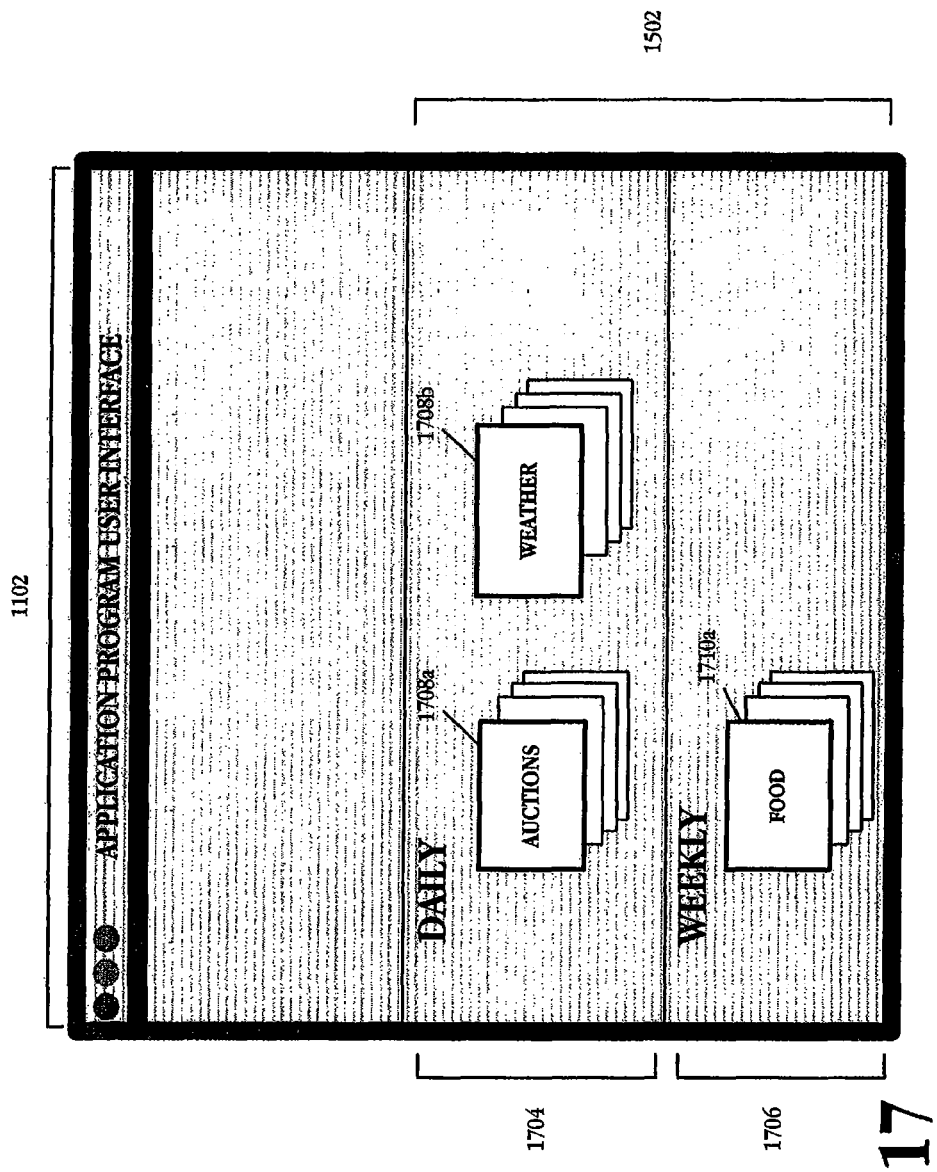

FIGS. 15, 16, and 17 are diagrams of an example graphical user interface for an application program in which a history of previously accessed data items is displayed in a panel. The example embodiments shown in FIGS. 15, 16, and 17 comprise a user interface having an application program window 1102 and at least one panel 1502. The panel 1502 is a defined region of the application program window 1102. A history list of previously accessed data items is displayed in the panel 1502. The individual items in the history list viewable in panel 1502 can be represented in a number of ways including, but not limited to, thumbnails, icons, or meta-icons representing the previously accessed data items.

In the example embodiment shown in FIGS. 15, 16, and 17, the items in the history list that are viewable in panel 1502 are organized based on information about when the data items were accessed. The individual items used for this example are based on the web pages in the example at the beginning of the detailed description. From the second example at the beginning of the detailed description, one common feature across some of the web pages is the frequency that the user views the web pages. The frequency that the user views the web pages is daily, weekly, monthly and less than once a month.

FIG. 15 is a diagram of an example graphical user interface with a history list that is organized based on when the data items were accessed and that is presented using icons in a panel 1502. In this example, the panel 1502 comprises a first group 1504 and a second group 1506 of previously accessed data items in the history list. The first group 1504 contains individual icons or thumbnails of the data items that were accessed daily 1504a, 1504b, 1504c (i.e., http://www.ebay.com; http://www.weather.com; and http://www.myfamily.com). The second group 1506 contains individual icons or thumbnails of previously accessed data items that were accessed weekly 1506a, 1506b (i.e., http://www.simondelivers.com; and http://www.cookinglight.com). In another embodiment, groups of data items related to additional categories of frequency (e.g., monthly, less than once a month, and so on) are viewable in the panel 1502 by using the scroll bar 1108.

FIG. 16 is a diagram of an example graphical user interface with a history list presented using meta-icons in a panel 1502 and organized based on when the data items were accessed. In the example shown in FIG. 16, the data items are organized based on the frequency of access of the data items similar to FIG. 15. However, in FIG. 16 each one of the individual data items are not presented in the history list as individual icons or thumbnails. Instead, in FIG. 16 the individual data items are organized into categories and each category is represent by a meta-icon. The meta-icons represent several different icons or thumbnails with a single icon. A first meta-icon 1602a represents web pages that were accessed daily. A second meta-icon 1602b represents web pages that were accessed weekly. A third meta-icon 1602c represents web pages that were accessed monthly. A fourth meta-icon 1602d represents web pages that were accessed less than once a month. The icons or thumbnails represented by one of the meta-icons are displayed by selecting the meta-icon. Note that the example shown in FIG. 16 differs from the example graphical user interface shown in FIG. 2. The example in FIG. 2 presents the history list in a separate window from the application program (i.e., the web browser) as compared to FIG. 16 that presents the history list in a panel 1502 that is part of the application program window 1102.

FIG. 17 is a diagram of an alternate example graphical user interface with a history list presented using meta-icons in a panel 1502 and organized based on when the data items were accessed. In the example shown in FIG. 17, the previously accessed data items are represented in the panel 1502. In this example the panel 1502 comprises a first group 1704 and a second group 1706. The first group 1704 comprises meta-icons representing web pages that are accessed daily. The second group 1706 comprises meta-icons representing web pages that are accessed weekly.

In the example shown in FIG. 17, the web pages are first organized into groups based on frequency, then the web pages within each group 1704, 1706 are organized into subgroups according to a different organizational method. The organizational method for the subgroups within the first group 1704 and the second group 1706 is dynamically determined from information about the data items in the first group and the second group. In this example, the organizational method for data items in the first group 1704 and second group 1706 is based on what was viewed (i.e., the subject matter). The first group 1704 comprises a first meta-icon representing data items related to the subject of "auctions" 1708a and a second meta-icon representing data items related to the subject of "weather" 1708b. Each one of the data items represented by the first meta-icon 1708a and the second meta-icon 1708b are data items that are accessed daily. The second group 1706 comprises a first meta-icon representing data items related to the subject of "food" 1710a. Each one of the data items represented by the first meta-icon 1710a are data items that are accessed weekly. In this example the same organizational method is used for data items in both groups 1704, 1706. However, in alternate embodiments, data items in different groups may be organized according to different organizational methods.

Although only one or two panel groups are shown in FIGS. 15, 16, and 17, embodiments of the invention are not limited to any particular number of panel groups. A history list may include any number of panel groups and any number of representations of previously accessed data items within each panel group.

Toolbar.

Figure 18:
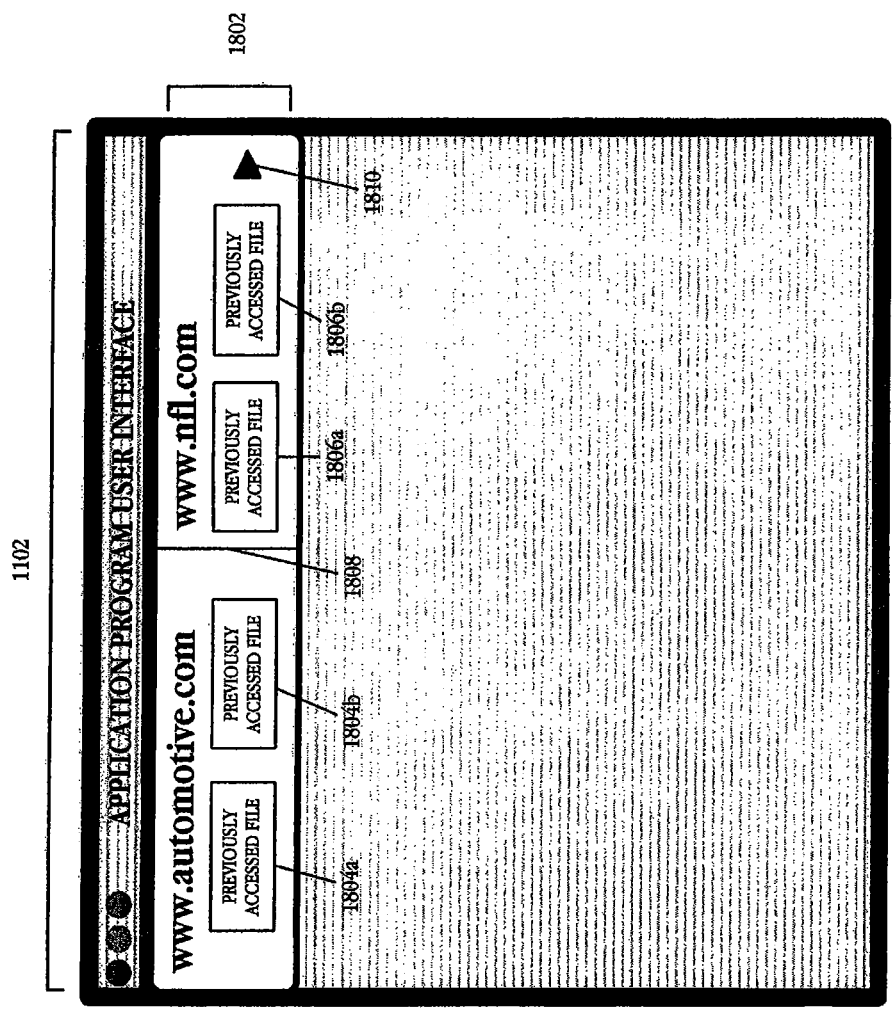
Figure 19:
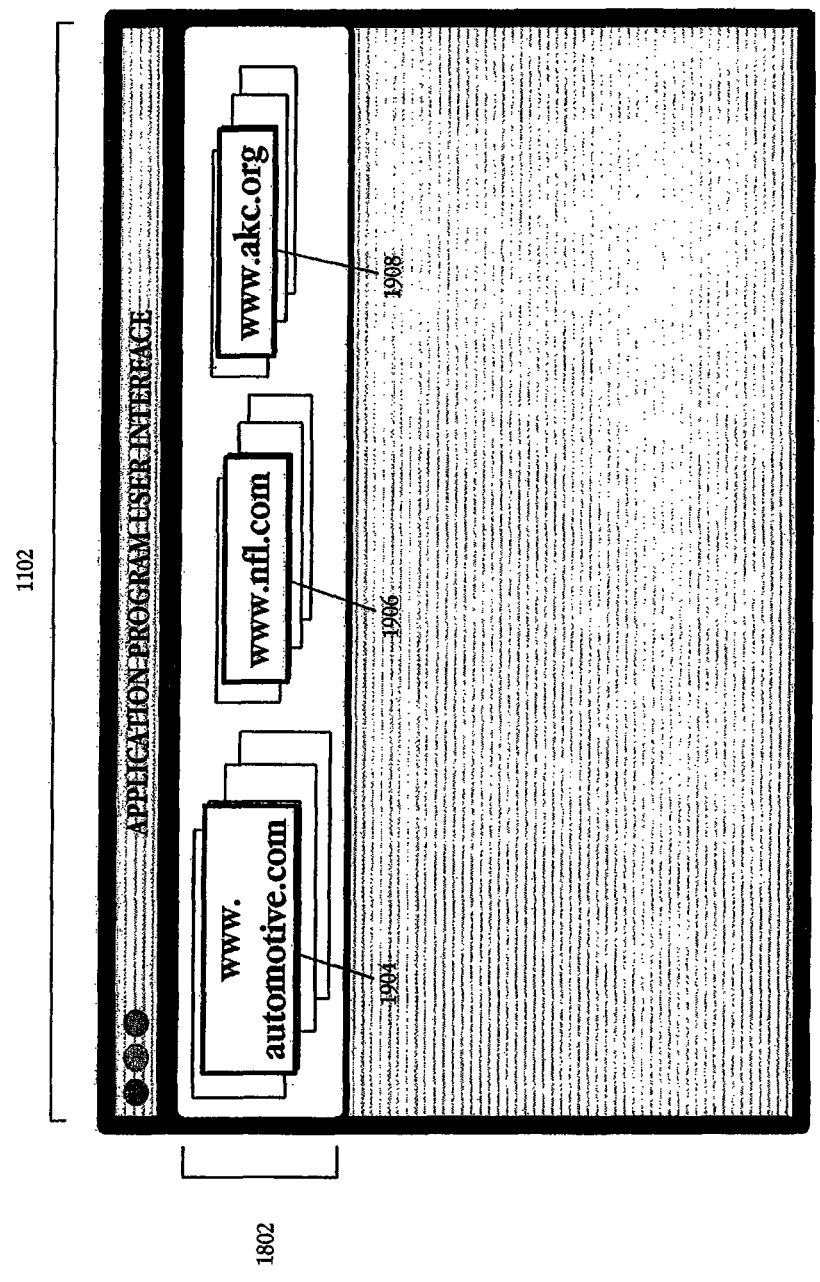

FIGS. 18 and 19 are diagrams of an example graphical user interlace for an application program in which a history of previously accessed data items is displayed in a toolbar. The example embodiments described by reference to FIGS. 18 and 19 comprise a user interface having an application program window 1102 and at least one toolbar 1802. A history list of previously accessed data items is displayed in the toolbar 1802. Although the example embodiments are shown with the toolbar 1802 near the upper edge of application program window 1102, embodiments of the invention are not limited to the toolbar being placed in any particular location. For example, in some embodiments the toolbar 1802 appears as a vertical column or a horizontal column along a side edge or a lower edge of the application program window 1102. In some embodiments, the toolbar 1802 is always visible while the application program is in use. In other embodiments, the application program has settings for the user to control whether or not the toolbar 1802 is displayed. Embodiments of the invention are also not limited to a single toolbar 1802. For example, in some embodiments, the application program window 1102 has more than one toolbar.

In the example embodiments shown in FIGS. 18 and 19, the items in the history list that are viewable in toolbar 1802 are organized based on where the data items were accessed. From the first example at the beginning of the detailed description, some of the web pages viewed have a common home page. Two of the automotive web pages have the same home page http://www.automotive.com; two of the football web pages have the same homepage http://www.nfl.com; and, two of the dog web pages have the same homepage http://www.akc.org.

FIG. 18 is a diagram of an example graphical user interface with a history list presented using a toolbar 1802 and organized based on where the data items were accessed. In this example, the toolbar comprises icons or thumbnails 1804a, 1804b, 1806a, 1806b representing data items in a history list. Embodiments of the invention are not limited to icons or thumbnails to represent data items in the history list. In alternate embodiments, any graphical representation can be used on the toolbar including meta-icons, buttons, and so on. For the example shown in FIG. 18, the toolbar 1802 uses one or more dividers 1808 to group the icons for web pages having the same home page. A first group of icons 1804a, 1804b represent previously accessed web pages having a first common home page (e.g., www.automotive.com). A second group of icons 1806a, 1806b represent previously accessed web pages having a second common home page (e.g., www.nfl.com). The first group of icons and the second group of icons are separated by the divider 1808. In some embodiments, the toolbar 1802 provides a user interface element, such as an arrow 1810, to allow the user to view additional items on the toolbar. In this example, selecting the user interface element 1810 displays a third group of icons representing previously accessed web pages having a third common home page (e.g., www.akc.org).

FIG. 19 is a diagram of an alternate graphical user interface with a history list presented using a toolbar 1802 and organized based on when the data items were accessed. In this example, the toolbar comprises meta-icons 1904, 1906, 1908 representing common home pages of previously accessed data items. A first meta-icon 1904 represents a first common home page (e.g., www.automotive.com). A second meta-icon 1906 represents a second common home page (e.g., www.nfl.com). A third meta-icon 1908 represents a third common home page (e.g., www.akc.org). The previously accessed web pages from the first, second and third common home pages can be viewed by selecting the appropriate meta-icon 1904, 1906, 1908 on toolbar 1802.

Tab.

Figure 20:
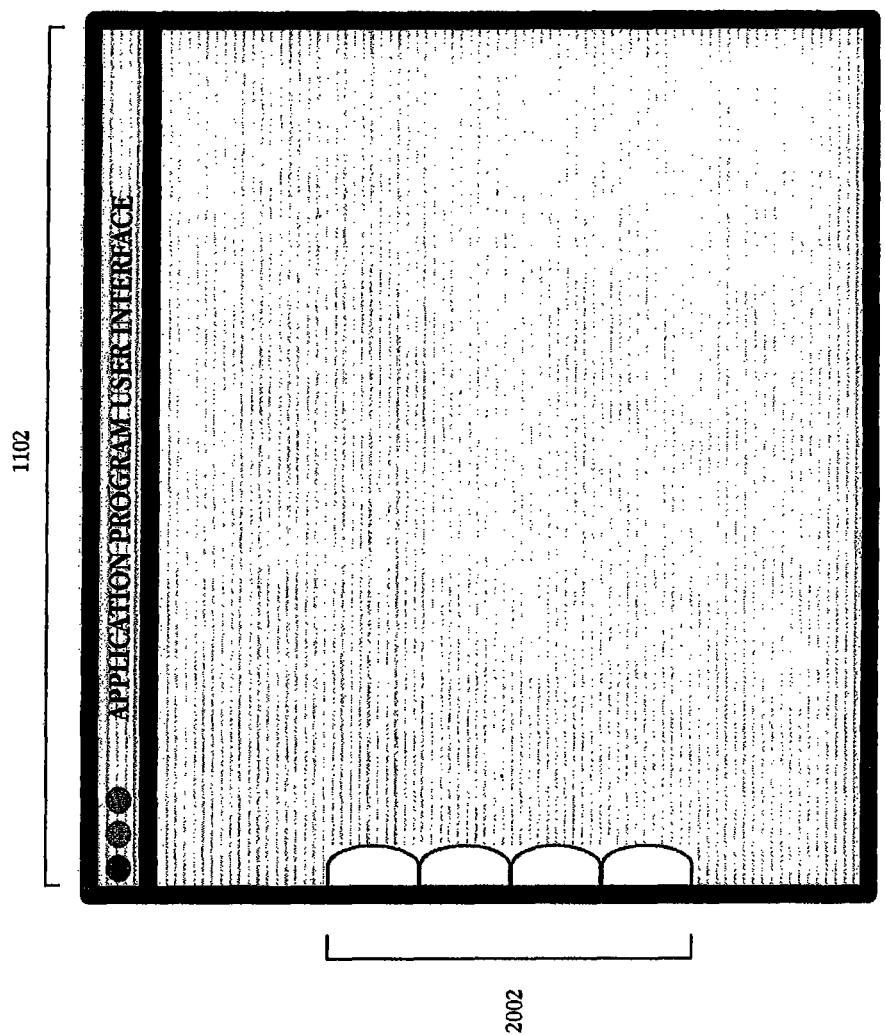
Figure 21:
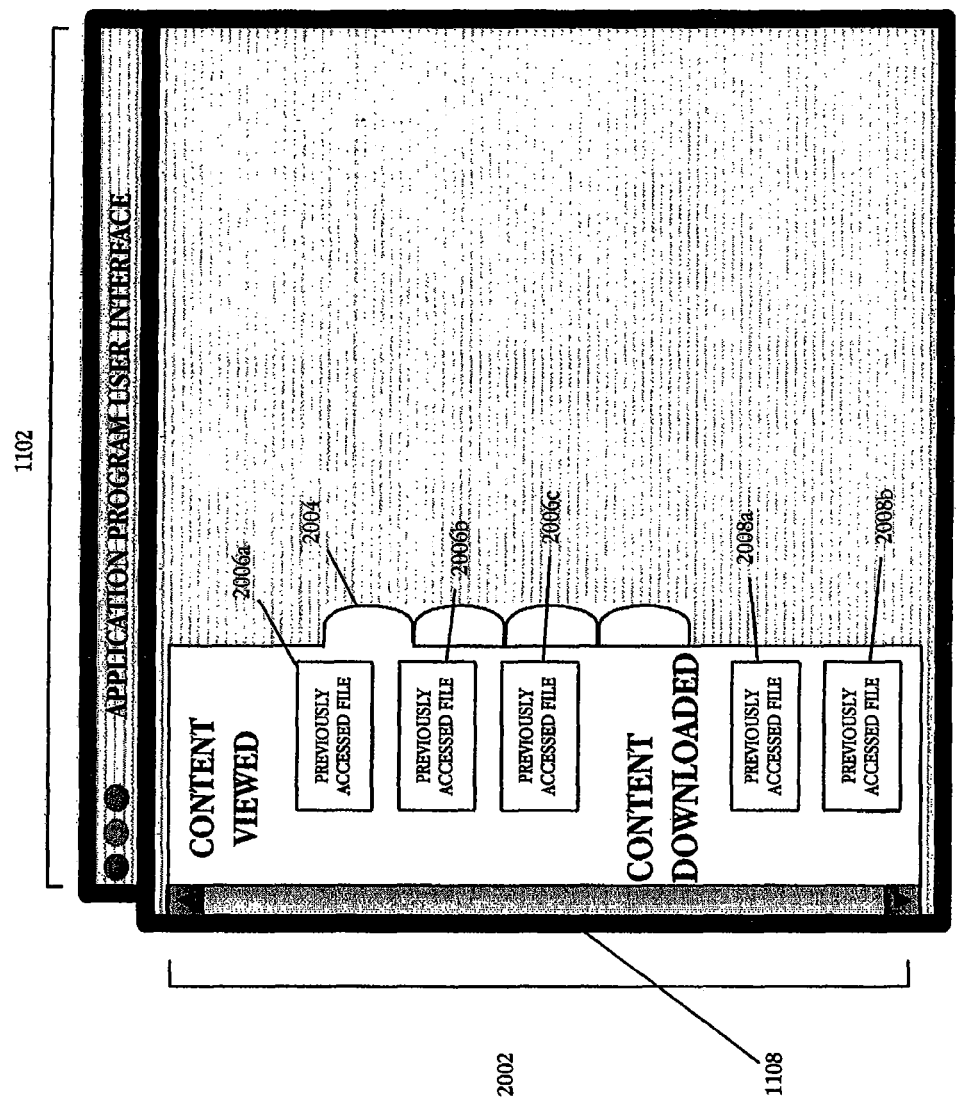
Figure 22:
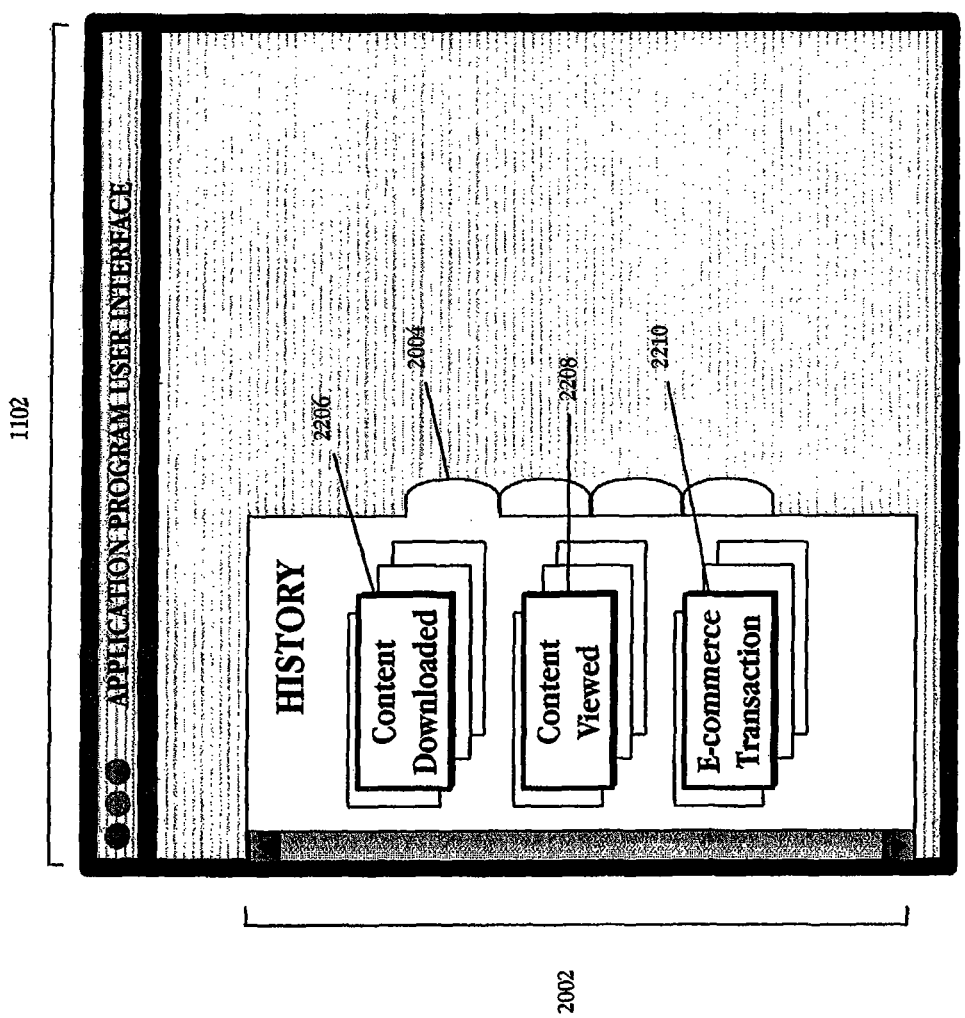

FIGS. 20, 21, and 22 are diagrams of an example graphical user interface for an application program in which a history of previously accessed data items is displayed in one or more tabs. The example embodiments described by reference to FIGS. 20, 21, and 22 comprise a user interface having an application program window 1102 and one or more tabs 2002. The one or more tabs 2002 are integrated with the program window 1102 and have content that can be hidden or viewed as desired by a user. When the content of one of the one or more tabs 2002 is viewable, a history list of previously accessed data items is displayed. The previously accessed data items represented in the history lists shown in FIGS. 20, 21, and 22 are organized based on why the content was viewed.

FIG. 20 is a diagram of an example graphical user interface with four tabs 2002. The tabs shown in FIG. 20 are in a position within the application program window 1102 such that the content of the tabs is not visible.

FIG. 21 is a diagram of the graphical user interface of FIG. 20 with a history list presented in one of the tabs 2002 and organized based on why the data items were accessed. The history list is shown in the history tab 2004 that is visible in the application program window 1102. The history tab 2004 comprises icons or thumbnails 2006a, 2006b, 2006c, 2008a, 2008b representing data items in a history list. A first group of icons 2006a, 2006b, 2006c represent web pages that were accessed for the purpose of viewing content on the web page. A second group of icons 2008a, 2008b represent web pages that were accessed for the purpose of downloading content from the web page. In some embodiments, the history tab 2004 provides a user interface element, such as a scroll bar 1108, to allow the user to view additional items on the tab. In this example, selecting the user interface element 1108 displays a third group of icons representing web pages that were accessed to conduct electronic commerce ("e-commerce") transactions seen in FIG. 22.

FIG. 22 is a diagram of an alternate graphical user interface with a history list presented in one of the tabs 2002 and organized based on why the data items were accessed. In this example the history tab 2004 comprises meta-icons 2206, 2208, 2210 representing previously accessed data items. A first meta-icon 2206 represents web pages accessed for the purpose of downloading content from the web page. A second meta-icon 2208 represents web pages accessed for the purpose of viewing content on the web page. A third meta-icon 2210 represents web pages accessed for the purpose of conducting e-commerce transactions. Selecting one of the meta-icons 2206, 2208, 2210 on the history tab 2004 in application program window 1102 displays icons or thumbnails for the web pages represented by the meta-icon.

In the both the first and the second example at the beginning of the detailed description, all of the web pages were accessed for the same reason—to view the content. Sorting the web pages based on why they were accessed and presenting the history list in a tab such as the history tab 2004 in FIG. 21 and FIG. 22 would result in all of the previously accessed web pages being organized in the same group. In the example shown in FIG. 21, the previously accessed web pages from the both the first and second example at the beginning of the detailed description would be included with the first group of icons 2006a, 2006b, 2006c. In FIG. 21 the first group of icons represent web pages that were accessed for the purpose of viewing content on the web page. In the example shown in FIG. 22, the previously accessed web pages from the example at the beginning of the detailed description would be included with the web pages represented by the second meta-icon 2208. In FIG. 22 the second meta-icon represents web pages accessed for the purpose of viewing content.

The example embodiments shown in FIGS. 20, 21 and 22 have one or more tabs 2002 near the left edge of application program window 1102. However, embodiments of the invention are not limited to the tabs being placed in any particular location. In other embodiments the tabs appear along any edge of the application program window 1102. In some embodiments, the tabs are always visible while the application program is in use. In other embodiments, the application program has settings for the user to control whether or not the tabs are displayed.

Sheet.

Figure 23:
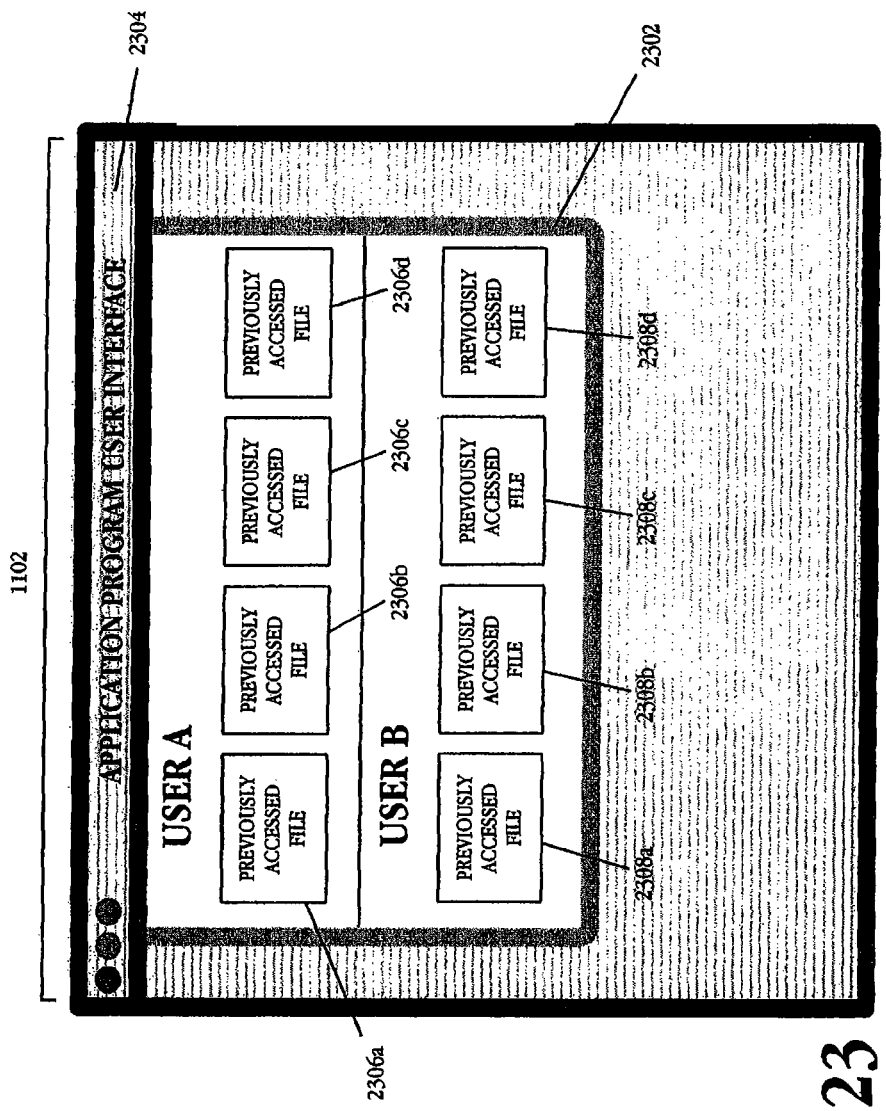
Figure 24:
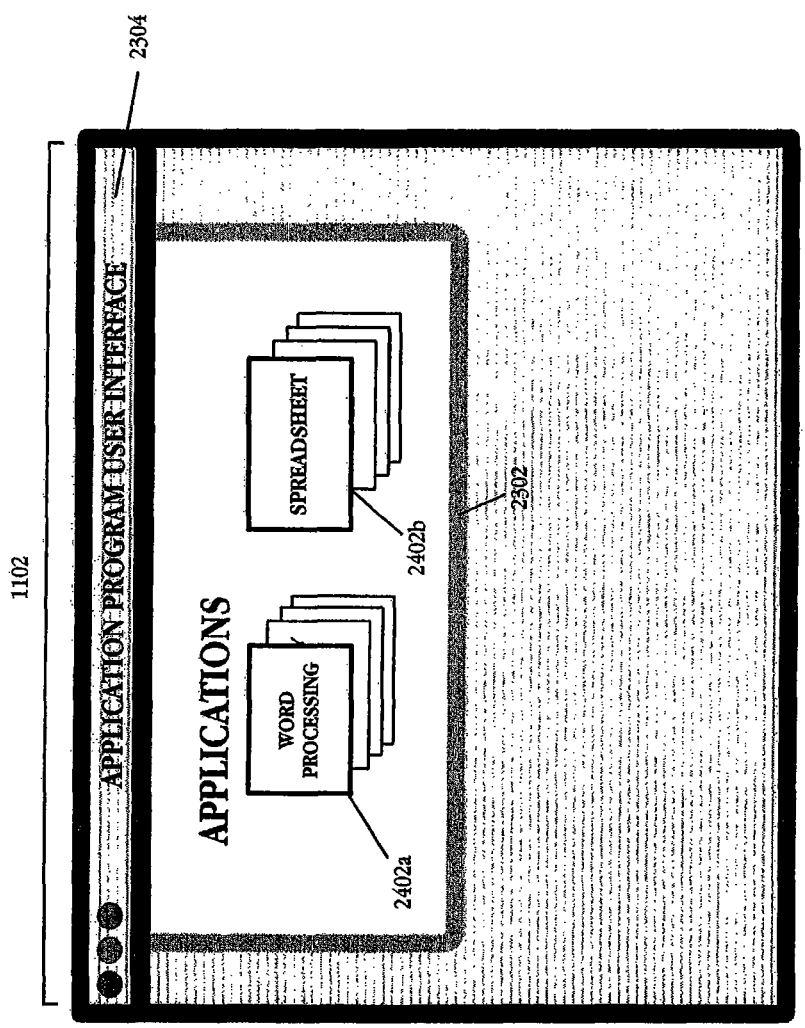
Figure 25:
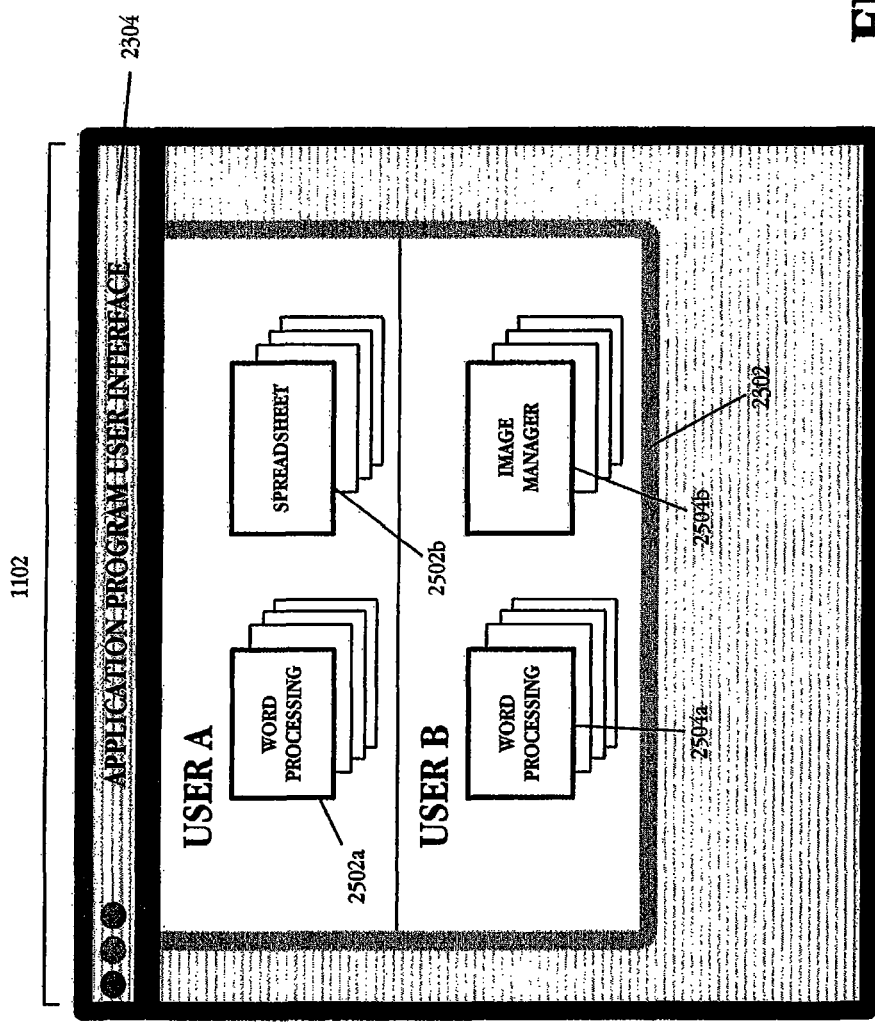

FIGS. 23, 24 and 25 are diagrams of an example graphical user interface for an application program in which a history of previously accessed data items is displayed in a sheet. The example embodiments described by reference to FIGS. 23, 24 and 25 comprise a user interface having an application program window 1102 and a sheet 2302. A sheet 2302 is an animated user interface element attached to a title bar 2304 of an application program window 1102. The sheet 2302 appears directly from, and disappears back to, the title bar 2304 of the application program window 1102. A history list of previously accessed data items is displayed in the sheet 2302.

The previously accessed data items represented in the history lists shown in FIGS. 23, 24 and 25 are organized based on who viewed the content. In some embodiments, who viewed the content of previously accessed data items includes users who accessed the data items (e.g., created, viewed, or modified the data files). In other embodiments, who viewed the content of previously accessed data items includes applications that accessed the data items (e.g., created, opened, or modified the data files). In the both the first and second example at the beginning of the detailed description, the web pages were accessed by the same application (a web browser) and by the same person on an individual computer (Henry and Maggie are working on different computers). Sorting the web pages based on who accessed the web page would not have helped to make particular web pages in the browsing history easier to retrieve because the web pages would all be in the same group.

FIG. 23 is a diagram of an example graphical user interface with a history list presented in a sheet 2302 and organized based on a user who accessed the data items. When the sheet 2302 is visible, the sheet 2302 appears from the title bar 2304 of application program window 1102. The sheet 2302 comprises icons or thumbnails representing data items in a history list. The history list shown in sheet 2302 of FIG. 23 is organized based on the user that viewed the data item. A first group of icons 2306a, 2306b, 2306c, 2306d represents data items accessed by a first user ("User A"). A second group of icons 2308a, 2308b, 2308c, 2308d represents data items accessed by a second user ("User B").

FIG. 24 is a diagram of an alternate graphical user interface with a history list presented in a sheet 2302 and organized based on an application program that accessed the data items. The sheet 2302 appears from the title bar 2304 of application program window 1102. The sheet comprises meta-icons 2402a, 2402b representing data items in a history list. The history list shown in sheet 2302 of FIG. 24 is organized based on the application that accessed the data items. The first meta-icon 2402a represents data items accessed by a word processing application. The second meta-icon 2402b represents data items accessed by a spreadsheet application.

FIG. 25 is a diagram of another graphical user interface with a history list presented in sheet 2302 and organized based on both the user and the application program that accessed the data items. The sheet 2302 appears from the title bar 2304 of application program window 1102. In the example shown in FIG. 25, the data items are first organized into groups based on the user who accessed the data items, and then the data items within each group are organized into meta-icons based on the application program used to access the data item. The sheet 2302 comprises a first group of meta-icons 2502a, 2502b and a second group of meta-icons 2504a, 2504b. The first group of meta-icons 2502a, 2502b represent data items accessed by a first user ("User A"). Within the first group of meta-icons, the first meta-icon 2502a represents data items accessed by User A using a word processing program. The second meta-icon 2502b represents data items accessed by User B using a spreadsheet program. The second group of meta-icons 2504a, 2504b represent data items accessed by a second user ("User B"). Within the second group of meta-icons, the first meta-icon 2504a represents data items accessed by User B using a word processing program. The second meta-icon 2504b represents data items accessed by User B using an image manager program.

FIGS. 11-25 described above illustrate examples of graphical user interfaces in which a history of previously accessed data items is integrated with elements of an existing graphical user interface for an application program. The example user interface elements described above include drawers (FIGS. 11, 12, 13, 14), panels (FIGS. 15, 16, 17), toolbars (FIGS. 18,19), tabs (FIGS. 20, 21, 22) and sheets (FIGS. 23, 24, 25). Embodiments of the invention are not limited to drawers, panels, toolbars, tabs and sheets integrated with an application program window. Any user interface element that is integrated with a window for an application program, and that is used to display graphical representations of previously accessed data items, can be used.

User Interfaces Separate from an Application Program

The next group of figures in this section illustrates examples of graphical user interfaces that are separate from an application program window. FIGS. 26-33 are described below. FIGS. 26-33 are diagrams of example graphical user interfaces in which a history of previously accessed data items is presented separate from the elements of an existing graphical user interface for an application program.

Window.

FIGS. 26, 27, 28 and 29 are diagrams of an example graphical user interface in which a history of previously accessed data items are displayed in a window. The example embodiments shown in FIGS. 26, 27, 28 and 29 comprise a window 2602 that is separate from the application program. The window 2602 displays a history list of previously accessed data items. The previously accessed data items represented in the history lists shown in FIGS. 26, 27, 28, and 29 are organized based on what content was viewed. The individual items used for this example are based on the web pages in the first example at the beginning of the detailed description.

Figure 26:
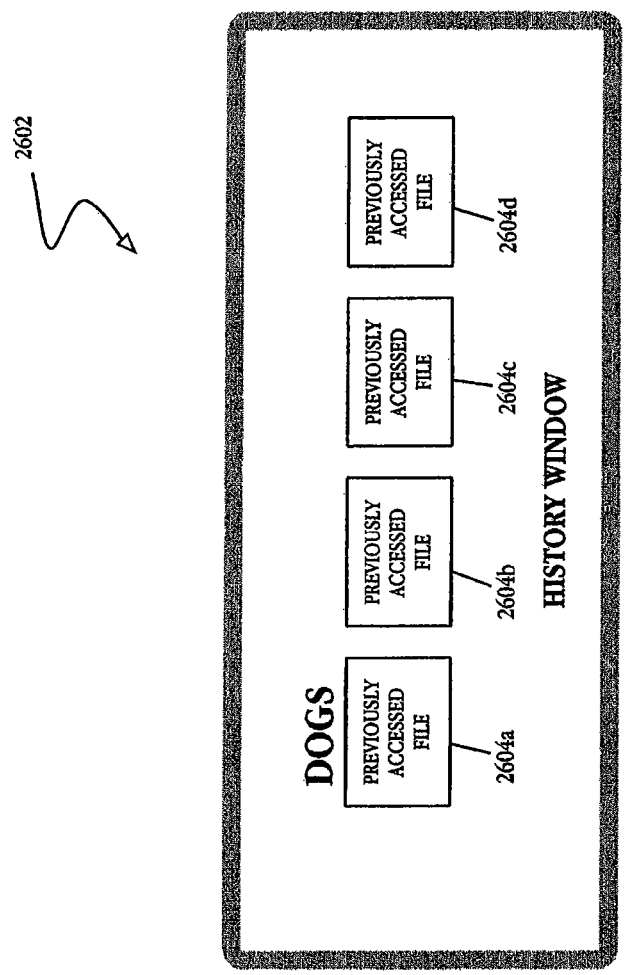
FIGS. 26-33 are diagrams of example graphical user interfaces in which the history of previously accessed data items is presented separate from the elements of an existing graphical user interface for an application program.

FIG. 26 is a diagram of an example graphical user interface with a history list organized around a single subject and presented in a window 2602. In the example embodiment shown in FIG. 26, each previously accessed data item is represented in the history list by an icon or a thumbnail 2604a, 2604b, 2604c, and 2604d. From the first example at the beginning of the detailed description, the one common feature across some of the web pages viewed is the subject of "dogs." In the example embodiment shown in FIG. 26, each one of the icons or thumbnails 2604a, 2604b, 2604c, and 2604d represents a previously accessed data item that relates to the subject of "dogs."

Figure 27:
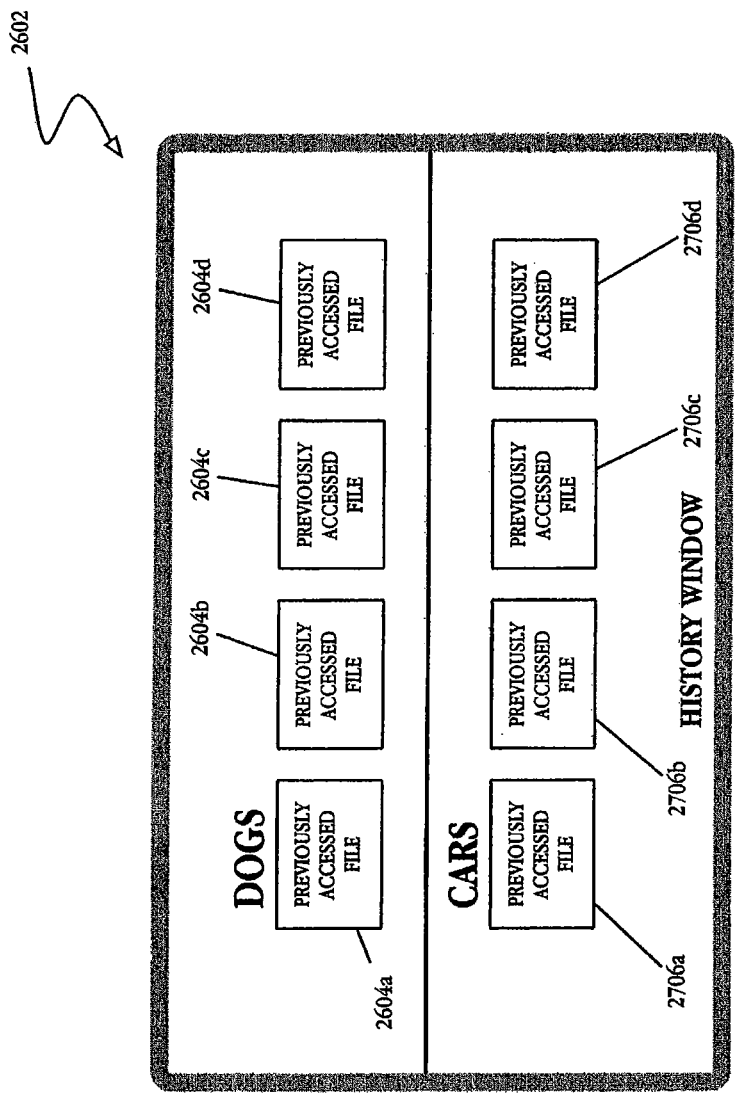

FIG. 27 is a diagram of an example graphical user interface with a history list organized based on more than one subject and presented in the window 2602. From the first example at the beginning of the detailed description, two common subjects across the web pages viewed are "dogs" and "cars." In the example shown in FIG. 27, each one of the icons or thumbnails 2604a, 2604b, 2604c, and 2604d represents a previously accessed data item that relates to the subject of "dogs." Each one of the icons or thumbnails 2706a. 2706b, 2706c, and 2706d represents a previously accessed data item that relates to the subject of "cars."

Figure 28:
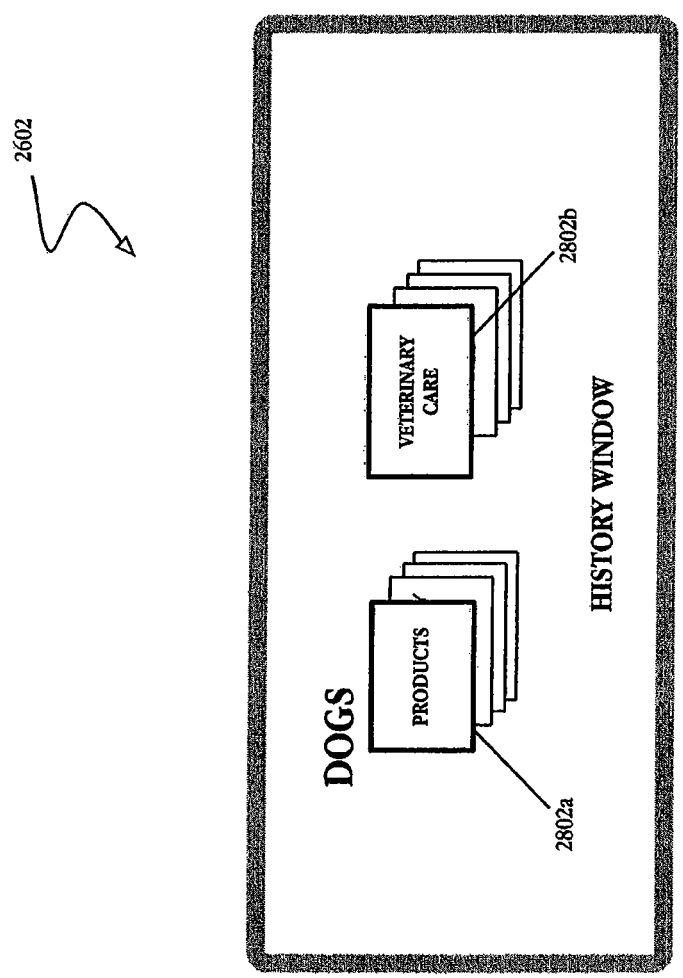

FIG. 28 is a diagram of an example graphical user interface with a history list organized based on a single subject and presented using meta-icons in the window 2602. In the first example from the beginning of the detailed description, one common subject across the web pages viewed is the subject of "dogs," In FIG. 28 the individual data items are organized by subtopics within the subject of "dogs." In this example, the subtopics are "products" and "veterinary care." The subtopics are represented by meta-icons 2802a and 2802b. The meta-icons 2802a, 2802b represent several different icons or thumbnails with a single icon. The icons or thumbnails represented by the meta-icon are displayed by selecting the meta-icon.

Figure 29:
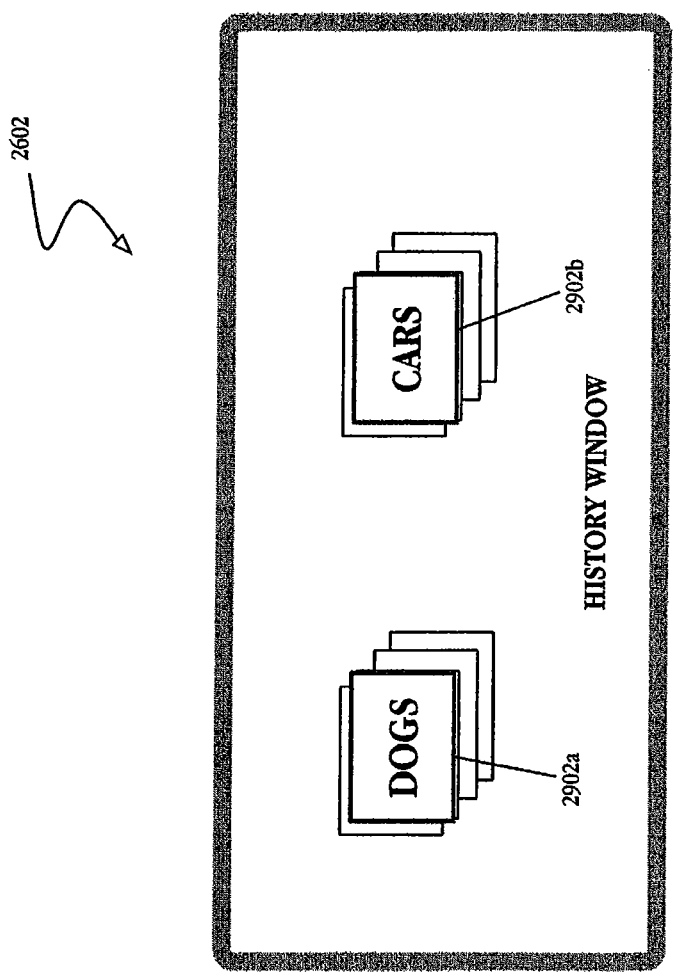

FIG. 29 is a diagram of an example graphical user interface with a history list organized based on more than one subject and presented using meta-icons in a window 2602. In FIG. 29 the individual data items are represented with a first and a second meta-icon 2902a, 2902b. The first meta-icon 2902a represents several different icons or thumbnails for individual data items related to the subject of "dogs." The second meta-icon 2902b represents several different icons or thumbnails for individual data items related to the subject of "cars."

The example embodiments described by reference to FIGS. 26, 27, 28 and 29 comprise a user interface having a window 2602 that is separate from the application program. Embodiments of the invention for displaying a history in a window are not limited to the examples shown in FIGS. 26, 27, 28 and 29. For example, in alternate embodiments, more than window is used to display the history. Separate windows may be used to display separate groups of data items. Alternatively, separate windows may display items in the history list according to different organizational methods, (e.g., one window shows the data items organized according to subject matter and another window show the data items organized according to frequency of viewing.)

Strip.

Figure 30:
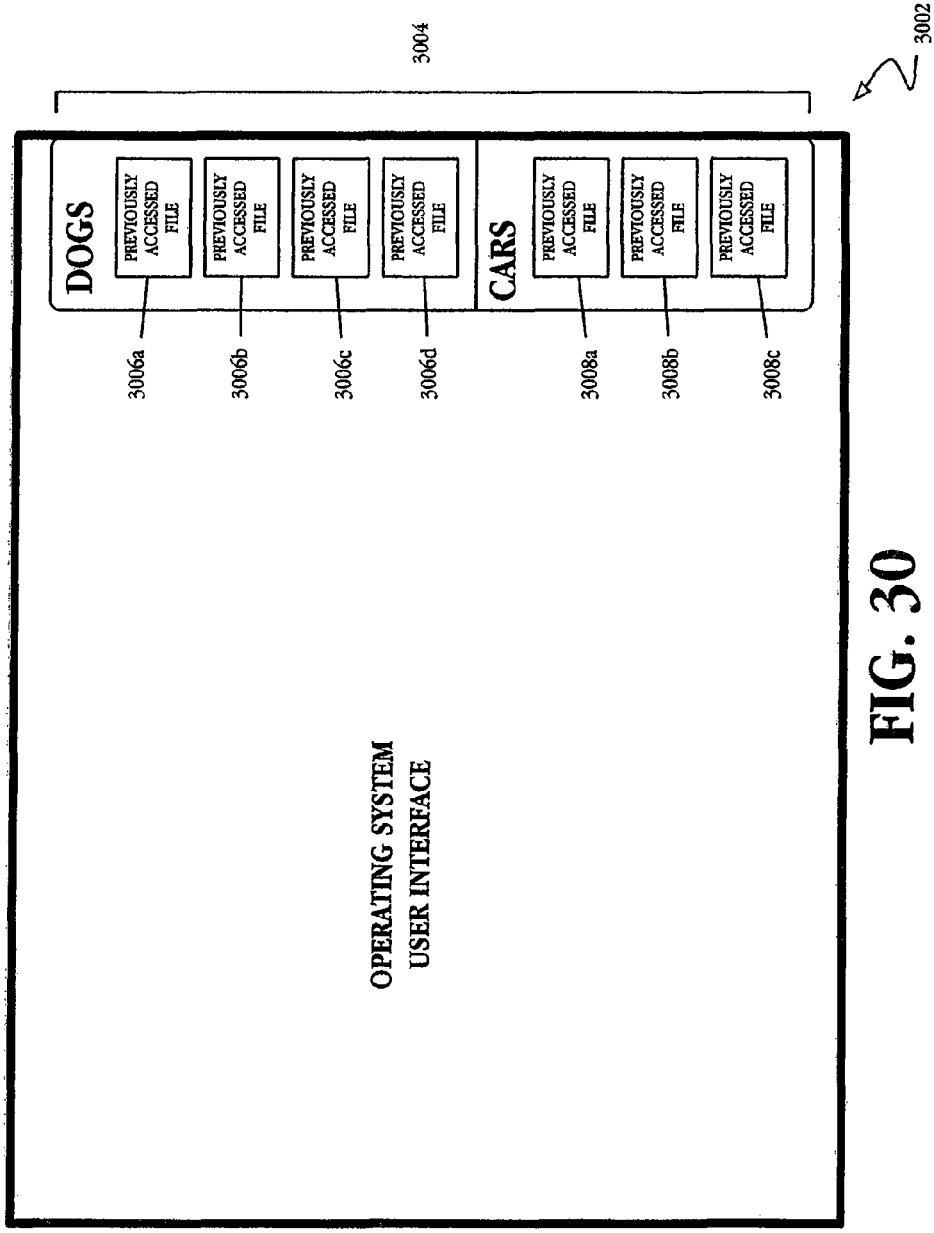
Figure 31:
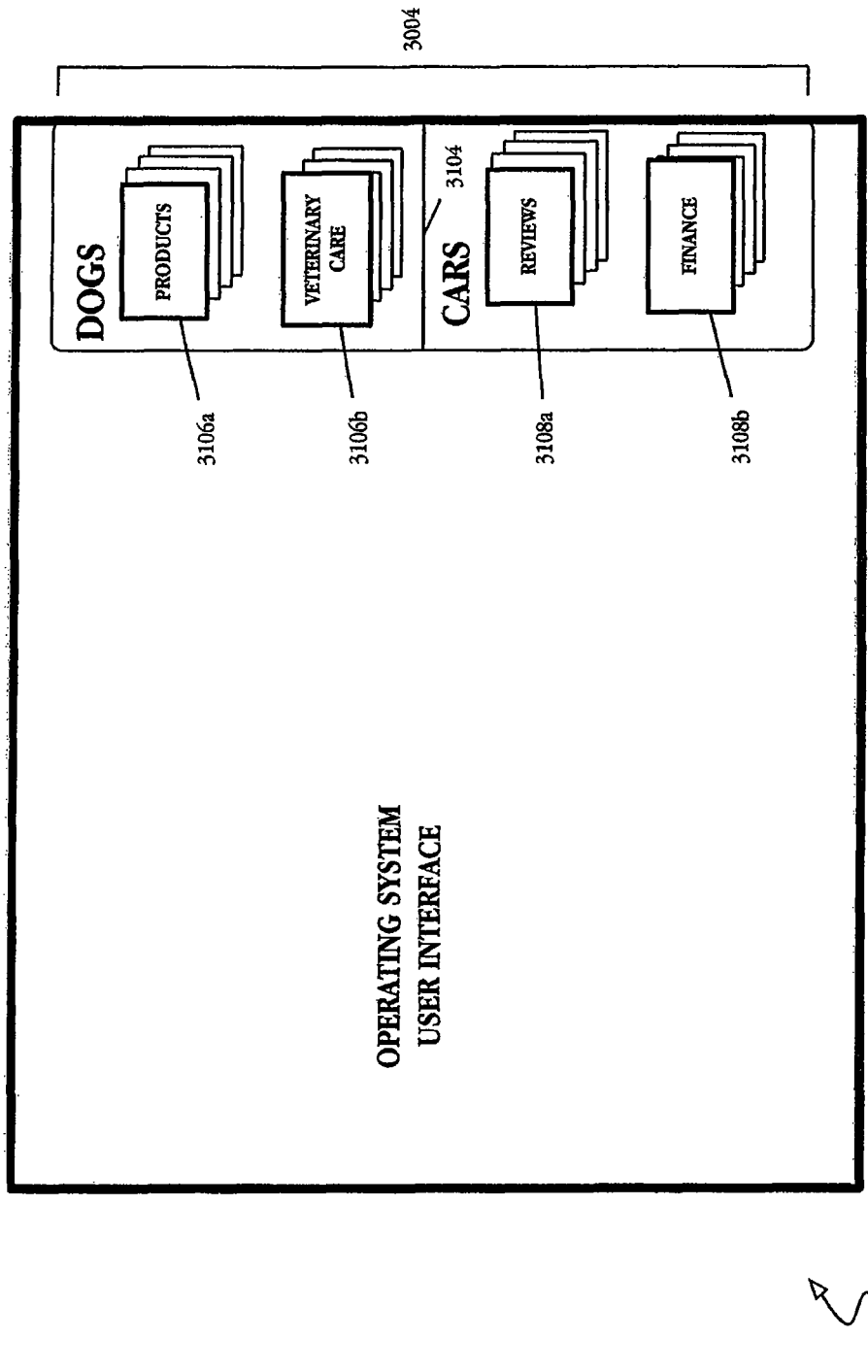
Figure 32:
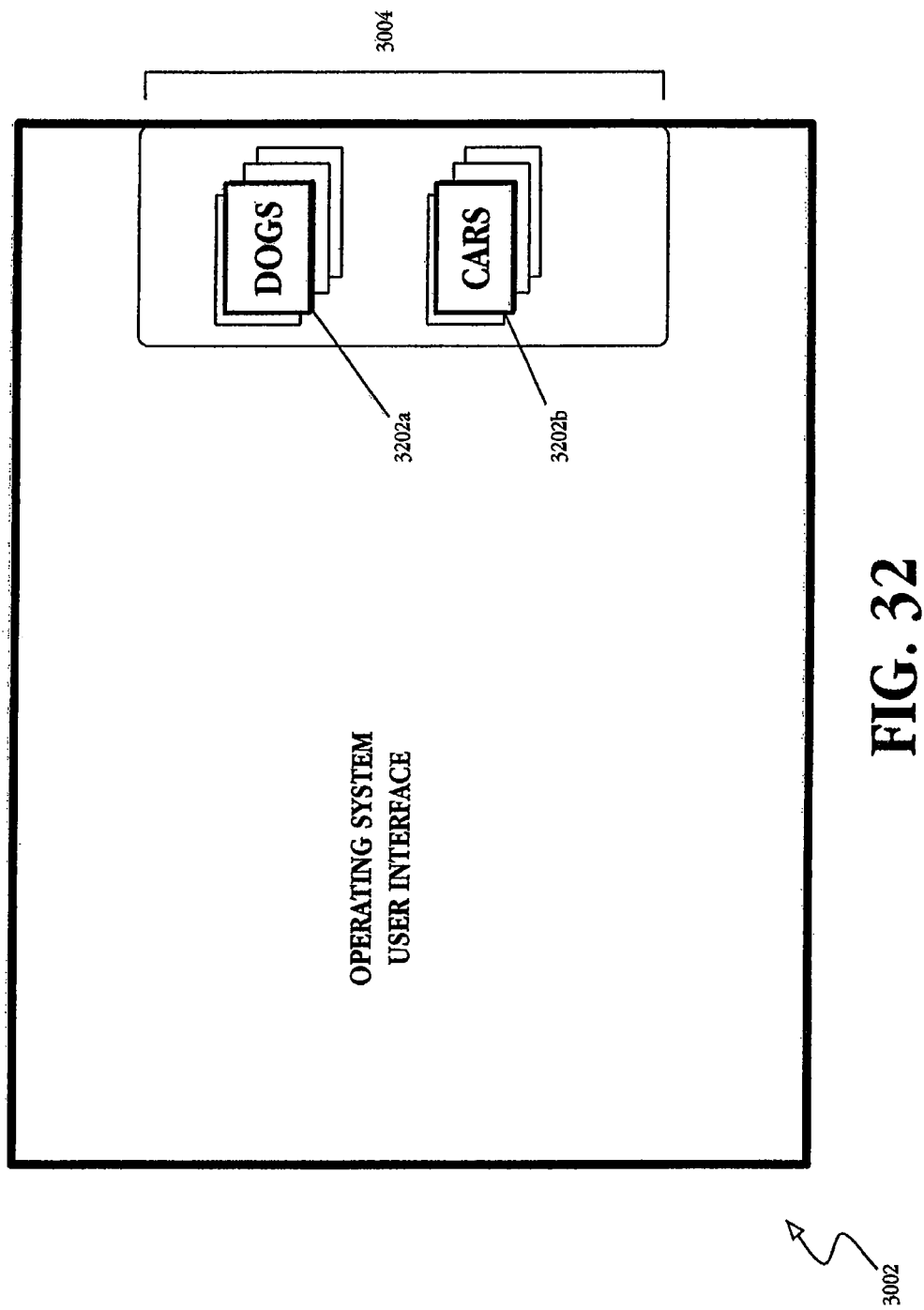

FIGS. 30, 31 and 32 are diagrams of an example graphical user interface in which a history of previously accessed data items are displayed in a strip. A strip is a graphical user interface element that appears as a palette. One example of a strip is a user interface element in a Macintosh OS X operating system referred to as a "dock." However, strips are not limited to implementations used in operating systems available from Apple Computer Inc. The example embodiments shown in FIGS. 30, 31 and 32 comprise a strip 3004 that is separate from the application program. The strip 3004 displays a history list of previously accessed data items. The previously accessed data items represented in the history lists shown in FIGS. 30, 31 and 32 are organized based on what content was viewed.

FIG. 30 is a diagram of an example graphical user interface with a history list organized around multiple subjects and presented in a strip 3004. The strip 3004 appears along an edge of the operating system user interface 3002 in FIG. 30. From the first example at the beginning of the detailed description, two common subjects across the web pages viewed are "dogs" and "cars." In the example shown in FIG. 30, each one of the icons or thumbnails 3006a, 3006b, 3006c, and 3006d represents a previously accessed data item that relates to the subject of "dogs." Each one of the icons or thumbnails 3008a, 3008b, and 3008c represents a previously accessed data item that relates to the subject of "cars."

FIG. 31 is a diagram of an example graphical user interface with a history list organized based on multiple subjects and presented using meta-icons in the strip 3004. The strip 3004 appears along an edge of the operating system user interface 3002 in FIG. 31. In FIG. 31 the individual data items in the history list are presented by subtopic within the subject of "dogs" and by subtopic within the subject of "cars." In this example, the subtopics for "dogs" are "products" and "veterinary care"; the subtopics for "cars" are "reviews" and "finance". The subtopics for "dogs" are represented by a first group of meta-icons 3106a and 3106b. The subtopics for "cars" are represented by a second group of meta-icons 3108a, 3108b. The meta-icons 3106a, 3106b, 3108a, 3108b are displayed in two groups in the strip 3004. A divider 3110 separates the two groups.

FIG. 32 is a diagram of an alternate example graphical user interface with a history list organized based on multiple subjects and presented using meta-icons in strip 3004. The strip 3004 appears along an edge of the operating system user interface 3002 in FIG. 32. In FIG. 32 the individual data items are represented with meta-icons 3202a, 3202b. The first meta-icon 3202a represents several different icons or thumbnails for individual data items related to the subject of "dogs." The second meta-icon 3202b represents several different icons or thumbnails for individual data items related to the subject of "cars."

The example embodiments described by reference to FIGS. 30, 31, and 32 comprise an operating system user interface 3002 having a strip 3004 that is separate from any of the application programs. Embodiments of the invention are not limited to any particular type of strips. Strips can be any palette either along one of the edges of a screen display or "floating" somewhere in the screen display. Strips contain various icons, thumbnails, meta-icons or the like representing frequently accessed data items.

Overlay.

Figure 33:
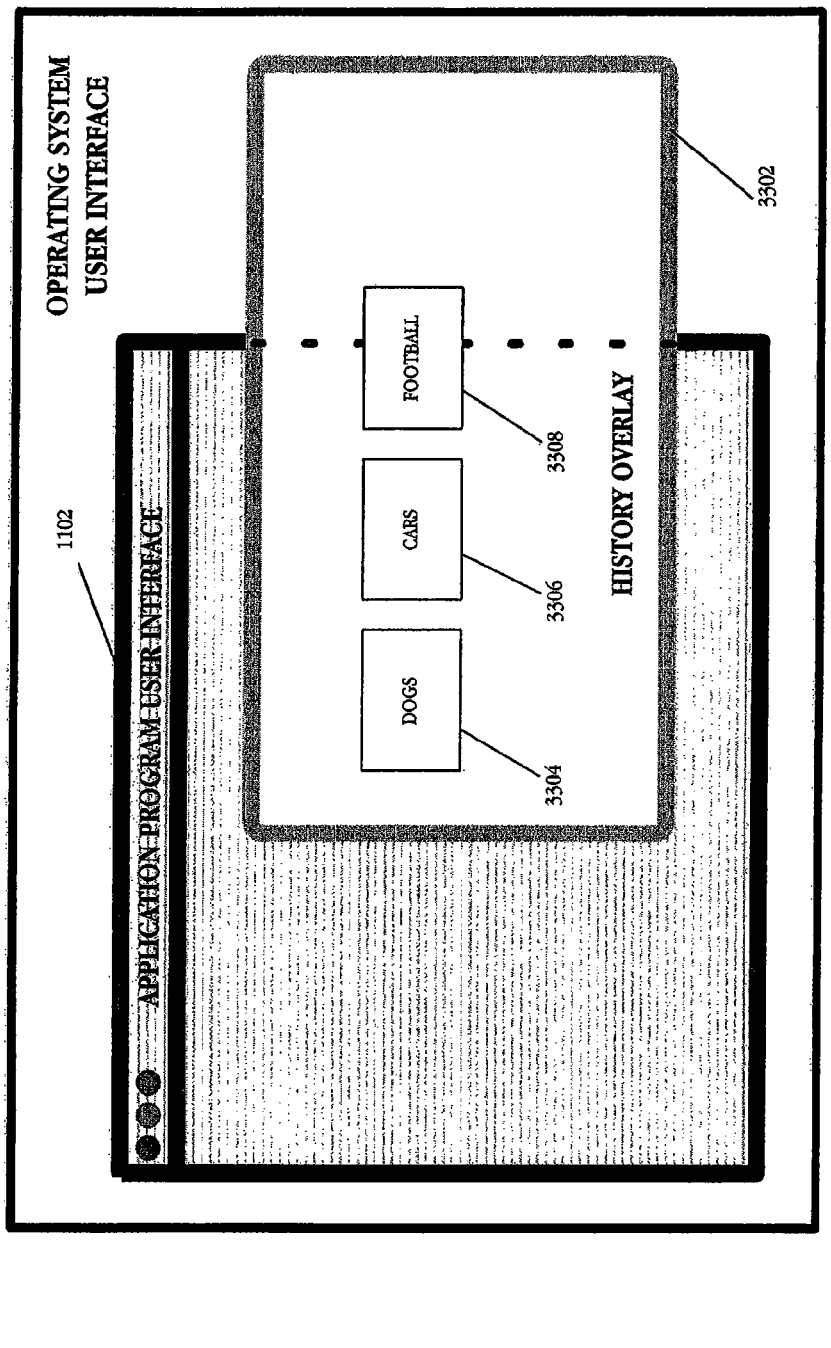

FIG. 33 is a diagram of an example graphical user interface in which a history of previously accessed data items is displayed in an overlay. An overlay may overlap other visual components already present in the operating system user interface. In the example shown in FIG. 33, an overlay 3302 overlaps an application program user interface 1102 displayed in the operating system user interface 3002. The overlay 3302 displays a history list for previously accessed data items. In the example shown in FIG. 33, the previously accessed items in the history overlay 3302 are presented with meta-icons. In the example shown in FIG. 33, the first meta-icon 3304 represents data items related to the subject of "dogs." The second meta-icon 3306 represents data items related to the subject of "cars." The third meta-icon 3308 represents data items related to the subject of "football."

FIGS. 26-33 example graphical user interfaces in which a history of previously accessed data items is presented separate from the elements of an existing graphical user interface for an application program. The example user interface elements described above include windows (FIGS. 26, 27, 28, 29), strips (FIGS. 30, 31, 32), and overlays (FIG. 33). Embodiments of the invention are not limited to windows, strips, and overlays. Any user interface element that is used to display graphical representations of previously accessed data items can be used.

User Interfaces for Indicating Significance

The diagrams of user interlaces shown in FIGS. 11-33 depict a history of previously accessed data items with graphical representations. In addition to depicting a history list with graphical representations, some embodiments of the invention also enhance one or more of the graphical representations to convey a level of significance of the previously accessed data item.

FIGS. 34-38 are diagrams of example graphical user interfaces for indicating the significance of a data item in a history of previously accessed data items. According to some embodiments of the invention, the significance of data items in the history list is indicated visually. Any type of a visual indicator that makes a data item in the history list stand out may be used. Embodiments of the invention are not limited to any particular types of visual indicators to represent significance. Some examples of visual indicators include, but are not limited to, the position of the data item in the history list, the appearance of the data item in the history list, and the behavior or animation of the data item in the history list.

FIG. 34-38 illustrate a history window 3402 comprising a first panel of data items 3404 and a second panel of data items 3406. The history list is similar to the history list shown in the drawer in FIG. 12 and to the history list shown in the window in FIG. 26. The history list is organized based on what content was viewed and the history list is presented using icons. Each one of the icons 3408, 3410, 3412, 3416 in the first panel 3404 in the window 3402 represents a previously accessed data item that relates to the subject of "dogs." Each one of the icons 3418, 3420, 3422, 3424 in the second panel 3406 in the window 3402 represents a previously accessed data item that relates to the subject of "cars." In addition to graphically depicting a history list based on what content was viewed as shown in FIG. 12 and FIG. 26, FIG. 34-38 also enhance the graphical representations to convey a level of significance of the data items.

In one embodiment, enhancing a graphical representation for a data item conveys information about the usefulness of the data item to a user. In another embodiment, a data item indicated as more significant implies that the data item is more relevant to a user or to a particular organizational method than some of the other data items in the history list. For example a data item that is accessed every day may be more relevant than a data item that is accessed once every six months. Likewise, a data item that is accessed for a long duration of time may be more useful to a user than a data item that was only briefly accessed.

Position.

Figure 34:
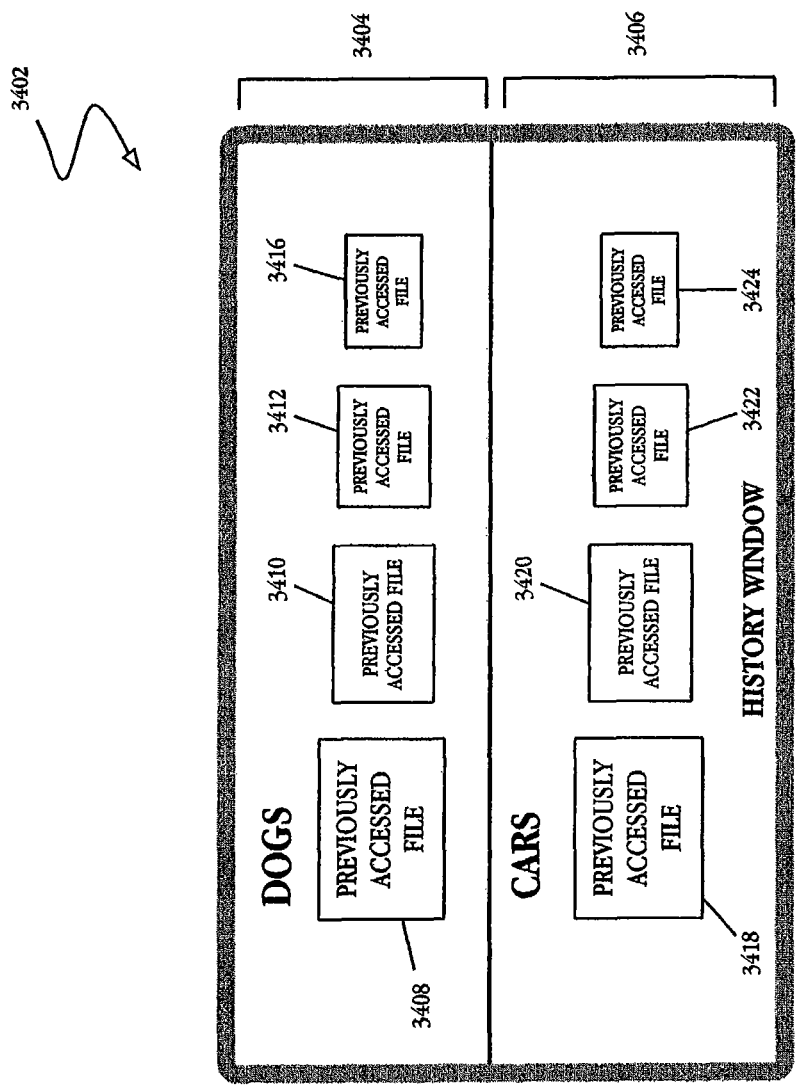
FIGS. 34-38 are diagrams of example graphical user interfaces for indicating the significance of a data item in a history of previously accessed data items.

FIG. 34 is a diagram of an example graphical user interface in which a data item's significance in a history list is indicated by the data item's position in the history list. The significance of each data item in the first panel 3404 to the subject of "dogs" is graphically indicated by the position of an icon representing the data item. The significance of each data item in the second panel 3406 to the subject of "cars" is also graphically indicated by the position of an icon representing the data item. In the example shown in FIG. 34, more significant data items are positioned toward the left side of the window 3402, and less significant data items are positioned toward the right side of the window 3402. Thus, a left-most data item 3408 in the first panel 3404 is more significant to the subject of "dogs" than a right-most data item 3416 in the first panel 3404. Likewise, a left-most data item 3418 in the second panel 3406 is more significant to the subject of "cars" than a right-most data item 3424 in the second panel 3406.

As shown in FIG. 34, one type of a visual indicator for the significance of a data item is the position of the graphical representation relative to other graphical representations in the history list. Embodiments of the invention are not limited to the most significant data items being positioned on the left side of a history list. Any position in a history list may be defined as more significant or less significant relative to other positions in the history list. For example, in another embodiment, a more significant data item is positioned toward the top of the panel, and a less significant data item is positioned toward the bottom of the panel. In yet another embodiment, a more significant data item is positioned toward the bottom of the panel, and a less significant data item is positioned toward the top of the panel. In yet another embodiment, a more significant data item is positioned toward the center of the panel, and a less significant data item is positioned toward the edges of the panel. In an even further embodiment, a more significant data item is positioned toward the edges of the panel, and a less significant data item is positioned toward the center of the panel. In still other embodiments, the position of an icon in a history list changes dynamically over time based on the significance of the data item to the organizational method at a particular point in time.

Appearance.

Figure 35:
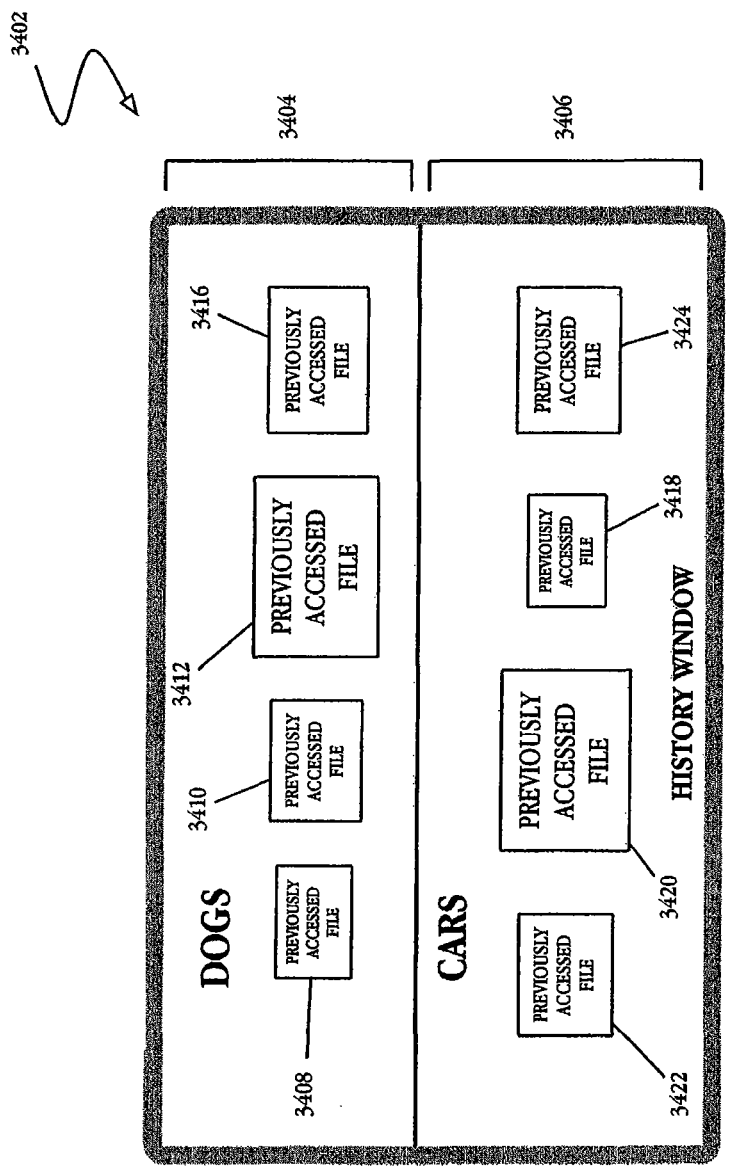
Figure 36:
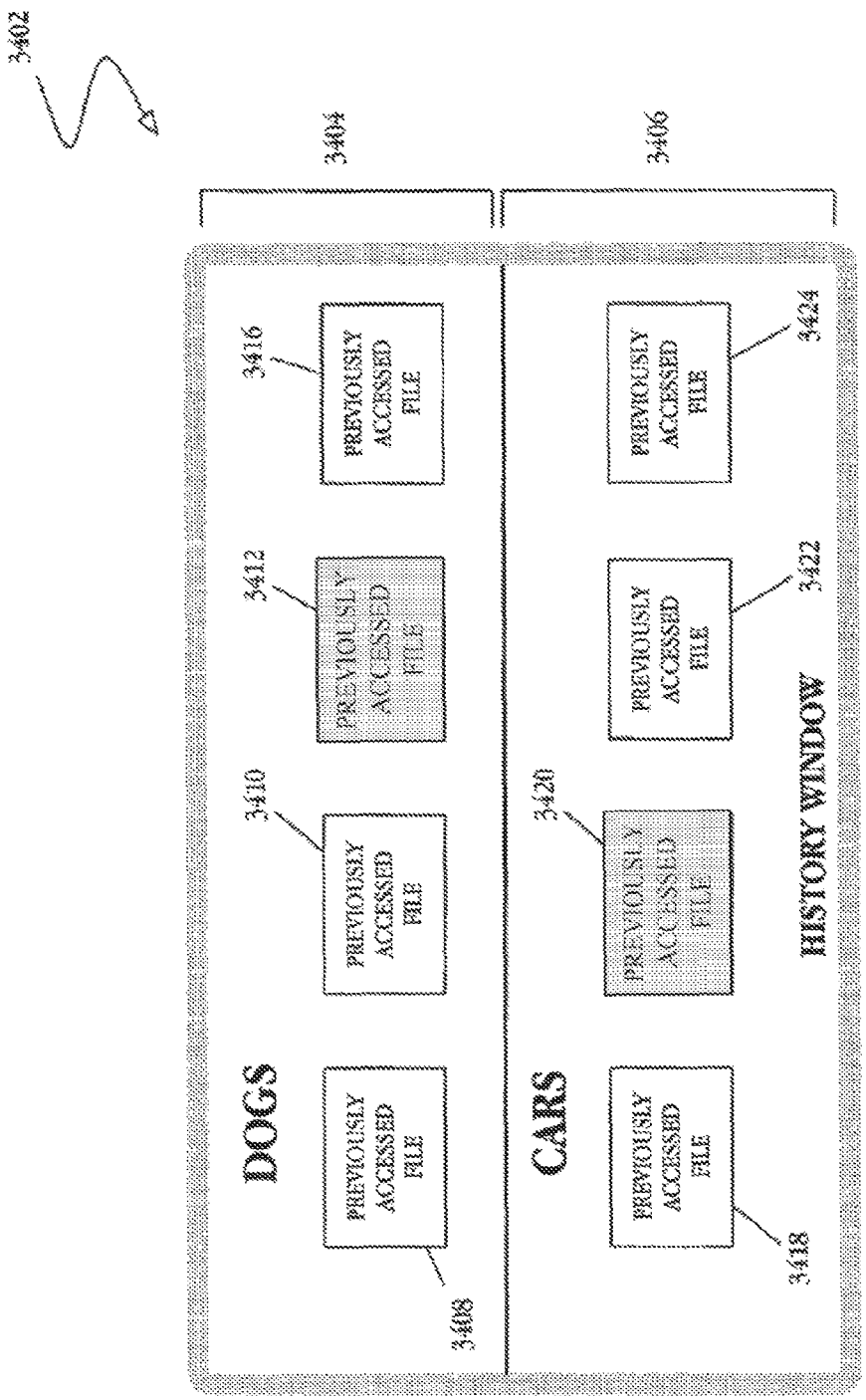
Figure 37:
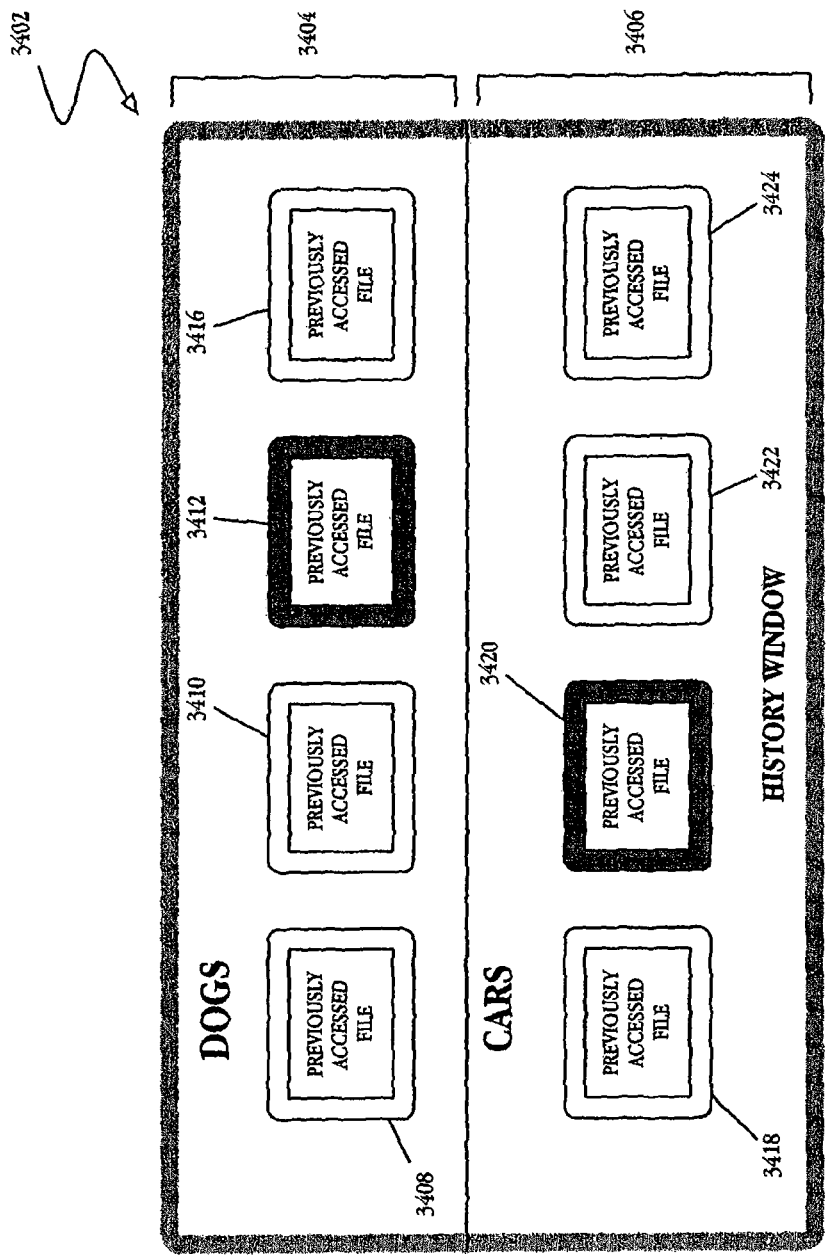

FIGS. 35, 36 and 37 are diagrams of an example graphical user interface in which a data item's significance in a history list is indicated by the data item's appearance. FIG. 35 illustrates a history window 3402 comprising a first panel of icons representing data items 3404 and a second panel of icons representing data items 3406. The significance of each data item in the first panel 3404 to the subject of "dogs" is graphically indicated by the size of the icon representing the data item. The significance of each data item in the second panel 3406 to the subject of "cars" is also graphically indicated by the size of the icon representing the data item. In the example shown in FIG. 35, more significant data items have graphical representations that are enhanced to be larger than less significant data items in the history list. Thus, a larger icon 3412 in the first panel 3404 represents a data item that is more significant to the subject of "dogs" than a smaller icon 3408 in the first panel 3404. Likewise, a larger icon 3420 in the second panel 3406 represents a data item that is more significant to the subject of "cars" than a smaller icon 3418 in the second panel 3406.

FIG. 36 illustrates a history window 3402 in which the significance of each data item is graphically indicated by the color of the icon representing the data item. In the example shown in FIG. 36, more significant data items have graphical representations that are enhanced with color so their graphical representations appear differently than less significant data items in the history list. Thus, a first icon 3412 in the first panel 3404 represents a data item that is more significant to the subject of "dogs" than the other icons that are not enhanced with color. Likewise, a first icon 3420 in the second panel 3406 represents a data item that is more significant to the subject of "cars" than the other icons that are not enhanced with color.

FIG. 37 illustrates a history window 3402 in which the significance of a data item is graphically indicated by the presence of a color border around the icon representing the data item. In the example shown in FIG. 37, more significant data items have graphical representations that are enhanced by the presence of the color border around the graphical representation in the history list. Thus, a first icon 3412 in the first panel 3404 represents a data item that is more significant to the subject of "dogs" than the other icons that are not enhanced with the color border. Likewise, a first icon 3420 in the second panel 3406 represents a data item that is more significant to the subject of "cars" than the other icons that are not enhanced with the color border.

As shown in FIGS. 35, 36, and 37, another type of a visual indicator for the significance of a data item is the appearance of the graphical representation relative to other graphical representations in the history list. In some embodiments, the appearance of a graphical representation is varied by changes in the size of the representation (i.e., the magnification of the item), the color or brightness or shading of the representation, and the presence of a border and/or color around the representation. However, embodiments of the invention are not limited to use of size, color, shading, brightness, and borders. Any variation in the appearance of a graphical representation may be used to indicate the significance of a data item in a history list. For example, in a system having data items in a history list represented with text, the appearance of the text can be varied to represent the significance of different data items. In some embodiments, varying the appearance of the text includes varying the font type, the font size or the font color. In still other embodiments, the appearance of the text is varied using various fading techniques.

Behavior.

Figure 38:
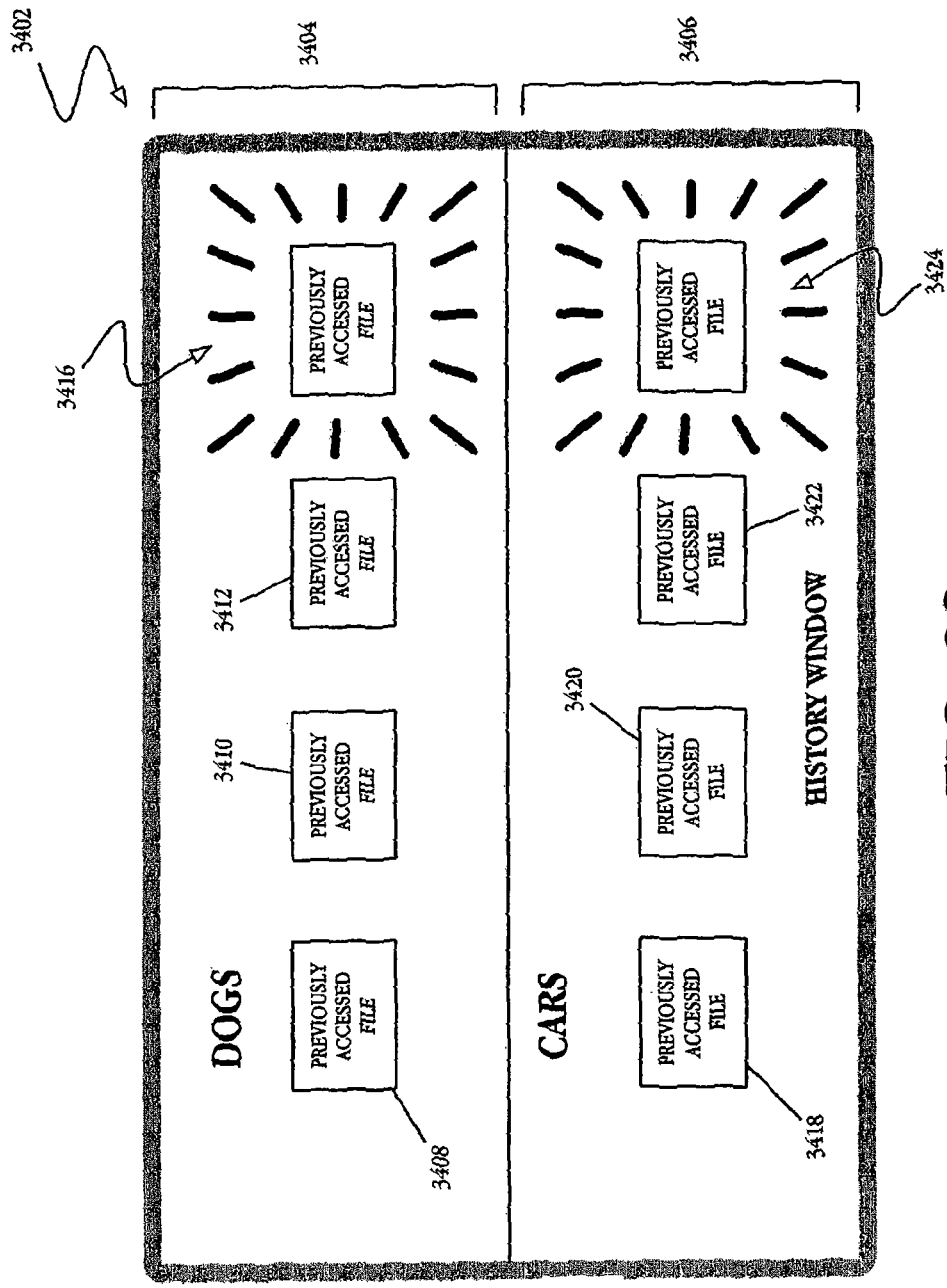

FIG. 38 is a diagram of an example graphical user interface in which a data item's significance in a history list is indicated by the data item's behavior or animation. In the example show in FIG. 38, more significant data items in the history list have graphical representations that are enhanced with animation. Animation is any type of motion, including but not limited to, moving, bouncing, blinking, or pulsing images or text. Thus, a first icon 3416 in the first panel 3404 represents a data item that is more significant to the subject of "dogs" than the other icons that are not animated. Likewise, a first icon 3424 in the second panel 3406 represents a data item that is more significant to the subject of "cars" than the other icons that are not animated.

As shown in FIG. 38, still another type of visual indicator for the significance of a data item is the behavior or animation of a graphical representation relative to other graphical representations in the history list. Embodiments of the invention are not limited to any particular behavior or animation. Any behavior or animation of a graphical representation can be used to indicate the significance of a data item in a history list. For example, in some embodiments the behavior includes automatically adding frequently visited web pages to a bookmarks list (and updating the bookmarks list as the significance of particular web pages changes over time). In other embodiments, the behavior includes setting a home page on a web browser to a frequently visited web page. In another embodiment, the behavior includes adding a data item to a tool bar.

In one embodiment the example graphical user interfaces for indicating the significance of a data item shown in FIGS. 34-38 are provided by the presentation module 404 of FIG. 4. Whether or not the significance of a data item is displayed in a user interface can be determined by an operating system or application program. In another embodiment, whether or not to display the significance of a data item is preset in the application program. In still another embodiment, a user indicates whether or not to display the significance of a data item through user settings.

Figure 40A:
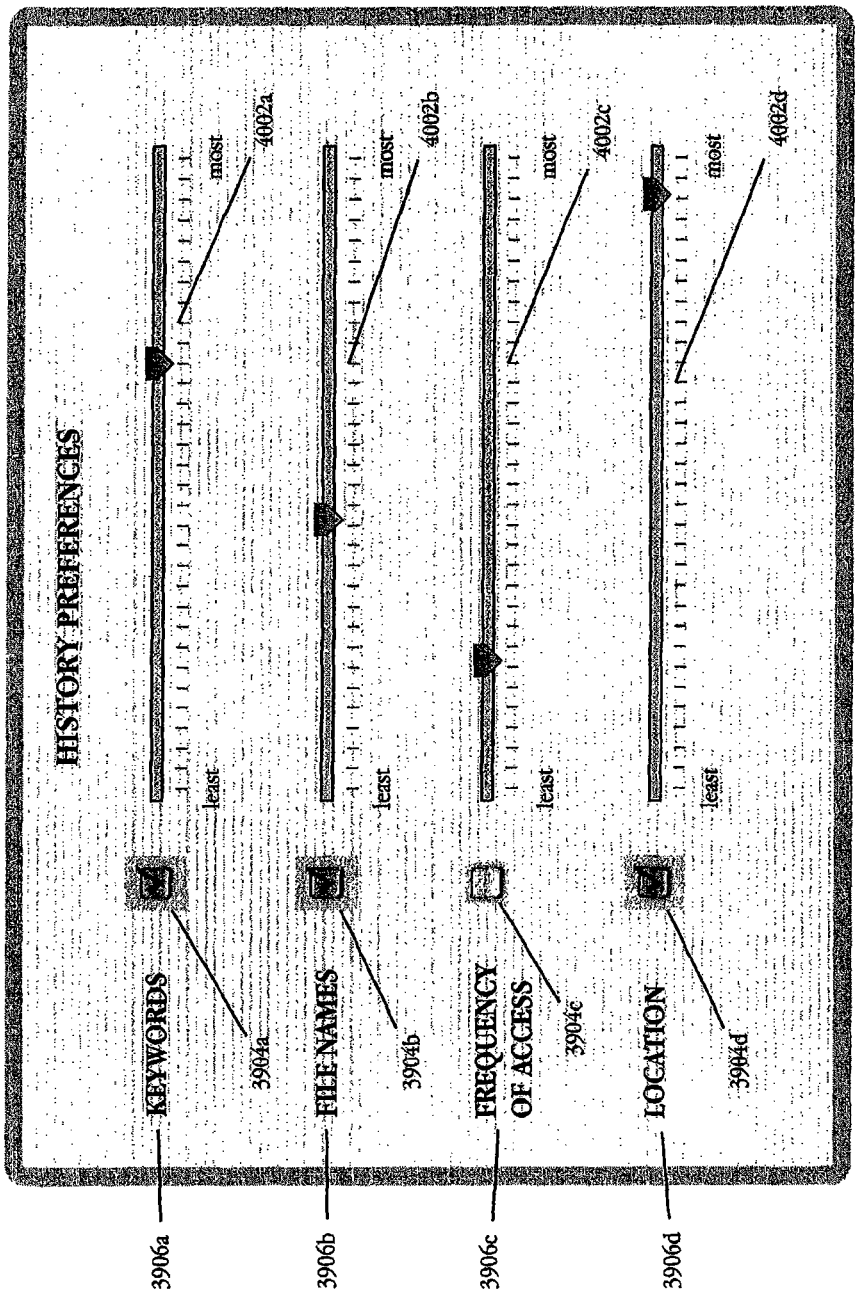
Figure 40B:
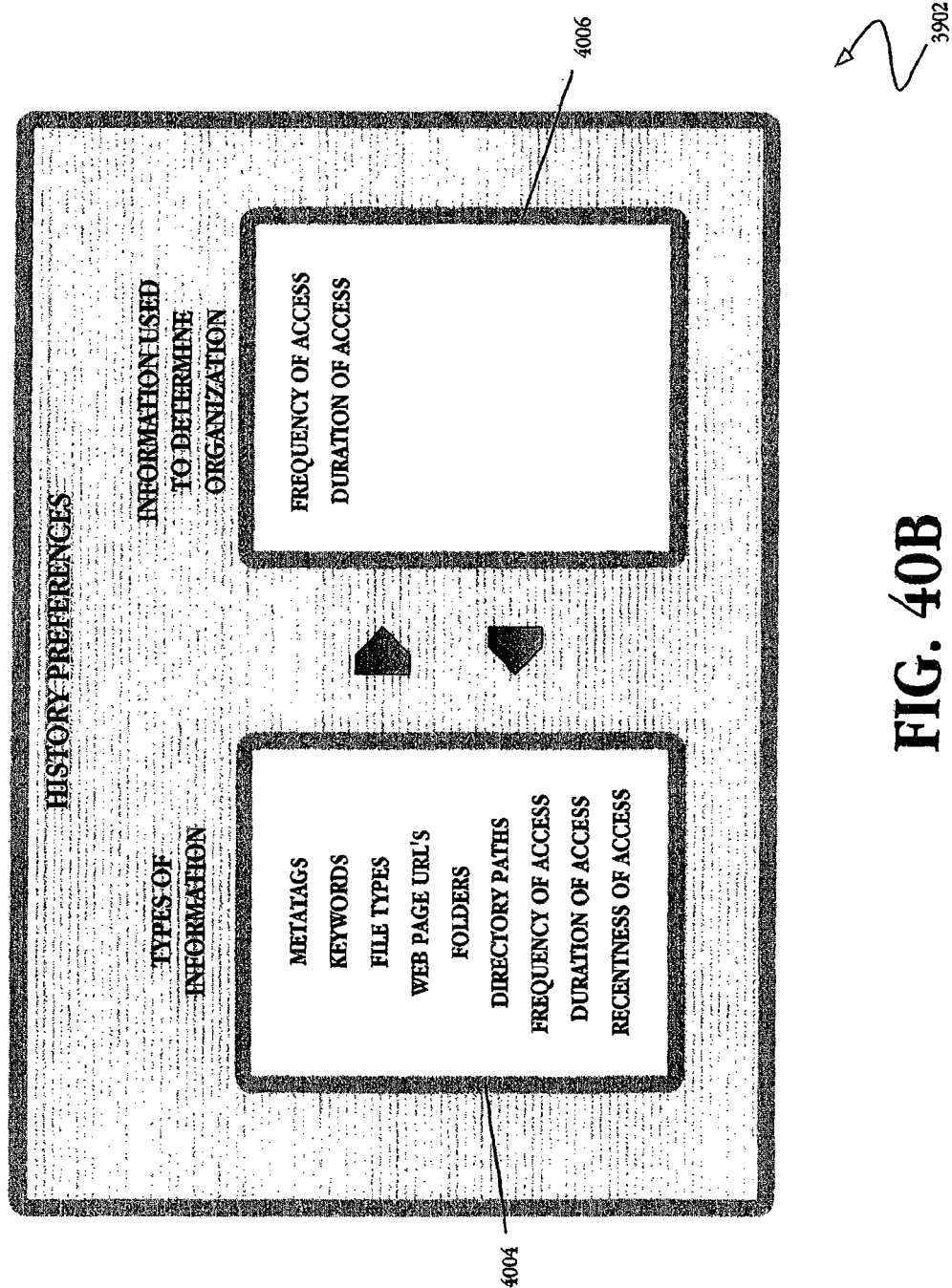

User Interfaces for Weighting Information Used to Determine an Organizational Method FIGS. 39, 40A, and 40B are diagrams of example graphical user interfaces for weighting information used to determine an organizational method for the previously accessed data items. A weight is a setting that influences the way information is used to determine an organizational method. Weighting information used to determine an organizational method permits a user or program to change the way the previously accessed data items are organized.

Weights can be applied to information from data items and to metadata about the data items. In some embodiments, the metadata is supplied by a user (e.g., labels, rankings) or supplied by an application program. In other embodiments, the metadata is derived from an external source (such as from a database).

In some embodiments the weights are set by a computer system (such as being set by an operating system or application program). In other embodiments, the weights are set by users and may reflect personal preferences of the users. In still other embodiments, the weights are dynamically determined based on a users' browsing behavior and usage. FIG. 39 is a diagram of a history preferences panel 3902 comprising a plurality of checkboxes 3904a, 3904b, 3904c, 3904d, 3904e and labels 3906a, 3906b, 3906c, 3906d, 3906d. The checkboxes and labels allow a user to choose the information to be considered when an organizational method is determined for previously accessed data items. For example, the first label "What" 3906a may represent information about what content was accessed. The second label "Where" 3906b may represent information about where the content was accessed. The third label "When" 3906c may represent information about when the content was accessed. The fourth label "Why" 3906d may represent information about why the content was accessed. The fifth label "Who" 3906e may represent information about who accessed the content.

In one embodiment, when a checkbox 3904a, 3904b, 3904c, 3904d is set (i.e., the box is checked), the category of information associated with the checkbox is considered when an organizational method is determined for the previously accessed data items. Likewise, when a checkbox is not set (i.e., the box is not checked), the category of information associated with the checkbox is not considered when an organizational method is determined for the previously accessed data items. In the example shown in FIG. 39, the checkboxes indicate that the information about what content was accessed, where the content was accessed and why the content was accessed will be used to determine an organizational method for the data items. The information about when the content was accessed and who accessed the content will not be used to determine the organizational method in this example.

FIG. 40A is a diagram of an alternate history preferences panel 3902 comprising a plurality of checkboxes 3904a, 3904b, 3904c, 3904d, a plurality of labels 3906a, 3906b, 3906c, 3906d, and a plurality of slider bars 4002a, 4002b, 4002c, 4002d. In addition to setting the checkboxes to indicate which categories of information are to be considered when determining an organizational method for the previously accessed data items, the user can use the slider bar to scale the level of consideration given to the category of information associated with the slider bar.

In addition to whether a particular type of information is considered, the slider bar also allows the user to indicate varying degrees of consideration for particular types of information. For example, the first label "keywords" 3906a is selected (check box 3904a is marked) and a level of consideration is indicated by the slider bar 4002a. The second label "File Names" 3906b is also selected (check box 3904b) is selected and the level of consideration for this type of information is indicated with slider bar 4002b as being less than for keyword type of information. The third label "Frequency of Access" 3906c is not selected (checkbox 3904c is not marked) so the frequency of access will not be considered when an organizational method is determined. The fourth label "Location" 3906d is selected (check box 3904d is marked) and the level of consideration for location information is indicated as being the most important on slider bar 4002d.

In the example shown in FIG. 40A, the checkboxes indicate that the keywords, files names, and location information from the previously accessed data items will be used to determine an organizational method. The location information will be given the most consideration of the three types of information. The information about frequency of access will not be used to determine the organizational method in this example.

FIG. 40B is alternate history preferences panel according to another embodiment of the invention. The history preferences panel 3902 shown in FIG. 40B comprises a first window with types of information about the data items available 4004 and a second window with the information to be used to determine the organizational method for the data items 4006. A user selects the desired types of information in the first window 4004 and selects an arrow pointing in the direction of the second window 4006. After a desired type of information is selected, the desired type of information is listed in the second window 4006 as information to be used when determining the organizational method. Information can be removed from the second window in a similar manner so that the information is no longer considered. In the example shown in FIG. 40B, two types of information are selected: frequency of access and duration of access. In this example, the organization of the data items will be based on the frequency of access of the data items and the duration of access of the data items.

Embodiments of the invention are not limited to the example user interfaces shown in FIGS. 39, 40A, and 40B. In addition, the specific user interface elements and labels are examples and are not intended to be the only user interface elements for use when weighting information used to determine an organizational method. Any user interface and/or specific user interface element that allows a user to control the information about previously accessed data items used to determine an organizational method can be used. Some examples of other user interface elements for a history preferences window include, but are not limited to, pop up menus and combo boxes. In one embodiment, the slide bar in FIG. 40A is replaced with a dial or a menu of options for each type of information (the menu of options includes a mechanism for assigning a level of consideration to an item). In an alternate example, the level may be "more, "not so much" or "none at all."

By controlling the information used by embodiments of the invention, the user can adjust the organizational method used for the previously accessed data items.

Example Implementations

Various examples of systems, methods, and user interfaces for embodiments of the invention have been described above. In this section, example implementations are described in relation to software applications such as a web browser, a file system manager, a media file player, and a digital image manager. Specific software applications designed to run on operating systems developed by Apple Computer, Inc. are referenced. However, embodiments of the invention are not limited to software applications for operating systems available from Apple Computer, Inc. Other software applications that perform similar functions for other operating systems are considered within the scope of the invention.

Figure 41:
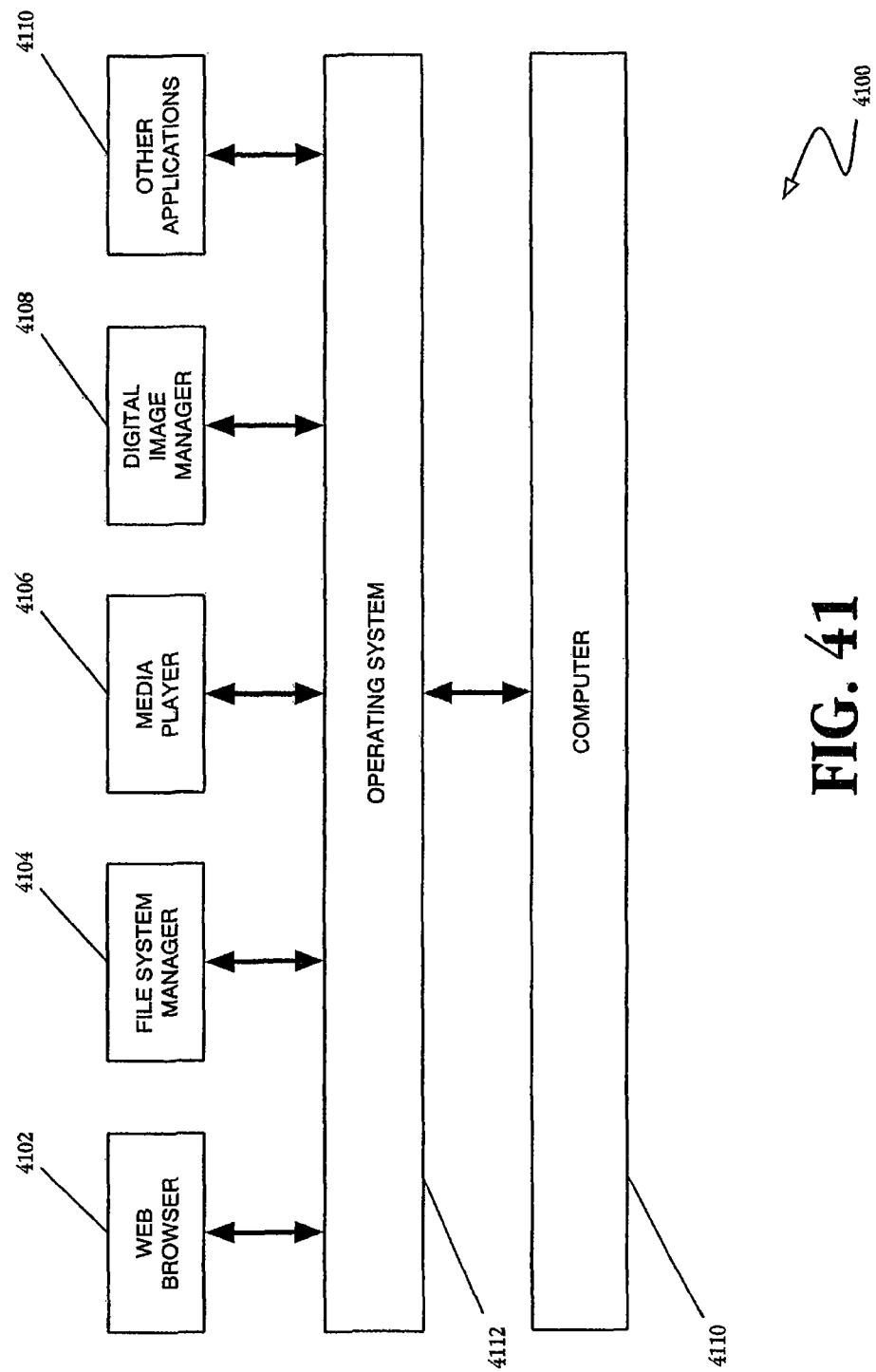
FIG. 41 is a diagram of a computerized system in conjunction with which embodiments of the invent may be implemented.

The example implementations are described by reference to FIG. 41. FIG. 41 is a diagram of a computerized system in conjunction with which embodiments of the invention may be implemented. The computerized system 4100 comprises software applications including a web browser 4102, a file system manager 4104, a media player 4106, a digital image manager 4108, and other applications 4110. The software applications are communicatively coupled to an operating system 4112. The operating system 4112 is communicatively coupled to a computer 4110. Example implementations for the software applications are described below.

Web Browser Implementation

The web browser 4102 provides the user the ability to view, interact with, and organize web pages. For operating systems 4112 currently available from Apple Computer, Inc., the web browser 4102 is referred to as Safari.

Organization.

When organizing previously accessed web pages according to embodiments of the present invention, a method for organizing the web pages is dynamically determined from information about the web pages. The organizational method is based on one or more of the following: what web pages were accessed; where the web pages were accessed; when the web pages were accessed or used; why, or in what context, the web pages were accessed; who accessed the web pages; or any user-supplied metadata about the web page.

If the organizational method in the web browser 4102 is based on what web pages are accessed, examples of information used to organize the web pages include, but are not limited to, the following: metadata or metatags contained in the source code of the web page; keywords identified from the content of the web page; type of web page, (e.g., educational, e-commerce, government, personal, or non-profit); type of content on web page (e.g., Hash-enabled content, QuickTime movies, text, or simple series of images); and top-level domain ("TLD") information (e.g., .edu, .com, .gov or .net TLDs).

If the organizational method in the web browser 4102 is based on where the web pages were accessed, examples of information used to organize the web pages include, but are not limited to: domain name information about the web page; and uniform resource locator ("URL") or directory path of the web page.

If the organizational method in the web browser 4102 is based on when the web pages were accessed, examples of information used to organize the web pages include, but are not limited to: date and/or time of last use (e.g., time the web page was viewed and date the web page was viewed); frequency of use (e.g., how often the web page is viewed); duration of use (e.g., length of time the web page is viewed); recency of use (e.g., length of time since the web page was last viewed); and interval between viewing the web page.

If the organizational method in the web browser 4102 is based on why, or in what context the web pages were accessed, examples of information used to organize the web pages include, but are not limited to, identification of the following: electronic commerce transaction; downloading content; and viewing content. Other examples of information about what context the web page was accessed include: typing a URL into the web browser; accessing the web page from an e-mail with a web link embedded in it; accessing the web page from another web page or from a search engine; and information about keyword searches used in search engines that led the user to the previously accessed web page.

If the organizational method in the web browser 4102 is based on who accessed the web page, examples of information used to organize the web pages include, but are not limited to: users who accessed the web page; and applications that accessed the web page.

If the organizational method in the web browser 4102 is based on user-supplied metadata, an example of information used to organize the web pages is user-supplied ratings of the web pages. Ratings used as a basis to organize web pages are not limited to ratings supplied directly by the user. In other examples, the ratings are obtained from sources external to the user such as a third-party maintained web page that maintains ratings of web pages, or that tracks relevance of web pages to particular subject areas.

Presentation.

Regardless of the organizational method used, the web browser 4102 graphically represents recently accessed web pages and may enhance at least one of the graphical representations to convey a level of significance of the recently accessed web page. A web browser history is presented in such a way as to cue the user to the significance of particular previously accessed web pages. When using a web browser 4102 incorporating embodiments of the invention, one or more web pages that are significant in the browsing history can be enhanced in any of the following ways, as previously described: animation-enhanced, position-enhanced, size-enhanced, and color-enhanced.

In addition, the web pages in a browsing history can also be presented to cue the user as to their significance in many ways including, but not limited to, the following ways. First, thumbnails of the web pages showing some sample of the content provided by the web page are organized by relevance to the browsing history. Second, icons of web pages showing just textual summary information about the web page are organized by relevance to the browsing history. Third, web pages that are within a single web site are organized underneath the thumbnail of the front page of the web site to create a stacked series of thumbnails. Fourth, thumbnails representing web pages are organized in such a way as to give prominence to the most recently viewed web pages or the most frequently viewed web pages. Fifth, a thumbnail of a web page is animated to show its significance to the user. Sixth, icons are appended to thumbnails showing any of the following: date/time of last viewing; number of times viewed; relevancy to subject area; or frequency of viewing or user ranking. Seventh, when displaying a browsing history as just text based information, varying any of the following aspects of the text cues the user as to the relevance of the web page: font type, font size, font color, or opacity of the text. Eighth, displaying the web pages in a webbed arrangement where the currently viewed web page is at the center, and thumbnails or other views of relevant web pages are displayed radiating outwards, with the most relevant web pages being displayed closest to the present web page.

In still other embodiments, web pages that are determined to be significant to a particular user are elevated to bookmarks or home pages. A significant web page in a user's browsing history automatically becomes a bookmark in the web browser 4102. Likewise, a significant web page in a user's browsing history can automatically be set as the home page for the web browser 4102, according to embodiments of the invention.

In short, a web browser 4102 incorporating embodiments of the invention presents a history of previously accessed web pages that is non-chronological, relative to when the web pages were accessed, and provides a visual cue as to the relevance of the web pages in the presentation. Any method of organizing the previously accessed web pages that is non-chronological, relative to the order the web pages were accessed, may be used. In some embodiments, the method to organize the previously accessed web pages is automatically determined by the operating system 4112 or the web browser 4102. In other embodiments, a user can chose a method of organizing web pages in the browsing history, or the user can weight various information used to determine the method of organizing the web pages.

Enhancing a web browser 4102, according to embodiments of the present invention, would better organize the web pages that a user has visited so that the user can subsequently find those web pages, or web pages like them, at some future date without needing to first bookmark the web page, or to find the web page from a chronologically organized list of web pages visited.

File System Manager Implementation

A file system manager 4104 provides access to, and organization of, the data items or files. For operating systems 4112 currently available from Apple Computer, Inc., the file system manager 4104 is referred to as the Finder.

Organization.

When a file system manager 4104 organizes recently accessed files according to embodiments of the present invention, a method for organizing the files is dynamically determined from information about the recently accessed files. The organizational method is based on one or more of the following: what data files were accessed; where the data files were accessed; when the data files were accessed; why the data files were accessed; who accessed or created the data files; or any user-supplied metadata associated with the data files.

If the organizational method in the file system is based on what data files are accessed, examples of information used to organize the files include, but are not limited to the following: actual text or content in the files; file names; file types; file extensions; and comments associated with the file.

If the organizational method in the file system is based on where the data files were accessed, examples of information used to organize the files include, but are not limited to: directory information; folder information; and path information.

If the organizational method in the file system is based on when the data files were accessed, examples of information used to organize the files include, but are not limited to: date and/or time of last use (e.g., time the file was accessed and date the file was accessed); frequency of use (e.g., how often the file is accessed); duration of use (e.g., a length of time the file is accessed); recency of use (e.g., length of time since the file was last opened); and interval between viewing the file.

If the organizational method in the file system is based on why, or in what context the data files were accessed, examples of information used to organize the files include, but are not limited to identification of the following: files opened; files edited; files copied; files attached to e-mail message; files saved from e-mail messages; files downloaded from the Internet; files burned to a compact disc; files located using a particular keyword search in the Find function of the file system manager 4104; or any other action by a user or a program on a data file.

If the organizational method in the file system is based on who accessed the data files, examples of information used to organize the files include, but are not limited to: users who accessed the data files (e.g., created, viewed or modified the data files); applications that accessed the data files (e.g., created, opened or modified the data files); or any other activities performed on data files by a user, a program, or an operating system.

If the organizational method in the file system is based on user-supplied metadata, an example of information used to organize the files is user-supplied ratings of the significance of the file.

Presentation.

Regardless of the organizational method used, the file system manager 4104 graphically represents recently accessed data files and may enhance at least one of the graphical representations to convey a level of significance to the user of the recently accessed data file. The files are represented in such a way as to cue the user to the significance of particular previously accessed files. Alternatively, the user can be cued as to the significance of files that the user has never accessed.

When using a file system manager 4104 incorporating embodiments of the invention, the previously accessed files that are most significant can be enhanced in any of the following examples: animation-enhanced with the most relevant files in the file system manager window being animated to draw the user's attention to them; position-enhanced with the most relevant files in the file system manager window being displayed in a particular area, such as the top of the file system manager window; size-enhanced with the most relevant files in a file system manager window having icons that are larger then others; and color-enhanced with the most relevant files in a file system manager window being displayed in a distinctive color.

In still another example, the files in the file system manager window are presented in a stack, so that the most significant files are at the top of the stack. In a further example, the file system manager window presents files in a webbed arrangement with a single file at the center of the web and other files being displayed in an arrangement radiating outward in decreasing degree of significance (the most significant files being closest to the single file).

In short, a file system manager 4104 according to embodiments of the invention presents a view of previously accessed files that is non-chronological, relative to the order that the data files were accessed. The file system manager 4104 also provides a visual cue as to the significance of the files in the presentation. Any method of organizing the previously accessed files that is non-chronological, relative to the order in which the files were accessed, may be used. In some embodiments, the method to organize the previously accessed files is automatically determined by the operating system or the file system manager 4104. In other embodiments, a user can chose the method of organizing files in the file system manager 4104.

Enhancing a file system manager 4104 as described, provides users of an operating system quicker access to the previously accessed files that are most important to them. This, in turn, speeds up their workflow and enhances their user experience.

Media Player Implementation

A media file player 4106 provides the user the ability to play, import, buy, share and organize media files (e.g., audio and/or video files). For operating systems 4112 currently available from Apple Computer, Inc., the media file player 4106 is an application referred to as iTunes.

Organization.

When organizing previously accessed audio files, according to embodiments of the present invention, a method for organizing the files is dynamically determined from information about the audio file. The organizational method is based on one or more of the following: what audio files were accessed; where the audio files were accessed; when the audio files were accessed or used; why, or in what context, the audio files were accessed; who accessed or created the audio files; and any user-supplied metadata about the audio files.

If the organizational method in the media player 4106 is based on what audio files are accessed, examples of information used to organize the files include, but are not limited to the following: artist (e.g., individual musicians or musical groups); song writer or composer; genre (e.g., rock, jazz, classical, country, and so on); and era (e.g., the 50's, 60's 70's, 80's, and so on).

If the organizational method in the media player 4106 is based on where the audio files were accessed, examples of information used to organize the files include, but are not limited to: play lists, libraries, and web sites. Other examples used to organize audio files include where the audio file was acquired (e.g., imported from a CD, added directly to the media player application, or bought from an on-line music store).

If the organizational method in the media player 4106 is based on when the audio files were accessed, examples of information used to organize the files include, but are not limited to: date and/or time of last use (e.g., time the file was accessed and date the file was accessed); a frequency of use (e.g., how often the file is accessed); duration of use (e.g., length of time the file is accessed); recency of use (e.g., length of time since the file was last opened); and interval between accessing the file, and when the audio file was first added to a music library (such as the iTunes Music Library) of the user.

If the organizational method in the media player 4106 is based on why, or in what context the audio files were accessed, examples of information used to organize the files include, but are not limited to identification of the following: viewing audio file data; playing an audio file; recording the audio file on a compact disc ("CD"); adding an audio file to a play list; copying an audio file to or from a digital music player; using the audio file in a user-generated play list; sharing the audio file over a network; or any other action by a user or a program on an audio file.

If the organizational method in the media player 4106 is based on who accessed the audio files, examples of information used to organize the files include, but are not limited to: users who accessed the audio files, and applications that accessed the data files.

If the organizational method in the media player 4106 is based on user-supplied metadata, an example of information used to organize the audio files is user-supplied ratings of the significance of the file.

Presentation.

Regardless of the organizational method used, the media player 4106 graphically represents recently accessed audio files and may enhance at least one of the graphical representations to convey a level of significance to the user of the recently accessed audio file. The files are presented in such a way as to cue the user as to the significance of particular previously accessed files.

In some embodiments, the graphical representations for the previously accessed audio files are selected to correspond to the method of organization used for the audio files. For example, if the media player 4106 used information about the artist, genre, or era to organize the audio files, icons corresponding to the same may be used to represent the audio files in a history list. If the files are organized based on the artist, a picture of the artist may be used to graphically represent the files associated with each artist. If the files are organized based on genre, an icon representing rock, jazz, and so on may be used to represent the files associated with that genre. Likewise, if the files are organized based on era, an icon representing the 50's, 60's, and so on may be used to represent the files associated with that era.

When using a media player 4106 incorporating embodiments of the invention, the previously accessed audio files that are most significant can be enhanced in any of the following examples: animation-enhanced with the most relevant audio file having animation associated with it designed to draw the user's attention to that audio file; position-enhanced with audio files being displayed in order of relevance (e.g., the most relevant audio files being displayed at the top of a list and the least at the bottom; or positioning the files in a stack such that the most relevant files are at the top of the stack); size-enhanced with the most relevant audio files being displayed with larger text, or larger album art; and color-enhanced with the most relevant audio files being displayed in a specific color.

In still other examples, an audio file is displayed with an added visual item to represent the audio file's relevance, such as a floating star over the audio file. In another example, a visual item is added to the displayed audio file representing the last date-time access of that audio file. In still a further example, a media player 4106 presents a webbed arrangement with the most relevant audio file being displayed at the center and other audio files radiating outward in decreasing degree of relevancy. In another example, an audio file is automatically included in a media player's pre-installed smart play list that contains the most significant audio files in the entirety of the user's music library, i.e., the 100 most significant audio files as determined by the operating system or the media player 4106.

In short, the media player 4106 according to embodiments of the invention presents a view of the previously accessed audio files that is non-chronological to when the audio files were accessed, and provides a visual cue as to the significance of the audio files in the presentation. Any method of organizing the previously accessed audio files that is non-chronological, relative to the order the files were accessed, may be used. In some embodiments, the method to organize the previously accessed audio files is automatically determined by the operating system 4112 or the media player 4106. In other embodiments, a user can chose the method of organizing audio files. Enhancing a media player 4106, according to embodiments of the present invention, provides users quicker access to the audio files that are most important to them and, in turn, enhances their listening experience.

Digital Image Manager Implementation

A digital image manager 4108 provides to a user the ability to import, organize, edit and share digital images. For operating systems 4112 currently available from Apple Computer, Inc., the digital image manager 4108 is referred to as iPhoto.

Organization.

When a digital image manager 4108 organizes previously accessed digital images according to embodiments of the present invention, a method for organizing the digital images is dynamically determined from information about the recently accessed digital images. The organizational method is based on one or more of the following: what digital images were accessed; where the digital images were accessed; when the digital images were accessed or used; why, or in what context, the digital images were accessed; who accessed/created/owns the digital images; or any user-supplied metadata about the digital images.

If the organizational method in the digital image manager 4108 is based on what digital images are accessed, examples of information used to organize the images include, but are not limited to, the following: what type of camera or device first acquired the digital image; size of the digital image (e.g., height and/or width); resolution of the digital image; name of the digital image; keywords in the file name; and any metadata associated with the digital image.

If the organizational method in the digital image manager 4108 is based on where the digital images were accessed, examples of information used to organize the images include, but are not limited to: image libraries, and photo albums (such as albums created in iPhoto).

If the organizational method in the digital image manager 4108 is based on when the digital images were accessed, examples of information used to organize the images include, but are not limited to: date and/or time of last use (e.g., time the image was viewed and date the image was viewed); frequency of use (e.g., how often the image is viewed); duration of use (e.g., length of time the image is viewed and/or edited); recency of use (e.g., length of time since the image was last opened); and interval between accessing the image, when the image file was first added or imported to an image library of the user (such as the iPhoto Library), and when the digital image was originally taken.

If the organizational method in the digital image manager 4108 is based on why or in what context the digital images were accessed, examples of information used to organize the files include, but are not limited to, identification of the following: viewing image file content; editing image file content; ordering a print of the digital print; adding the digital image to an album (such as an album in iPhoto); attaching an image file to an e-mail message; using the digital image in a slide show; recording the image file on a compact disc; or using the digital image in any other application (such as iMovie or iDVD available from Apple Computer, Inc.).

If the organizational method in the digital image manager 4108 is based on who accessed the image files, examples of information used to organize the files include, but are not limited to: users who accessed the digital images (e.g., created, viewed or modified the data files); applications that accessed the digital images (e.g., created, opened or modified the data files); and any other activities performed on image files by a user, a program, or an operating system.

If the organizational method in the digital image manager 4108 is based on user-supplied metadata, an example of information used to organize the files is user-supplied ratings of the digital image.

In another example, smart photo albums in a digital image manager 4108 are continually added and/or updated with digital images based on a dynamically determined method of organizing each album.

Presentation.

Regardless of the organizational method used, the digital image manager 4108 graphically represents recently accessed digital image files, and may enhance at least one of the graphical representations to convey a level of significance of the recently accessed digital image file. The image files are presented in such a way as to cue the user to the significance of particular previously accessed files.

When using a digital image manager 4108 incorporating embodiments of the invention, the previously accessed image files that are most significant can be enhanced as in any of the following examples: animation-enhanced with the most relevant digital image having animation associated with it designed to draw the user's attention to that image file; position-enhanced with the most relevant digital images displayed in a particular area, such as the top of a screen window; size-enhanced with the most relevant digital image files appearing larger than others; and color-enhanced with the most relevant digital images being displayed with a color border.

In still other examples, a digital image manager 4108 presents a webbed arrangement with the most relevant image file being displayed at the center of the web, and other image files radiating outward in decreasing degree of relevancy. In another example, the image files are positioned in a stack with the most relevant image being displayed at the top of the stack.

In short, a digital image manager 4108 presents a view of the previously accessed digital image files that is non-chronological, relative to when the digital images were accessed, and provides a visual cue as to the relevance of the digital images to that presentation. Any method of organizing the previously accessed digital images that is non-chronological, relative to the order the image files were accessed, may be used. In some embodiments, the method to organize the previously accessed digital images is automatically determined by the operating system or the digital image manager 4108. In other embodiments, a user can chose the method of organizing the files in the digital image manager 4108. Enhancing a digital image manager 4108 according to embodiments of the present invention, provides users quicker access to previously accessed digital images that are the most relevant to them at that time, and, in turn, enhances their experience working with any number of digital images.

Other Applications

Embodiments of the invention are not limited to the example implementations described in this section for web browsers, file system managers, media file players, and digital image managers. Embodiments of the invention can be implemented in any application that accesses files. For example, other applications 4110 include but are not limited to other applications currently available from Apple Computer, Inc. include Mail, iChat, and QuickTime Player to name a few.

Apple Computer's Mail application is used for sending and receiving e-mail messages. Using an electronic mail application incorporating embodiments of the invention, a user's previously viewed e-mail messages are organized according to a method that is dynamically determined from information about the previously viewed e-mail messages. The e-mail messages can also be graphically represented in a manner that represents the significance of the previously viewed e-mail messages. In another embodiment, the graphical representation for each e-mail message is a thumbnail showing some representative email text in the thumbnail.

Apple Computer's iChat application is used for sending and receiving instant messages. Using an instant messaging application incorporating embodiments of the invention, a user's buddy list (i.e., the other users that a person exchanges instant messages with) is dynamically determined from information about the buddies. User lists can be organized based on relationship (family, friends, work, etc.), frequency of chat sessions with users, number of chat sessions with users, the usual subject matter of the chats, and so on. In another example, the buddy list can be graphically presented in a smart friends/buddy list that keeps the most popular user at the top of the list.

Apple Computer's QuickTime Player and associated QuickTime applications are for multimedia development, storage, and playback. Using a multimedia application incorporating embodiments of the invention, multimedia files are organized and presented similarly to a digital image manager 4108 as described above.

Hardware and Operating Environment

Figure 42:
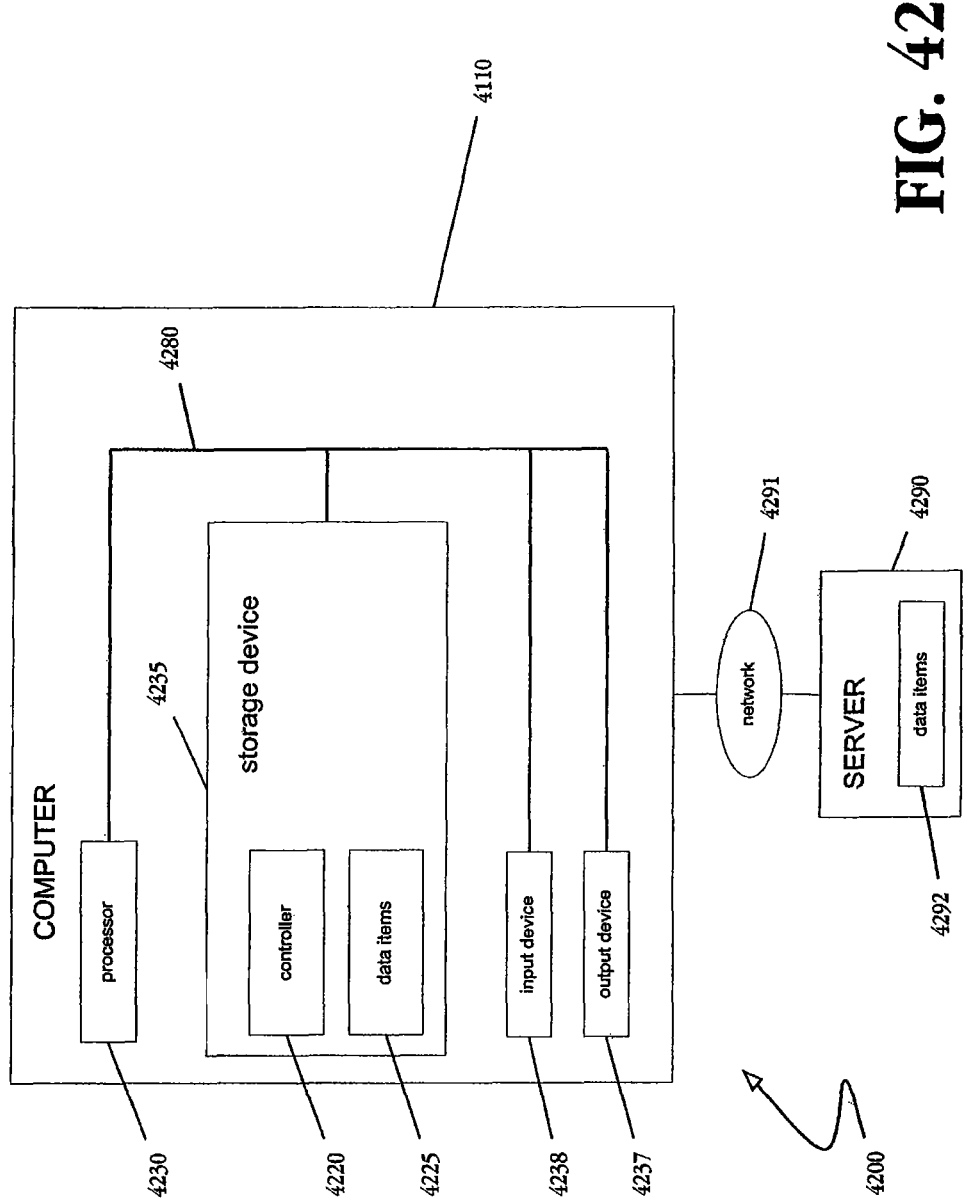
FIG. 42 is a more detailed block diagram of the computer shown in FIG. 41 according to an example embodiment of the invention.

This section provides an overview of some example hardware and the operating environments in conjunction with which embodiments of the inventive subject matter can be implemented. FIG. 42 is a more detailed block diagram of the computer shown in FIG. 41, according to an example embodiment of the invention.

FIG. 42 depicts a block diagram of an example system for implementing an embodiment of the invention. A system

4200 includes a computer 4110 connected to a server 4290 via a network 4291. Although one computer 4110, one server 4290, and one network 4291 are shown, in other embodiments any number or combination of them are present. In another embodiment, the server 4290 and the network 4291 are not present.

The computer 4110 includes a processor 4230, a storage device 4235, an output device 4237, and an input device 4238, all connected via a bus 4280. The processor 4230 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 4230 executes instructions and includes that portion of the computer 4110 that controls the operation of the entire computer. Although not depicted in FIG. 42, the processor 4230 typically includes a control unit that organizes data and program storage in memory and transfers data and other information between the various parts of the computer 4110. The processor 4230 receives input data from the input device 4238 and the network 4291, reads and stores code and data in the storage device 4235, and presents data to the output device 4237.

Although the computer 4110 is shown to contain only a single processor 4230 and a single bus 4280, the present invention applies equally to computers that may have multiple processors and to computers that may have multiple buses with some or all performing different functions in different ways.

The storage device 4235 represents one or more mechanisms for storing data. For example, the storage device 4235 may include read only memory (ROM), random access memory (RAM), magnetic disk storage media, optical storage media, flash memory devices, and/or other machine-readable media. In other embodiments, any appropriate type of storage device may be used. Although only one storage device 4235 is shown, multiple storage devices and multiple types of storage devices may be present. Further, although the computer 4110 is drawn to contain the storage device 4235, it may be distributed across other computers, for example on server 4290.

The storage device 4235 includes a controller 4220 and data items 4225. The controller 4220 includes instructions capable of being executed on the processor 4230 to carry out the functions of the present invention, as previously described above with reference to FIGS. 1-40. In another embodiment, some or all of the functions of the present invention are carried out via hardware in lieu of a processor-based system. In one embodiment, the controller 4220 is a web browser, but in other embodiments, the controller 4220 may be a database system, a file system, an electronic mail system, or may include any other functions capable of accessing data items. Of course, the storage device 4235 may also contain additional software and data (not shown), which is not necessary to understanding the invention.

Although the controller 4220 and the data items 4225 are shown to be within the storage device 4235 in the computer 4110, some or all of them may be distributed across other systems, for example on the server 4290 (e.g., data items 4292) and accessed via the network 4291.

The output device 4237 is that part of the computer 4110 that displays output to the user. The output device 4237 may be a cathode-ray tube (CRT) based video display well known in the art of computer hardware. But, in other embodiments the output device 4237 may be replaced with a liquid crystal display (LCD) based or gas, plasma-based, flat-panel display. In still other embodiments, any appropriate display device may be used. Although only one output device 4237 is shown, in other embodiments, any number of output devices of different types or of the same type may be present. The output device 4237 displays the user interfaces previously described above with reference to FIGS. 11-40.

The input device 4238 may be a keyboard, mouse or other pointing device, trackball, touchpad, touch screen, keypad, microphone, voice recognition device, or any other appropriate mechanism for the user to input data to the computer 4110 and manipulate the user interface previously described above with respect to FIGS. 11-40. Although only one input device 4238 is shown, in another embodiment any number and type of input devices may be present.

The bus 4280 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 4110 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 4110. The hardware and software depicted in FIGS. 3-6 may vary for specific applications and may include more or fewer elements than those depicted. For example, other peripheral devices such as audio adapters, or chip programming devices, such as EPROM (Erasable Programmable Read-Only Memory) programming devices may be used in addition to, or in place of, the hardware already depicted.

The network 4291 may be any suitable network and may support any appropriate protocol suitable for communication to the computer 4110. In an embodiment, the network 4291 may support wireless communications. In another embodiment, the network 4291 may support hard-wired communications, such as a telephone line or cable. In another embodiment, the network 4291 may support the Ethernet IEEE (Institute of Electrical and Electronics Engineers) 802.3x specification. In another embodiment, the network 4291 may be the Internet and may support IP (Internet Protocol). In another embodiment, the network 4291 may be a local area network (LAN) or a wide area network (WAN). In another embodiment, the network 4291 may be a hotspot service provider network. In another embodiment, the network 4291 may be an intranet. In another embodiment, the network 4291 may be a GPRS (General Packet Radio Service) network. In another embodiment, the network 4291 may be any appropriate cellular data network or cell-based radio network technology. In another embodiment, the network 4291 may be an IEEE 802.11B wireless network. In still another embodiment, the network 4291 may be any suitable network or combination of networks. Although one network 4291 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention, may be made without departing from the principles and scope of the invention as expressed in the subjoined claims.

What is claimed is:

1. A method comprising:
    at a computing device with one or more processors, non-transitory memory, and a display:
        monitoring, by a web browser application, navigation to visited web pages;
        determining, by the web browser application analyzing the visited pages, a first common feature corresponding to the visited web pages, and a plurality of values of the first common feature, wherein the first common feature corresponds to a non-temporal characteristic of the visited web pages;
        receiving a first request to display representations of the visited web pages; and
        responsive to the first request, displaying, on a user interface that comprises a display region of the web browser application, the representations of the visited web pages, including concurrently displaying, on the display, a plurality of stacks of the representations, including:
            a first stack of representations of a first set of the visited web pages having corresponding values within a first range of values of the first common feature;
            a second stack of representations of a second set of the visited web pages having corresponding values within a second range of values of the first common feature; and
            a third stack of representations of a third set of the visited web pages having corresponding values within a third range of values of the first common feature, wherein the stacks of representations are displayed in a two-dimensional array that is organized based on a temporal characteristic of the visited web pages.

2. The method of claim 1, further comprising:
    organizing the first stack of representations of the first set of the visited web pages according to their values of the first common feature, the second stack of the representations of the second set of the visited web pages according to their values of the first common feature, and the third stack of the representations of the third set of the visited web pages according to their values of the first common feature.

3. The method of claim 2, wherein the first set, the second set of the visited web pages, and the third set of visited web pages are further organized using weights derived from each of the visited web pages, the weights based on information from each of the visited web pages, the information including data of each of the visited web pages.

4. The method of claim 1, wherein the first common feature corresponds to a domain and the first, second, and third ranges of values of the first common feature comprise a first, second, and third domain, respectively, wherein the first, second, and third domains are determined using a uniform resource locator (URL) of each domain, and wherein the first request to display the representations of the visited web pages is a request to display a browsing history.

5. The method of claim 1, wherein the first stack of representations, the second stack of representations, and the third stack of representations are displayed as at least one of icons, meta-icons, thumbnails, or a three-dimensional stack of one of these.

6. The method of claim 1, further comprising:
    receiving an input to view the first stack of representations; and
    in response to the input to view the first stack of representations, displaying graphical representations of the first set of the visited web pages.

7. The method of claim 6, wherein displaying graphical representations of the first set of the visited web pages includes displaying at least one of an icon, meta-icon, or thumbnail for each web page represented in the first set of the visited web pages.

8. The method of claim 1, wherein the user interface comprises at least one tab associated with a browser window, the tab displaying at least one of the first stack of representations, the second stack of representations, or the third stack of representations.

9. The method of claim 1, wherein the user interface comprises a sheet to display at least one of the first stack, the second stack of representations, or the third stack of representations, the sheet being an animated user interface element attached to the title bar of the web browser application, wherein the sheet appears directly from, and disappears back to, the title bar of the web browser application.

10. The method of claim 1, further comprising:
    selecting an organizational method for organizing the history of visited web pages, from a plurality of organizational methods, using the determined first common feature, wherein the selected organizational method results in organizing more of the visited web pages than other organizational methods in the plurality of organizational methods.

11. The method of claim 1, further comprising:
    determining, by the web browser application analyzing updated visited web pages, a second common feature corresponding to the updated visited web pages, and a plurality of values of the second common feature, wherein the updated visited web pages are different from the visited web pages, and wherein the second common feature is more prevalent than the first common feature among the updated visited web pages;

responsive to a second request to display representations of the updated visited web pages, displaying on the user interface, the representations of the updated visited web pages, including concurrently displaying, on the display:

a fourth stack of representations of a fourth set of the updated visited web pages having corresponding values within a first range of values of the second common feature; and a fifth stack of representations of a fifth set of the updated visited web pages having corresponding values within a second range of values of the second common feature.

12. The method of claim 1, wherein the first common feature results in organizing more of the visited web pages than a plurality of other candidate common features corresponding to the visited web pages.

13. The method of claim 1, wherein the first common feature corresponds to one of: a type of the visited web pages, a subject matter of the visited web pages, or a source of the visited web pages.

14. The method of claim 1, wherein the first common feature corresponds to one of: where the visited web pages were visited, who visited the visited web pages, or why the visited web pages were visited.

15. The method of claim 1, wherein the first common feature corresponds to a subject matter of the visited web pages, wherein the first range of values of the first common feature corresponds to a first sub-category of the subject matter, wherein the second range of values corresponds to a second sub-category of the subject matter, the second sub-category different from the first sub-category, and wherein the third range of values corresponds to a third sub-category of the subject matter, the third sub-category different from the first and second sub-categories.

16. A non-transitory computer readable medium comprising instructions, which, when executed by one or more processors of a computing device with a display, cause the computing device to:

monitor, by a web browser application, navigation to of visited web pages;

determine, by the web browser application analyzing the visited web pages, a first common feature corresponding to the visited web pages, and a plurality of values of the first common feature, wherein the first common feature corresponds to a non-temporal characteristic of the visited web pages;

receive a first request to display representations of the visited web pages; and responsive to the first request, display, on a user interface that comprises a display region of the web browser application, the representations of the visited web pages, including concurrently displaying, on the display, a plurality of stacks of the representations, including:

a first stack of representations of a first set of the visited web pages having corresponding values within a first range of values of the first common feature;

a second stack of representations of a second set of the visited web pages having corresponding values within a second range of values of the first common feature; and a third stack of representations of a third set of the visited web pages having corresponding values within a third range of values of the first common feature, wherein the stacks of representations are displayed in a two-dimensional array that is organized based on a temporal characteristic of the visited web pages.

17. The non-transitory computer readable medium of claim 16, wherein the instructions further cause the computing device to:

organize the first stack of representations of the first set of the visited web pages according to their values of the first common feature, the second stack of the representations of the second set of the visited web pages according to their values of the first common feature, and the third stack of the representations of the third set of the visited web pages according to their values of the first common feature.

18. The non-transitory computer readable medium of claim 16, wherein the first common feature corresponds to a domain and the first, second, and third ranges of values of the first common feature comprise a first, second, and third domain, respectively, wherein the first, second, and third domains are determined using a uniform resource locator (URL) of each domain, and wherein the first request to display the representations of the visited web pages is a request to display a browsing history.

19. The non-transitory computer readable medium of claim 16, wherein the first stack of representations, the second stack of representations, and the third stack of representations are displayed as at least one of icons, meta-icons, thumbnails, or a three-dimensional stack of one of these.

20. The non-transitory computer readable medium of claim 16, wherein the instructions further cause the computing device to:

receive an input to view the first stack of representations; and in response to the input to view the first stack of representations, display graphical representations of the first set of the visited web pages.

21. The non-transitory computer readable medium of claim 20, wherein displaying graphical representations of the first set of the visited web pages includes displaying at least one of an icon, meta-icon, or thumbnail for each web page represented in the first set of the visited web pages.

22. The non-transitory computer readable medium of claim 16, wherein the user interface comprises at least one tab associated with a browser window, the tab displaying at least one of the first stack of representations, the second stack of representations, or the third stack of representations.

23. The non-transitory computer readable medium of claim 16, wherein the instructions further cause the computing device to:

select an organizational method for organizing the history of visited web pages, from a plurality of organizational methods, using the determined first common feature, wherein at the selected organizational method results in organizing more of the visited web pages than other organizational methods in the plurality of organizational methods.

24. The non-transitory computer readable medium of claim 16, wherein the instructions further cause the computing device to:

determine, by the web browser application analyzing updated visited web pages, a second common feature corresponding to the updated visited web pages, and a plurality of values of the second common feature, wherein the updated visited web pages are different from the visited web pages, and wherein the second common feature is more prevalent than the first common feature among the updated visited web pages;

responsive to a second request to display representations of a plurality of previously visited web pages, display, on the user interface, the representations of the updated visited web pages, including concurrently displaying, on the display:
  a fourth stack of representations of a fourth set of the updated visited web pages having corresponding values within a first range of values of the second common feature; and
  a fifth stack of representations of a fifth set of the updated visited web pages having corresponding values within a second range of values of the second common feature.

25. A system comprising:
a display;
one or more processors;
non-transitory memory; and
one or more programs, wherein the one or more programs are stored in the non-transitory memory and configured to be executed by the one or more processors, the one more programs include instructions for:
  monitoring, by a web browser application, a navigation to visited web pages;
  determining, by the web browser application analyzing the visited pages, a first common feature corresponding to the visited web pages, and a plurality of values of the first common feature, wherein the first common feature corresponds to a non-temporal characteristic of the visited web pages;
  receiving a first request to display representations of the visited web pages; and
  responsive to the first request, displaying, on a user interface that comprises a display region of the web browser application, the representations of the visited web pages, including concurrently displaying, on the display, a plurality of stacks of the representations, including:
    a first stack of representations of a first set of the visited web pages having corresponding values within a first range of values of the first common feature;
    a second stack of representations of a second set of the visited web pages having corresponding values within a second range of values of the first common feature; and
    a third stack of representations of a third set of the visited web pages having corresponding values within a third range of values of the first common feature, wherein the stacks of representations are displayed in a two-dimensional array that is organized based on a temporal characteristic of the visited web pages.

26. The system of claim 25, wherein the one or more programs further include instructions for:
  organizing the first stack of representations of the first set of the visited web pages according to their values of the first common, the second stack of the representations of the second set of the visited web pages according to their values of the first common feature, and the third stack of the representations of the third set of the visited web pages according to their values of the first common feature.

27. The system of claim 25, wherein the first common feature corresponds to a domain and the first, second, and third ranges of values of the first common feature comprise a first, second, and third domain, respectively, wherein the first, second, and third domains are determined using a uniform resource locator (URL) of each domain, and wherein the first request to display the representations of the visited web pages is a request to display a browsing history.

28. The system of claim 25, wherein the first stack of representations, the second stack of representations, and the third stack of representations are displayed as at least one of icons, meta-icons, thumbnails, or a three-dimensional stack of one of these.

29. The system of claim 25, wherein the one or more programs further include instructions for:
  receiving an input to view the first stack of representations; and
  in response to the input to view the first stack of representations, displaying graphical representations of the first set of the visited web pages.

30. The system of claim 29, wherein displaying graphical representations of the first set of the visited web pages includes displaying at least one of an icon, meta-icon, or thumbnail for each web page represented in the first set of the visited web pages.

31. The system of claim 25, wherein the user interface comprises at least one tab associated with a browser window, the tab displaying at least one of the first stack of representations, the second stack of representations, or the third stack of representations.

32. The system of claim 25, wherein the one or more programs further include instructions for:
  selecting an organizational method for organizing the history of visited web pages, from a plurality of organizational methods, using the determined first common feature, wherein the selected organizational method results in organizing more of the visited web pages than other organizational methods in the plurality of organizational methods.

33. The system of claim 25, wherein the one or more programs further include instructions for:
  determining, by the web browser application analyzing updated visited web pages, a second common feature corresponding to the updated visited web pages, and a plurality of values of the second common feature, wherein the updated visited web pages are different from the visited web pages, and wherein the second common feature is more prevalent than the first common feature among the updated visited web pages;
  responsive to a second request to display representations of the updated visited web pages, displaying, on the user interface, the representations of the updated visited web pages, including concurrently displaying, on the display:
    a fourth stack of representations of a fourth set of the updated visited web pages having corresponding values within a first range of values of the second common feature; and
    a fifth stack of representations of a fifth set of the updated visited web pages having corresponding values within a second range of values of the second common feature.

* * * * *